(12) United States Patent
Dvorak et al.

(10) Patent No.: US 7,092,929 B1
(45) Date of Patent: Aug. 15, 2006

(54) METHOD AND APPARATUS FOR PLANNING ANALYSIS

(75) Inventors: Robert E. Dvorak, Atherton, CA (US); Richard W. Pasternack, Tiburon, CA (US); Ronald Samuel Cope, Walnut Creek, CA (US); Beth Li-Ju Chen, Port Jefferson, NY (US)

(73) Assignee: Bluefire Systems, Inc., San Francisco, CA (US)

( * ) Notice: Subject to any disclaimer, the term of this patent is extended or adjusted under 35 U.S.C. 154(b) by 83 days.

(21) Appl. No.: 09/905,255

(22) Filed: Jul. 13, 2001

Related U.S. Application Data

(63) Continuation-in-part of application No. 09/888,336, filed on Jun. 22, 2001, and a continuation-in-part of application No. 09/766,539, filed on Jan. 19, 2001, and a continuation-in-part of application No. 09/760,377, filed on Jan. 12, 2001, and a continuation-in-part of application No. 09/755,355, filed on Jan. 5, 2001, and a continuation-in-part of application No. 09/755,635, filed on Jan. 5, 2001, and a continuation-in-part of application No. 09/708,944, filed on Nov. 8, 2000.

(51) Int. Cl.
*G06F 17/00* (2006.01)
*G06N 5/00* (2006.01)

(52) U.S. Cl. .................. 706/925; 706/14; 706/12; 706/45

(58) Field of Classification Search ............... 706/925, 706/14, 12, 45
See application file for complete search history.

(56) References Cited

U.S. PATENT DOCUMENTS

| 5,168,445 A | 12/1992 | Kawashima et al. |
| 5,179,643 A * | 1/1993 | Homma et al. ............. 345/440 |
| 5,237,496 A | 8/1993 | Kagami et al. |
| 5,596,493 A | 1/1997 | Tone et al. |
| 5,712,985 A | 1/1998 | Lee et al. |
| 5,953,707 A | 9/1999 | Huang et al. |

(Continued)

FOREIGN PATENT DOCUMENTS

JP 2002073951 * 4/2000

OTHER PUBLICATIONS

Hauge et al., "*How Low Can You Go? Using Simulation to Determine Appropriate Inventory Levels*", attributed to IIE Lean Management Solutions, Sep. 23-24, 2002, Seattle, WA, (publication data unverified) <http://www.novasim.com/downloads/How%20Low%20Can%20You%20Go.pdf>, accessed Jan. 10, 2005.

(Continued)

*Primary Examiner*—Joseph P. Hirl
(74) *Attorney, Agent, or Firm*—Ernest J. Beffel, Jr.; Haynes Beffel & Wolfeld LLP

(57) ABSTRACT

Methods of and apparatus for simulating and projecting future sales, inventory and gross margin are described. Some methods provide bottom-up item-by-item, per location simulation of unit inventory and unit sales. Notional deliveries and other features of simulations and projections are reflected in the detailed description, accompanying figures and claims.

48 Claims, 49 Drawing Sheets

U.S. PATENT DOCUMENTS

| | | | |
|---|---|---|---|
| 5,966,695 A | | 10/1999 | Melchione et al. |
| 5,974,422 A | * | 10/1999 | Kagami et al. .......... 707/104.1 |
| 6,151,582 A | | 11/2000 | Huang et al. |
| 6,341,269 B1 | | 1/2002 | Dulaney et al. |
| 6,434,544 B1 | | 8/2002 | Bakalash et al. |
| 6,456,997 B1 | * | 9/2002 | Shukla .......................... 707/1 |
| 6,493,678 B1 | * | 12/2002 | Foster et al. .................. 705/28 |
| 6,510,420 B1 | * | 1/2003 | Cessna et al. ................ 706/45 |
| 6,609,101 B1 | | 8/2003 | Landvater |

OTHER PUBLICATIONS

Lin et al., "*Extended-Enterprise Supply-Chain Management at IBM Personal Systems Group and Other Divisions*", Interfaces 30:1, pp. 7-25, at pp. 12-13 (Jan.-Feb. 2000) available at <http://www.interfaces.smeal.psu.edu/pdf/v30n1a2.pdf>.

Statement Regarding Public Use prepared by Applicants.

* cited by examiner

Planning Daily Item Sales and Inventory Report
Activity: Dept 081
UserID: Bill C
Report date: 06/30/01

| SKU Num / Description | Date | Total Store & DC Onhand/ Intransit (units) | Total Store Onhand/ Intransit (units) | DC Average Onhand (units) | DC Statistical Onhand (units) | Received Firm POs today (units) | Received Notional POs Orders (units) | All Stores Projected Daily Sales (units) | All Stores Lost Sales (units) |
|---|---|---|---|---|---|---|---|---|---|
| 367980 Brand A 12 oz Normal Shampoo | 08/12/01 | 2228 | 2228 | 0.0 | -3765.0 | 0 | 0.0 | 92 | 6.3 |
| 367981 Brand A 12 oz Normal Shampoo | 08/13/01 | 2140 | 2140 | 0.0 | -3855.8 | 0 | 0.0 | 88 | 10.0 |
| 367982 Brand A 12 oz Normal Shampoo | 08/14/01 | 2059 | 2059 | 0.0 | -3939.5 | 0 | 0.0 | 81 | 16.9 |
| 367983 Brand A 12 oz Normal Shampoo | 08/15/01 | 5528 | 1982 | 3546.0 | -473.0 | 3546 | 0.0 | 77 | 20.7 |
| 367984 Brand A 12 oz Normal Shampoo | 08/16/01 | 5452 | 5452 | 0.0 | -550.7 | 0 | 0.0 | 76 | 22.4 |
| 367985 Brand A 12 oz Normal Shampoo | 08/17/01 | 5378 | 5378 | 0.0 | -626.7 | 0 | 0.0 | 74 | 24.2 |
| 367986 Brand A 12 oz Normal Shampoo | 08/18/01 | 5306 | 5306 | 0.0 | -701.0 | 0 | 0.0 | 72 | 26.1 |
| 367987 Brand A 12 oz Normal Shampoo | 08/19/01 | 5237 | 5237 | 0.0 | -773.8 | 0 | 0.0 | 70 | 28.5 |
| 367988 Brand A 12 oz Normal Shampoo | 08/20/01 | 5168 | 5168 | 0.0 | -845.7 | 0 | 0.0 | 69 | 29.5 |
| 367989 Brand A 12 oz Normal Shampoo | 08/21/01 | 5100 | 5100 | 0.0 | -916.7 | 0 | 0.0 | 68 | 30.2 |
| 367990 Brand A 12 oz Normal Shampoo | 08/22/01 | 5034 | 5034 | 0.0 | -985.7 | 0 | 0.0 | 66 | 32.1 |
| 367991 Brand A 12 oz Normal Shampoo | 08/23/01 | 4970 | 4970 | 0.0 | -1052.5 | 0 | 0.0 | 64 | 34.1 |
| 367992 Brand A 12 oz Normal Shampoo | 08/24/01 | 4907 | 4907 | 0.0 | -1117.8 | 0 | 0.0 | 63 | 35.4 |
| 367993 Brand A 12 oz Normal Shampoo | 08/25/01 | 4847 | 4847 | 0.0 | -1180.4 | 0 | 0.0 | 60 | 38.0 |
| 367994 Brand A 12 oz Normal Shampoo | 08/26/01 | 4790 | 4790 | 0.0 | -1240.2 | 0 | 0.0 | 58 | 40.5 |
| 367995 Brand A 12 oz Normal Shampoo | 08/27/01 | 4696 | 4696 | 0.0 | -1339.1 | 0 | 0.0 | 93 | 4.7 |
| 367996 Brand A 12 oz Normal Shampoo | 08/28/01 | 8149 | 4603 | 3546.0 | 2108.3 | 3546 | 0.0 | 93 | 4.6 |
| 367997 Brand A 12 oz Normal Shampoo | 08/29/01 | 8054 | 5549 | 2505.3 | 2008.3 | 0 | 0.0 | 95 | 3.5 |
| 367998 Brand A 12 oz Normal Shampoo | 08/30/01 | 7960 | 5542 | 2417.7 | 1912.4 | 0 | 0.0 | 95 | 3.5 |

Planning Monthly Department Performance Summary
Activity: Department 268
UserID: Tom C
Report date: 06/30/01

502 / 504 / 510 /

| Fiscal Year | Fiscal Month | Actual/Forecasted |
|---|---|---|
| 2002 | March | Actual |
| 2002 | April | Actual |
| 2002 | May | Actual |
| 2002 | June | Actual |
| 2002 | July | Forecasted |
| 2002 | August | Forecasted |
| 2002 | September | Forecasted |
| 2002 | October | Forecasted |
| 2002 | November | Forecasted |
| 2002 | December | Forecasted |
| 2003 | January | Forecasted |
| 2002 | February | Forecasted |
| 2003 | March | Forecasted |
| 2003 | April | Forecasted |
| 2003 | May | Forecasted |
| 2003 | June | Forecasted |

All Stores Revenue Dollars

| 512 TY Frcst/Act (dollars) | 632 TY Budget (dollars) | 514 LY Actual (dollars) | 634 TY vs TY Budget (percent) | 516 TY vs LY Actual (percent) | 518 Gross Margin TY Frcst/Act (percent) |
|---|---|---|---|---|---|
| 1,957,806 | 1,947,162 | 1,579,892 | 1% | 24% | 79.2% |
| 1,575,102 | 1,522,683 | 1,828,302 | 3% | -14% | 78.7% |
| 2,242,961 | 2,017,254 | 2,010,862 | 11% | 12% | 74.5% |
| 1,777,350 | 1,763,234 | 1,481,591 | 1% | 22% | 74.7% |
| 1,744,605 | 1,817,730 | 1,423,254 | -4% | 23% | 61.2% |
| 2,103,032 | 2,196,365 | 1,863,799 | -4% | 13% | 77.4% |
| 1,862,498 | 1,524,856 | 1,552,858 | 22% | 20% | 77.9% |
| 2,792,448 | 2,754,824 | 1,935,587 | 1% | 44% | 78.0% |
| 3,153,360 | 3,042,855 | 1,839,758 | 4% | 71% | 82.1% |
| 3,917,746 | 3,308,793 | 3,299,352 | 18% | 19% | 80.3% |
| 2,265,454 | 1,945,686 | 1,390,039 | 16% | 63% | 81.7% |
| 3,410,470 | 2,772,804 | 2,407,790 | 23% | 42% | 81.9% |
| 2,492,690 | 2,405,081 | 1,957,606 | 4% | 27% | 82.6% |
| 2,469,050 | 2,231,952 | 1,575,102 | 11% | 57% | 82.8% |
| 3,047,941 | 2,882,861 | 2,242,961 | 6% | 35% | 82.7% |
| 2,986,982 | 2,882,961 | 1,777,350 | 4% | 68% | 82.7% |

522 / 640 / 524 /

DCs + All Stores Inventory

| TY Frcst/Act (Retail $) | TY Budget (Retail $) | LY Actual (Retail $) |
|---|---|---|
| 5,189,904 | 6,473,880 | 6,594,075 |
| 5,852,758 | 6,410,154 | 8,991,648 |
| 6,398,859 | 6,463,487 | 8,097,432 |
| 6,640,981 | 6,571,469 | 6,132,548 |
| 5,918,243 | 5,977,885 | 6,191,200 |
| 5,850,612 | 6,556,314 | 6,371,962 |
| 6,077,897 | 5,544,829 | 5,898,561 |
| 5,839,081 | 7,949,535 | 8,488,000 |
| 6,499,610 | 6,683,186 | 6,048,520 |
| 6,002,135 | 6,145,497 | 8,751,778 |
| 5,748,753 | 5,735,160 | 4,964,425 |
| 6,018,715 | 5,172,405 | 7,543,990 |
| 5,552,262 | 5,749,150 | 5,189,904 |
| 4,980,960 | 4,914,390 | 5,852,758 |
| 4,847,844 | 5,241,747 | 6,398,659 |
| 4,847,844 | 5,241,747 | 6,640,981 |

526 / 528 / 642 / 530

GMROI

| TY Frcst/Act (percent) |
|---|
| 1192% |
| 1157% |
| 1013% |
| 997% |
| 900% |
| 1229% |
| 1324% |
| 1370% |
| 1640% |
| 1784% |
| 2082% |
| 2366% |
| 2879% |
| 3074% |
| 3689% |
| 3689% |

Inventory Turns

| TY Frcst/Act (fraction) | TY Budget (fraction) | LY Actual (fraction) |
|---|---|---|
| 4.53 | 3.61 | 2.75 |
| 3.23 | 2.85 | 2.44 |
| 3.83 | 3.75 | 2.98 |
| 3.21 | 3.22 | 2.86 |
| 3.54 | 3.65 | 3.29 |
| 4.32 | 4.02 | 3.51 |
| 3.68 | 3.30 | 3.27 |
| 4.09 | 4.16 | 3.58 |
| 5.82 | 5.48 | 3.65 |
| 7.83 | 6.46 | 4.08 |
| 5.56 | 6.46 | 3.38 |
| 6.80 | 6.43 | 3.83 |
| 5.39 | 5.02 | 4.53 |
| 5.95 | 5.46 | 3.23 |
| 7.54 | 6.60 | 3.83 |
| 7.54 | 6.60 | 3.21 |

638 / 520 /

| TY Budget (percent) | LY Actual (percent) |
|---|---|
| 78.6% | 80.5% |
| 79.0% | 82.2% |
| 78.6% | 81.0% |
| 78.7% | 81.3% |
| 77.5% | 79.5% |
| 75.2% | 80.5% |
| 78.8% | 80.1% |
| 79.3% | 78.3% |
| 79.3% | 78.6% |
| 80.4% | 79.2% |
| 77.1% | 69.2% |
| 78.1% | 77.6% |
| 79.1% | 79.2% |
| 78.9% | 78.7% |
| 78.1% | 74.5% |
| 78.1% | 74.7% |

Figure 6

Planning Monthly Item Performance Summary
Activity: Department 288
UserID: Tom C
Report date: 06/30/01

Figure 7

| Fiscal Year | Fiscal Month | SKU | Description | Actual/Forecasted |
|---|---|---|---|---|
| 2002 | March | 2409845 | Teal Mock T Forward Cut XXL | Actual |
| 2002 | April | 2409845 | Teal Mock T Forward Cut XXL | Actual |
| 2002 | May | 2409845 | Teal Mock T Forward Cut XXL | Actual |
| 2002 | June | 2409845 | Teal Mock T Forward Cut XXL | Actual |
| 2002 | July | 2409845 | Teal Mock T Forward Cut XXL | Forecasted |
| 2002 | August | 2409845 | Teal Mock T Forward Cut XXL | Forecasted |
| 2002 | September | 2409845 | Teal Mock T Forward Cut XXL | Forecasted |
| 2002 | October | 2409845 | Teal Mock T Forward Cut XXL | Forecasted |
| 2002 | November | 2409845 | Teal Mock T Forward Cut XXL | Forecasted |
| 2002 | December | 2409845 | Teal Mock T Forward Cut XXL | Forecasted |
| 2002 | January | 2409845 | Teal Mock T Forward Cut XXL | Forecasted |
| 2002 | February | 2409845 | Teal Mock T Forward Cut XXL | Forecasted |
| 2003 | March | 2409845 | Teal Mock T Forward Cut XXL | Forecasted |
| 2003 | April | 2409845 | Teal Mock T Forward Cut XXL | Forecasted |
| 2003 | May | 2409845 | Teal Mock T Forward Cut XXL | Forecasted |
| 2003 | June | 2409845 | Teal Mock T Forward Cut XXL | Forecasted |

All Stores Revenue Dollars

| TY Fcst/Act (dollars) | TY Budget (dollars) | LY Actual (dollars) | TY vs TY Budget (percent) |
|---|---|---|---|
| $ 6,264 | $ 5,841 | $ 4,898 | 7% |
| $ 5,985 | $ 4,568 | $ 5,851 | 31% |
| $ 6,953 | $ 6,052 | $ 6,033 | 15% |
| $ 6,754 | $ 5,290 | $ 4,677 | 28% |
| $ 6,455 | $ 5,453 | $ 4,697 | 18% |
| $ 7,153 | $ 6,589 | $ 6,523 | 9% |
| $ 5,774 | $ 4,575 | $ 5,124 | 26% |
| $ 8,377 | $ 8,284 | $ 6,000 | 1% |
| $ 11,037 | $ 9,129 | $ 5,519 | 21% |
| $ 12,145 | $ 9,926 | $ 10,228 | 22% |
| $ 8,158 | $ 5,837 | $ 4,448 | 40% |
| $ 11,596 | $ 8,318 | $ 7,464 | 39% |
| $ 9,223 | $ 7,215 | $ 8,264 | 28% |
| $ 9,629 | $ 6,696 | $ 5,985 | 44% |
| $ 10,383 | $ 8,649 | $ 8,953 | 20% |
| $ 9,848 | $ 8,649 | $ 6,754 | 15% |

Gross Margin

| TY Fcst/Act (percent) | TY Budget (percent) | LY Actual (percent) | TY vs LY Actual (percent) |
|---|---|---|---|
| 80.0% | 78.5% | 76.5% | 28% |
| 79.4% | 79.0% | 81.4% | 2% |
| 76.9% | 78.6% | 80.7% | 15% |
| 76.2% | 78.7% | 78.0% | 44% |
| 76.2% | 77.5% | 77.1% | 37% |
| 75.8% | 75.2% | 79.7% | 10% |
| 77.2% | 78.6% | 81.8% | 13% |
| 78.0% | 79.3% | 74.8% | 40% |
| 83.0% | 79.3% | 76.2% | 100% |
| 83.0% | 80.4% | 81.6% | 19% |
| 83.4% | 77.1% | 69.8% | 83% |
| 84.4% | 78.1% | 77.6% | 55% |
| 85.0% | 79.1% | 80.0% | 47% |
| 84.3% | 78.9% | 79.4% | 61% |
| 83.5% | 78.1% | 76.9% | 49% |
| 83.5% | 78.1% | 76.2% | 47% |

DCs + All Stores Inventory

| TY Fcst/Act (Retail $) | TY Budget (Retail $) | LY Actual (Retail $) |
|---|---|---|
| $ 17,848 | $ 19,422 | $ 20,882 |
| $ 18,729 | $ 19,230 | $ 27,874 |
| $ 24,315 | $ 19,390 | $ 25,912 |
| $ 20,587 | $ 19,714 | $ 18,398 |
| $ 22,489 | $ 17,934 | $ 16,612 |
| $ 21,647 | $ 19,869 | $ 21,027 |
| $ 20,865 | $ 16,635 | $ 19,945 |
| $ 18,101 | $ 23,849 | $ 21,410 |
| $ 19,499 | $ 19,990 | $ 18,750 |
| $ 21,007 | $ 18,436 | $ 29,255 |
| $ 17,821 | $ 17,205 | $ 15,390 |
| $ 21,667 | $ 15,517 | $ 29,922 |
| $ 18,878 | $ 17,247 | $ 17,846 |
| $ 18,430 | $ 14,743 | $ 18,729 |
| $ 18,907 | $ 15,725 | $ 24,315 |
| $ 17,309 | $ 15,725 | $ 20,587 |

GMROI

| TY Fcst/Act (percent) |
|---|
| 1272% |
| 1465% |
| 1047% |
| 1263% |
| 1110% |
| 1393% |
| 1368% |
| 1370% |
| 1913% |
| 1843% |
| 2499% |
| 2681% |
| 3304% |
| 3998% |
| 4181% |
| 4181% |

Inventory Turns

| TY Fcst/Act (fraction) | TY Budget (fraction) | LY Actual (fraction) |
|---|---|---|
| 4.26 | 3.61 | 2.84 |
| 3.83 | 2.85 | 2.52 |
| 3.43 | 3.75 | 2.79 |
| 3.94 | 3.22 | 3.05 |
| 3.44 | 3.65 | 3.39 |
| 3.97 | 4.02 | 3.72 |
| 3.35 | 3.30 | 3.08 |
| 5.55 | 4.18 | 3.36 |
| 6.79 | 5.48 | 3.53 |
| 6.94 | 6.46 | 4.20 |
| 5.49 | 4.07 | 3.47 |
| 6.42 | 6.43 | 2.99 |
| 6.88 | 6.02 | 4.26 |
| 6.27 | 5.45 | 3.83 |
| 6.58 | 6.60 | 3.43 |
| 6.90 | 6.60 | 3.94 |

Future Promotional Planning Report
Event: Diffuser
Begin Date: 8/20/2001
End Date: 9/16/2001
UserID: Tom B
Report Date: 6/28/2001

| Dept | Number | Description | Promo | SRP | All Stores Future (units) | All Stores Future Revenue (dollars) |
|---|---|---|---|---|---|---|
| 001 | 121072 | DIFFUSER ROOM | Launch - Non-price Intro | $15.00 | 854 | $12,815.11 |
| 001 | 121102 | BRUSH FACE OVAL ACRYL | Launch - Non-price Intro | $5.00 | 2,869 | $14,344.16 |
| 001 | 121105 | BRUSH FOLDING WITH MIRROR | Launch - Non-price Intro | $5.00 | 2,859 | $14,297.25 |
| 001 | 121111 | BUFFER FACE LOOFAH S/12.. | Launch - Non-price Intro | $4.50 | 4,087 | $18,390.26 |
| 001 | 121120 | GLOVES MOISTURE NTRL | Launch - Non-price Intro | $10.00 | 1,910 | $19,099.86 |
| 001 | 121167 | BRUSH HAIR ALUM SM 3.3cm. | Launch - Non-price Intro | $10.00 | 1,051 | $10,508.76 |
| 001 | 121168 | BRUSH HAIR ALUM LG 4cm. | Launch - Non-price Intro | $12.00 | 923 | $11,071.57 |
| 001 | 121513 | SPONGE PVA SEA BODY | Launch - Non-price Intro | $10.00 | 2,510 | $25,097.62 |
| 005 | 144699 | EYE STICK CLOVE WHEAT KIT | Coordinate - Non-price Feature | $15.00 | 5,941 | $89,120.69 |
| 005 | 144701 | EYE STICK OLIVE OATMEAL KIT | Coordinate - Non-price Feature | $15.00 | 4,473 | $67,092.77 |
| 005 | 148618 | Tint & Shine Bronze | Coordinate - Non-price Feature | $15.00 | 2,962 | $44,428.06 |
| 005 | 148619 | Tint & Shine Plum | Coordinate - Non-price Feature | $15.00 | 3,901 | $58,514.93 |
| 005 | 148620 | Tint & Shine Rose | Coordinate - Non-price Feature | $15.00 | 5,021 | $75,322.10 |
| 012 | 120703 | LIP BALM MANDARIN BORN LIPPY | Promotion - X for $ (<=25%) | $5.00 | 5,795 | $24,630.65 |
| 012 | 120705 | LIP BALM STRWBRY BORN LIPPY | Promotion - X for $ (<=25%) | $5.00 | 7,912 | $33,628.98 |
| 012 | 120706 | LIP BALM LIME BORN LIPPY. | Promotion - X for $ (<=25%) | $5.00 | 3,907 | $16,603.77 |
| 012 | 120707 | LIP BALM PASSIONBERRY | Promotion - X for $ (<=25%) | $5.00 | 6,970 | $29,624.27 |

| All Stores Lost Sales Future (units) | All Stores Lost Sales Future (dollars) | All Stores SRP Gross Margin (percent) | All Stores Actual Gross Margin (percent) | Starting Inventory All Stores & DC (units) | Ending Inventory All Stores & DC (units) | First Day PQ Low Vol Store (units) | First Day PQ Med Vol Store (units) | First Day PQ High Vol Store (units) |
|---|---|---|---|---|---|---|---|---|
| 0 | $9.25 | 76.07% | 76.07% | 1,403 | 61 | 5 | 5 | 14 |
| 4 | $19.00 | 81.20% | 81.20% | 5,315 | 8,215 | 8 | 8 | 8 |
| 9 | $45.45 | 85.00% | 85.00% | 13,871 | 11,451 | 8 | 8 | 8 |
| 106 | $477.74 | 87.33% | 87.33% | 7,153 | 4,245 | 8 | 8 | 12 |
| 15 | $150.18 | 81.00% | 81.00% | 4,315 | 5,321 | 4 | 18 | 28 |
| 1 | $9.87 | 71.40% | 71.40% | 2,819 | 2,079 | 4 | 4 | 6 |
| 3 | $13.62 | 69.33% | 69.33% | 2,035 | 1,209 | 5 | 9 | 12 |
| 3 | $28.09 | 71.40% | 71.40% | 5,810 | 9,145 | 6 | 6 | 5 |
| 7 | $99.22 | 88.47% | 88.47% | 16,341 | 11,320 | 6 | 8 | 12 |
| 5 | $69.39 | 88.47% | 88.47% | 12,591 | 8,748 | 8 | 8 | 14 |
| 1 | $58.37 | 80.93% | 80.93% | 6,058 | 3,324 | 13 | 13 | 26 |
| 1 | $71.77 | 80.93% | 80.93% | 7,947 | 4,508 | 13 | 13 | 26 |
| 2 | $96.76 | 80.93% | 80.93% | 9,637 | 5,480 | 13 | 13 | 26 |
| 7 | $38.83 | 87.20% | 84.94% | 8,531 | 22,840 | 24 | 44 | 44 |
| 170 | $728.48 | 87.20% | 84.94% | 7,880 | 30,298 | 24 | 44 | 56 |
| 4 | $18.53 | 87.20% | 84.94% | 12,913 | 18,464 | 36 | 44 | 56 |
| 8 | $39.87 | 87.20% | 84.94% | 8,665 | 2,314 | 36 | 56 | 64 |

Figure 8

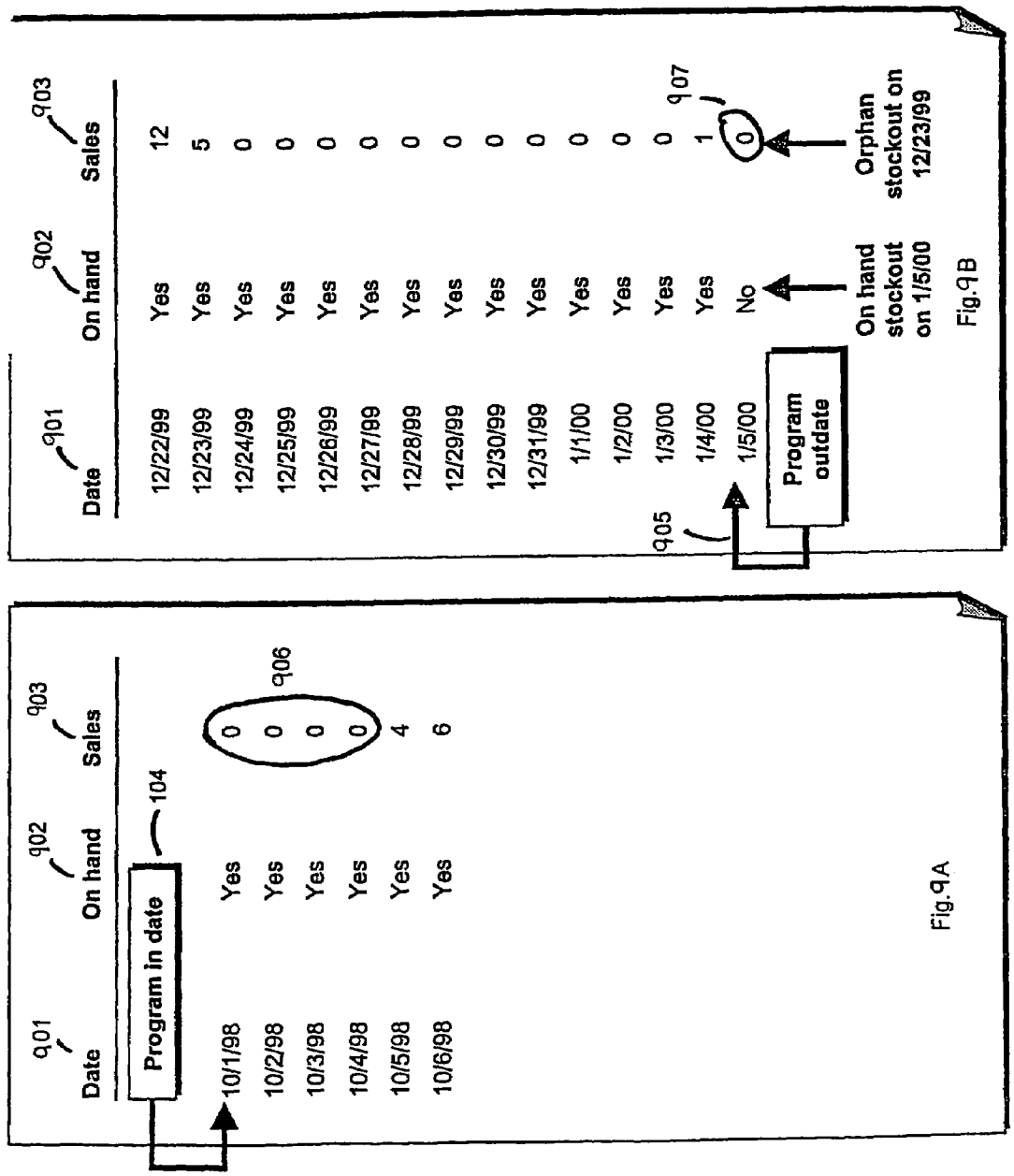

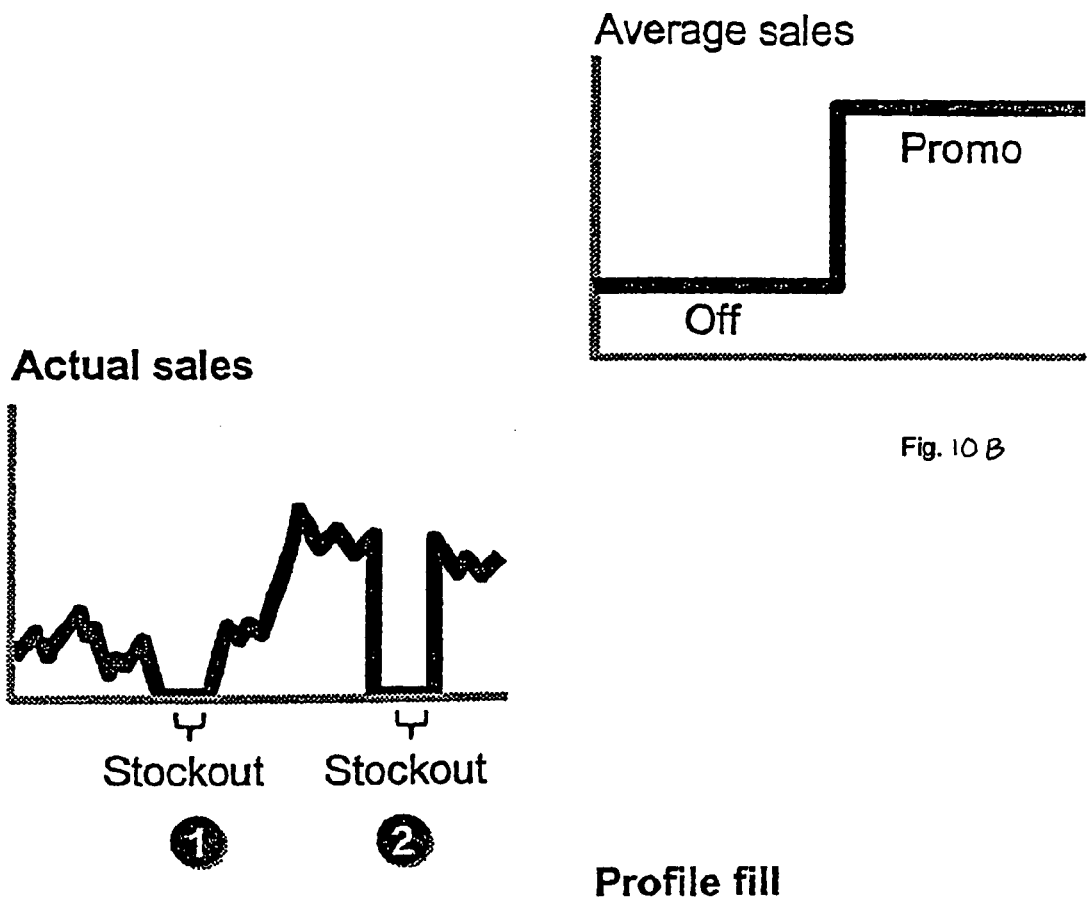
Fig. 10 B
Fig. 10 A
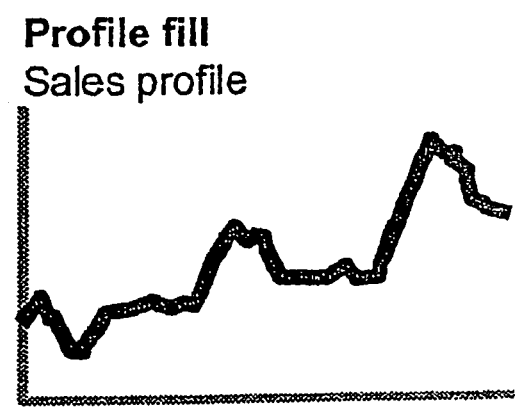
Fig. 10 C

| Location | Location Name | Unit Fraction |
|---|---|---|
| 0001 | BROADWAY 1 | 0.00681708 |
| 0002 | PARAMUS | 0.00649245 |
| 0003 | TYSON'S CORNER | 0.00827788 |
| 0004 | MONTGOMERY MALL | 0.00486934 |
| 0005 | LEXINGTON | 0.00584321 |
| 0006 | NEW MADISON AVENUE | 0.00486934 |
| 0007 | BROADWAY 2 | 0.00714170 |
| 0008 | ROCKAWAY | 0.00470703 |
| 0009 | GEORGETOWN | 0.00324623 |
| 0010 | EMERALD SQUARE | 0.00389547 |
| 0011 | WOODBRIDGE | 0.00600552 |
| 0012 | MALL OF NEW HAMPSHIRE | 0.00097387 |
| 0013 | FASHION CENTER | 0.00811557 |
| 0014 | MANHATTAN MALL | 0.01119948 |
| 0016 | STATEN ISLAND | 0.00714170 |
| 0017 | LAKESIDE MALL | 0.00292160 |
| 0018 | PHEASANT LANE | 0.00405778 |
| 0019 | WILLOWBROOK, NJ | 0.00876481 |
| 0020 | SOUTHSTREET | 0.00275929 |
| 0021 | FAIRLANE TOWN CENTER | 0.00373316 |
| 0022 | TWELVE OAKS | 0.00535627 |

FASHION MODEL STOCK REPORT: ONE ITEM ALL LOCATIONS
12010 NATURAL FACE ENHANCER

| STB Location Number | STB Location Description | In Date | Out Date | Activity Cycle End | Profile Name | Hart Share (percent) (units) | Group Sales Share (percent) | Hervalie Mdl Share (percent) | Cumulative Sales Mdl Sbd (units) | (units) |
|---|---|---|---|---|---|---|---|---|---|---|
| 1 | BROADWAY 1 | 3/4/00 | 9/30/00 | 9/30/00 | Space Jun | 0 | 0.007915 | 0.006251 | 0.007915 | 94.97428 | 0 |
| 2 | PARAMUS | 3/4/00 | 9/30/00 | 9/30/00 | Space Jun | 0 | 0.001979 | 0.003525 | 0.001979 | 23.74357 | 0 |
| 3 | TYSONS CORNER | 3/4/00 | 9/30/00 | 9/30/00 | Space Jun | 0 | 0.004296 | 0.006178 | 0.004296 | 51.55747 | 0 |
| 4 | MONTGOMERY MALL | 3/4/00 | 9/30/00 | 9/30/00 | Space Jun | 0 | 0.002996 | 0.002985 | 0.002996 | 35.95455 | 0 |
| 5 | LEXINGTON | 3/4/00 | 9/30/00 | 9/30/00 | Space Jun | 0 | 0.005597 | 0.005214 | 0.005597 | 67.16038 | 0 |
| 6 | NEW MADISON AVENUE | 3/4/00 | 9/30/00 | 9/30/00 | Space Jun | 0 | 0.006727 | 0.005717 | 0.006727 | 80.72814 | 0 |
| 7 | BROADWAY 2 | 3/4/00 | 9/30/00 | 9/30/00 | Space Jun | 0 | 0.007293 | 0.006687 | 0.007293 | 87.51201 | 0 |
| 8 | ROCKAWAY | 3/4/00 | 9/30/00 | 9/30/00 | Space Jun | 0 | 0.00277 | 0.003761 | 0.00277 | 33.241 | 0 |
| 9 | GEORGETOWN | 3/4/00 | 9/30/00 | 9/30/00 | Space Jun | 0 | 0.004636 | 0.003871 | 0.004636 | 55.62779 | 0 |
| 10 | EMERALD SQUARE | 3/4/00 | 9/30/00 | 9/30/00 | Space Jun | 0 | 0.0026 | 0.002662 | 0.0026 | 31.20583 | 0 |
| 11 | WOODBRIDGE | 3/4/00 | 9/30/00 | 9/30/00 | Space Jun | 0 | 0.003957 | 0.005198 | 0.003957 | 47.46714 | 0 |
| 12 | MALL OF NEW HAMPSHIRE | 3/4/00 | 9/30/00 | 9/30/00 | Space Jun | 0 | 0.003618 | 0.002337 | 0.003618 | 43.41681 | 0 |
| 13 | FASHION CENTER | 3/4/00 | 9/30/00 | 9/30/00 | Space Jun | 0 | 0.004014 | 0.008867 | 0.004014 | 48.16553 | 0 |
| 14 | MANHATTAN MALL | 3/4/00 | 9/30/00 | 9/30/00 | Space Jun | 0 | 0.008932 | 0.011559 | 0.008932 | 107.1853 | 0 |
| 16 | STATEN ISLAND | 3/4/00 | 9/30/00 | 9/30/00 | Space Jun | 0 | 0.004523 | 0.003954 | 0.004523 | 54.27102 | 0 |
| 17 | LAKESIDE MALL | 3/4/00 | 9/30/00 | 9/30/00 | Space Jun | 0 | 0.002205 | 0.003923 | 0.002205 | 26.45712 | 0 |
| 18 | PHEASANT LANE | 3/4/00 | 9/30/00 | 9/30/00 | Space Jun | 0 | 0.002544 | 0.002619 | 0.002544 | 30.52745 | 0 |
| 19 | WILLOWBROOK, NJ | 3/4/00 | 9/30/00 | 9/30/00 | Space Jun | 0 | 0.004127 | 0.006049 | 0.004127 | 49.5223 | 0 |
| 20 | SOUTH STREET | 3/4/00 | 9/30/00 | 9/30/00 | Space Jun | 0 | 0.004466 | 0.004645 | 0.004466 | 53.59263 | 0 |
| 21 | FAIRLANE TOWN CENTER | 3/4/00 | 9/30/00 | 9/30/00 | Space Jun | 0 | 0.00147 | 0.002879 | 0.00147 | 17.63808 | 0 |
| 22 | TWELVE OAKS | 3/4/00 | 9/30/00 | 9/30/00 | Space Jun | 0 | 0.00277 | 0.004052 | 0.00277 | 33.241 | 0 |
| 23 | BURLINGTON MALL | 3/4/00 | 9/30/00 | 9/30/00 | Space Jun | 0 | 0.006614 | 0.007451 | 0.006614 | 79.37136 | 0 |
| 24 | WHITE MARSH | 3/4/00 | 9/30/00 | 9/30/00 | Space Jun | 0 | 0.002148 | 0.002741 | 0.002148 | 25.77873 | 0 |

Fig. 16

DISTRO REPORT LOW ITEM ALL LOCATIONS
NATURAL FACE ENHANCER

| STS Location Description | Distribution Distribution Date | Mat Type | Bi Date | Activity Cycle End Date | Current Present Adj Shipment Stock Total (units) (units) | | Cat 4 Projected Shipment (units) | Brilliant Shipment (units) | Cost (Shipment) (dollars) | Pro Isohoton | Clear Distro Minimum | Insufficient PCs |
|---|---|---|---|---|---|---|---|---|---|---|---|---|
| 1. BROADWAY 1 | 1/24/00 | Last Distro | 3/4/00 | 9/30/00 | 94.9743 | 0 | 94.9743 | 94 | 94 | Y | Y | N |
| 2. PARAMUS | 1/24/00 | Last Distro | 3/4/00 | 9/30/00 | 23.7436 | 0 | 23.7436 | 24 | 24 | Y | Y | N |
| 3. TYSON'S CORNER | 1/24/00 | Last Distro | 3/4/00 | 9/30/00 | 51.5575 | 0 | 51.5575 | 51 | 51 | Y | Y | N |
| 4. MONTGOMERY MALL | 1/24/00 | Last Distro | 3/4/00 | 9/30/00 | 35.9545 | 0 | 35.9545 | 36 | 36 | Y | Y | N |
| 5. LEXINGTON | 1/24/00 | Last Distro | 3/4/00 | 9/30/00 | 67.1604 | 0 | 67.1604 | 67 | 67 | Y | Y | N |
| 6. NEW MADISON AVENUE | 1/24/00 | Last Distro | 3/4/00 | 9/30/00 | 80.7281 | 0 | 80.7281 | 80 | 80 | Y | Y | N |
| 7. BROADWAY 2 | 1/24/00 | Last Distro | 3/4/00 | 9/30/00 | 87.512 | 0 | 87.512 | 87 | 87 | Y | Y | N |
| 8. ROCKAWAY | 1/24/00 | Last Distro | 3/4/00 | 9/30/00 | 33.241 | 0 | 33.241 | 33 | 33 | Y | Y | N |
| 9. GEORGETOWN | 1/24/00 | Last Distro | 3/4/00 | 9/30/00 | 55.6278 | 0 | 55.6278 | 56 | 56 | Y | Y | N |
| 10. EMERALD SQUARE | 1/24/00 | Last Distro | 3/4/00 | 9/30/00 | 31.2058 | 0 | 31.2058 | 31 | 31 | Y | Y | N |
| 11. WOODBRIDGE | 1/24/00 | Last Distro | 3/4/00 | 9/30/00 | 47.4871 | 0 | 47.4871 | 47 | 47 | Y | Y | N |
| 12. MALL OF NEW HAMPSHIRE | 1/24/00 | Last Distro | 3/4/00 | 9/30/00 | 43.4168 | 0 | 43.4168 | 43 | 43 | Y | Y | N |
| 13. FASHION CENTER | 1/24/00 | Last Distro | 3/4/00 | 9/30/00 | 48.1655 | 0 | 48.1655 | 48 | 48 | Y | Y | N |
| 14. MANHATTAN MALL | 1/24/00 | Last Distro | 3/4/00 | 9/30/00 | 107.185 | 0 | 107.185 | 106 | 106 | Y | Y | N |
| 15. STATEN ISLAND | 1/24/00 | Last Distro | 3/4/00 | 9/30/00 | 54.271 | 0 | 54.271 | 54 | 54 | Y | Y | N |
| 17. LAKESIDE MALL | 1/24/00 | Last Distro | 3/4/00 | 9/30/00 | 26.4571 | 0 | 26.4571 | 27 | 27 | Y | Y | N |
| 18. PHEASANT LANE | 1/24/00 | Last Distro | 3/4/00 | 9/30/00 | 30.5274 | 0 | 30.5274 | 31 | 31 | Y | Y | N |
| 19. WILLOWBROOK, NJ | 1/24/00 | Last Distro | 3/4/00 | 9/30/00 | 49.5223 | 0 | 49.5223 | 49 | 49 | Y | Y | N |
| 20. SOUTH STREET | 1/24/00 | Last Distro | 3/4/00 | 9/30/00 | 53.5926 | 0 | 53.5926 | 54 | 54 | Y | Y | N |
| 21. FAIRLANE TOWN CENTER | 1/24/00 | Last Distro | 3/4/00 | 9/30/00 | 17.6381 | 0 | 17.6381 | 18 | 18 | Y | Y | N |
| 22. TWELVE OAKS | 1/24/00 | Last Distro | 3/4/00 | 9/30/00 | 33.241 | 0 | 33.241 | 33 | 33 | Y | Y | N |
| 23. BURLINGTON MALL | 1/24/00 | Last Distro | 3/4/00 | 9/30/00 | 79.3714 | 0 | 79.3714 | 79 | 79 | Y | Y | N |
| 24. WHITE MARSH | 1/24/00 | Last Distro | 3/4/00 | 9/30/00 | 25.7787 | 0 | 25.7787 | 26 | 26 | Y | Y | N |
| 25. FREEHOLD | 1/24/00 | Last Distro | 3/4/00 | 9/30/00 | 28.4923 | 0 | 28.4923 | 29 | 29 | Y | Y | N |
| 26. CHICAGO PLACE | 1/24/00 | Last Distro | 3/4/00 | 9/30/00 | 50.8791 | 0 | 50.8791 | 51 | 51 | Y | Y | N |
| 28. CITY CENTER | 1/24/00 | Last Distro | 3/4/00 | 9/30/00 | 31.8842 | 0 | 31.8842 | 32 | 32 | Y | Y | N |
| 29. TOWER CITY | 1/24/00 | Last Distro | 3/4/00 | 9/30/00 | 24.422 | 0 | 24.422 | 25 | 25 | Y | Y | N |
| 31. BRIARWOOD MALL | 1/24/00 | Last Distro | 3/4/00 | 9/30/00 | 44.7736 | 0 | 44.7736 | 45 | 45 | Y | Y | N |
| 34. CHERRY HILL | 1/24/00 | Last Distro | 3/4/00 | 9/30/00 | 25.7787 | 0 | 25.7787 | 26 | 26 | Y | Y | N |
| 35. CLACKAMAS TOWN CENTER | 1/24/00 | Last Distro | 3/4/00 | 9/30/00 | 40.7033 | 0 | 40.7033 | 41 | 41 | Y | Y | N |
| 36. BUCKLAND HILLS | 1/24/00 | Last Distro | 3/4/00 | 9/30/00 | 30.5274 | 0 | 30.5274 | 31 | 31 | Y | Y | N |

| FORECAST STOCKOUT CORRECTION EXAMPLE - SINGLE STORE | | | | | | | | | | | | | | | | | | | | |
|---|---|---|---|---|---|---|---|---|---|---|---|---|---|---|---|---|---|---|---|---|
| COVERAGE CYCLE | = 17 DAYS | | | | | | | | | | | | | | | | | | | |
| COVERAGE CYCLE FORECAST SALES | = 25 UNITS (PRE STOCKOUT CORRECTION) | | | | | | | | | | | | | | | | | | | |
| STORE STARTING ON HAND | = 5 UNITS | | | | | | | | | | | | | | | | | | | |
| STORE STARTING INTRANSIT | = 0 UNITS | | | | | | | | | | | | | | | | | | | |
| | DAY | | | | | | | | | | | | | | | | | | | |
| | 0 | 1 | 2 | 3 | 4 | 5 | 6 | 7 | 8 | 9 | 10 | 11 | 12 | 13 | 14 | 15 | 16 | 17 | TOTAL |
| ON HAND (END OF DAY) | 5 | 4 | 3 | 2 | 1 | 0 | 0 | 0 | 0 | 0 | 0 | ++ | ++ | ++ | ++ | ++ | ++ | ++ | | |
| INTRANSIT (END OF DAY) | 0 | 0 | 0 | 0 | 0 | 0 | 0 | 0 | 0 | 0 | 0 | 0 | 0 | 0 | 0 | 0 | 0 | 0 | | |
| DISTRIBUTION ARRIVAL (BEGINNING OF DAY) | | | | | | | | | | | | XX | | | | | | | | |
| FORECAST SALES (100% INSTOCK) | | 1 | 1 | 1 | 1 | 1 | 1 | 2 | 2 | 2 | 2 | 3 | 3 | 1 | 1 | 1 | 1 | 1 | 25 |
| FORECAST SALES (STOCKOUT CORRECTED) | | 1 | 1 | 1 | 1 | 1 | 0 | 0 | 0 | 0 | 0 | 3 | 3 | 1 | 1 | 1 | 1 | 1 | 16 |

FIG. 30

| FORECAST STOCKOUT CORRECTION EXAMPLE - SINGLE STORE WITH BACKORDER CONVERSION | | | | | | | | | | | | | | | | | | | |
|---|---|---|---|---|---|---|---|---|---|---|---|---|---|---|---|---|---|---|---|
| COVERAGE CYCLE | = 17 DAYS | | | | | | | | | | | | | | | | | | |
| COVERAGE CYCLE FORECAST SALES | = 25 UNITS (PRE STOCKOUT CORRECTION) | | | | | | | | | | | | | | | | | | |
| STORE STARTING ON HAND | = 5 UNITS | | | | | | | | | | | | | | | | | | |
| STORE STARTING INTRANSIT | = 0 UNITS | | | | | | | | | | | | | | | | | | |
| STOCKOUT TO BACKORDER CONVERSION | = 33 PERCENT | | | | | | | | | | | | | | | | | | |

| | DAY | | | | | | | | | | | | | | | | | | TOTAL |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | |
| ON HAND (END OF DAY) | 5.0 | 4.0 | 3.0 | 2.0 | 1.0 | 0.0 | 0.0 | 0.0 | 0.0 | 0.0 | 0.0 | ++ | ++ | ++ | ++ | ++ | ++ | ++ | |
| INTRANSIT (END OF DAY) | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | |
| DISTRIBUTION ARRIVAL (BEGINNING OF DAY) | | | | | | | | | | | | XX | | | | | | | |
| FORECAST SALES (100% INSTOCK) | | 1.0 | 1.0 | 1.0 | 1.0 | 1.0 | 1.0 | 2.0 | 2.0 | 2.0 | 2.0 | 3.0 | 3.0 | 1.0 | 1.0 | 1.0 | 1.0 | 1.0 | 25.0 |
| FORECAST SALES (STOCKOUT CORRECTED) | | 1.0 | 1.0 | 1.0 | 1.0 | 1.0 | 0.0 | 0.0 | 0.0 | 0.0 | 0.0 | 3.0 | 3.0 | 1.0 | 1.0 | 1.0 | 1.0 | 1.0 | 16.0 |
| FORECAST SALES (WITH BACKORDER CONVERSION) | | 1.0 | 1.0 | 1.0 | 1.0 | 1.0 | 0.3 | 0.7 | 0.7 | 0.7 | 0.7 | 3.0 | 3.0 | 1.0 | 1.0 | 1.0 | 1.0 | 1.0 | 19.0 |
| FORECAST SALES (WITH BACKORDER CONVERSION AND BACKORDER DELIVERY LOG) | | 1.0 | 1.0 | 1.0 | 1.0 | 1.0 | 0.0 | 0.0 | 0.0 | 0.0 | 0.0 | 6.0 | 3.0 | 1.0 | 1.0 | 1.0 | 1.0 | 1.0 | 19.0 |

FIG. 31

| ON HAND OVERSTOCK CORRECTION EXAMPLE - TWO STORES | | | | | | | | | | | | | | | | | | | | |
|---|---|---|---|---|---|---|---|---|---|---|---|---|---|---|---|---|---|---|---|---|
| COVERAGE CYCLE | = 17 DAYS | | | | | | | | | | | | | | | | | | | |
| COVERAGE CYCLE FORECAST SALES | = 25 UNITS (PRE STOCKOUT CORRECTION) | | | | | | | | | | | | | | | | | | | |
| STORE STARTING ON HAND | = 5 UNITS | | | | | | | | | | | | | | | | | | | |
| STORE STARTING INTRANSIT | = 0 UNITS | | | | | | | | | | | | | | | | | | | |
| | DAY | | | | | | | | | | | | | | | | | | | |
| | 0 | 1 | 2 | 3 | 4 | 5 | 6 | 7 | 8 | 9 | 10 | 11 | 12 | 13 | 14 | 15 | 16 | 17 | | TOTAL |
| STORE 1 | | | | | | | | | | | | | | | | | | | | |
| ON HAND (END OF DAY) | 5 | 4 | 3 | 2 | 1 | 0 | 0 | 0 | 0 | 0 | 0 | ++ | ++ | ++ | ++ | ++ | ++ | ++ | | |
| INTRANSIT (END OF DAY) | 0 | 0 | 0 | 0 | 0 | 0 | 0 | 0 | 0 | 0 | 0 | 0 | 0 | 0 | 0 | 0 | 0 | 0 | | |
| DISTRIBUTION ARRIVAL (BEGINNING OF DAY) | | | | | | | | | | | | XX | | | | | | | | |
| FORECAST SALES (100% INSTOCK) | | 1 | 1 | 1 | 1 | 1 | 1 | 2 | 2 | 2 | 2 | 3 | 3 | 1 | 1 | 1 | 1 | 1 | | 25 |
| FORECAST SALES (STOCKOUT CORRECTED) | | 1 | 1 | 1 | 1 | 1 | 0 | 0 | 0 | 0 | 0 | 3 | 3 | 1 | 1 | 1 | 1 | 1 | | 16 |
| STORE 2 | | | | | | | | | | | | | | | | | | | | |
| ON HAND (END OF DAY) | 45 | 44 | 43 | 42 | 41 | 40 | 39 | 37 | 35 | 33 | 31 | 28 | 25 | 24 | 23 | 22 | 21 | 20 | | |
| INTRANSIT (END OF DAY) | 0 | 0 | 0 | 0 | 0 | 0 | 0 | 0 | 0 | 0 | 0 | 0 | 0 | 0 | 0 | 0 | 0 | 0 | | |
| DISTRIBUTION ARRIVAL (BEGINNING OF DAY) | | | | | | | | | | | | XX | | | | | | | | |
| FORECAST SALES (100% INSTOCK) | | 1 | 1 | 1 | 1 | 1 | 1 | 2 | 2 | 2 | 2 | 3 | 3 | 1 | 1 | 1 | 1 | 1 | | 25 |
| FORECAST SALES (STOCKOUT CORRECTED) | | 1 | 1 | 1 | 1 | 1 | 1 | 2 | 2 | 2 | 2 | 3 | 3 | 1 | 1 | 1 | 1 | 1 | | 25 |
| TOTAL | | | | | | | | | | | | | | | | | | | | |
| ON HAND (END OF DAY) | 50 | | | | | | | | | | | | | | | | | | | |

| Item Identifier | Location Identifier | Date range identifier | | |
|---|---|---|---|---|
| | | 10/12/2000 - 11/1/2000 | 11/2/2000 - 11/14/2000 | 11/15/2000 - 11/24/2000 |
| 921 | 301 | 5 | 10 | 12 |
| 921 | 302 | 6 | 11 | 9 |
| 921 | 303 | 8 | 13 | 11 |
| 921 | 304 | 5 | 10 | 15 |
| 921 | 305 | 5 | 10 | 12 |
| 922 | 301 | 8 | 13 | 18 |
| 922 | 302 | 9 | 14 | 19 |
| 922 | 303 | 11 | 16 | 18 |
| 922 | 304 | 8 | 13 | 23 |
| 922 | 305 | 8 | 13 | 11 |
| . | . | . | . | . |
| . | . | . | . | . |
| 102490 | 305 | 15 | 20 | 31 |

Table 3605 (3620, 3608):

| Fixture Identifier | Item Identifier | Date range identifier | | |
|---|---|---|---|---|
| | | 10/12/2000 – 11/1/2000 | 11/1/2000 – 11/14/2000 | 11/15/2000 – 11/24/2000 |
| table 1 | 921 | 5 | 10 | 12 |
| table 1 | 922 | 3 | 8 | 6 |
| ... | ... | ... | ... | ... |
| table 1 | 102490 | 8 | 12 | 22 |
| table 1a | 921 | 6 | 11 | 9 |
| table 1a | 922 | 3 | 8 | 13 |
| ... | ... | ... | ... | ... |
| table 1a | 102490 | 15 | 20 | 31 |
| table 2 | 921 | 8 | 13 | 11 |
| table 2 | 922 | 3 | 8 | 13 |
| ... | ... | ... | ... | ... |
| table 2 | 102490 | 15 | 20 | 31 |
| ... | ... | ... | ... | ... |
| wall 56 | 921 | 6 | 11 | 13 |
| ... | ... | ... | ... | ... |
| wall 56 | 102490 | 15 | 20 | 31 |

Table 3650 (3620, 3625):

| Location Identifier | Fixture Identifier |
|---|---|
| 301 | table 1 |
| ... | ... |
| 301 | wall 56 |
| 305 | wall 56 |

Table 3651 (3620, 3625):

| Location Identifier | table 1 | table 1a | table 2 | ... | wall 56 |
|---|---|---|---|---|---|
| 301 | 1 | 0 | 0 | ... | 1 |
| 302 | 0 | 1 | 0 | ... | 1 |
| 303 | 0 | 1 | 1 | ... | 0 |
| 304 | 0 | 0 | 0 | ... | 1 |
| 305 | 0 | 0 | 0 | ... | 0 |

OTB DEPARTMENT REPORT
Activity: Class 0053
UserID: 'RAYL'
Report date: 8/6/2000

| Month | BOM Inventory (dollars) | Firm Receipts (dollars) | Permanent Markdowns (dollars) | Promotional Discounts (dollars) | SRP Change (dollars) | Other Discounts (dollars) | Sales (dollars) | EOM Inventory (dollars) | Inventory Budget (dollars) | Actual OTB (dollars) |
|---|---|---|---|---|---|---|---|---|---|---|
| August-00 | $8,631,589 | $1,734,905 | $0 | $24,390 | $0 | $3,021 | $1,494,350 | $8,844,733 | $8,871,030 | $26,297 |
| September-00 | $8,844,733 | $1,581,986 | $0 | $20,897 | $0 | $4,032 | $1,759,694 | $8,642,097 | $8,935,700 | $293,603 |
| October-00 | $8,642,097 | $592,218 | $8,900 | $10,982 | -$50,235 | $2,109 | $1,683,099 | $7,579,459 | $9,353,890 | $1,774,431 |
| November-00 | $7,579,459 | $435,480 | $13,500 | $20,893 | $0 | $4,875 | $1,713,946 | $6,261,726 | $9,875,040 | $3,613,314 |
| December-00 | $6,261,726 | $0 | $59,803 | $30,235 | $0 | $6,054 | $2,306,772 | $3,858,861 | $9,104,530 | $5,245,669 |
| January-01 | $3,858,861 | $0 | $4,031 | $0 | $0 | $2,971 | $1,801,433 | $2,050,426 | $9,012,500 | $6,962,074 |
| February-01 | $9,264,921 | $0 | $15,092 | $24,874 | $0 | $2,391 | $1,627,106 | $9,284,159 | $9,324,000 | $8,943,036 |
| March-01 | $9,326,516 | $0 | $0 | $0 | $0 | $3,243 | $1,801,438 | $9,370,479 | $9,245,000 | $9,245,000 |
| April-01 | $9,373,722 | $0 | $0 | $9,086 | $0 | $2,165 | $1,743,327 | $9,440,653 | $9,378,600 | $9,378,600 |
| May-01 | $9,451,904 | $0 | $0 | $0 | $0 | $3,198 | $1,801,438 | $9,569,508 | $9,458,900 | $9,458,900 |
| June-01 | $9,572,706 | $0 | $31,093 | $12,094 | $0 | $2,356 | $1,743,327 | $9,259,896 | $9,210,020 | $9,210,020 |
| July-01 | $9,305,439 | $0 | $0 | $0 | $0 | $2,642 | $1,801,438 | $9,171,738 | $9,198,000 | $9,198,000 |
|  | ↑ 4420 | ↑ 4421 | ↑ 4422 | ↑ 4423 | ↑ 4424 | ↑ 4425 | ↑ 4426 | ↑ 4427 | ↑ 4428 | ↑ 4429 |

Figure 44

OTB ITEM REPORT
Activity:  Class 0063
UserID:  'RAYL'
Report date: 8/6/2000

| SKU number | SKU Description | Month | Actual BOM Inventory (dollars) | Stat BOM Inventory (dollars) | Firm Receipts (dollars) | Notional Receipts (dollars) | Permanent Markdowns (dollars) | Promotional Discounts (dollars) | SRP Change (dollars) |
|---|---|---|---|---|---|---|---|---|---|
| 90421 | 15 - 34 Mens White Pinpoint Oxford Shirt | August-00 | $198,527 | $198,527 | $40,594 | $0 | $0 | $561 | $0 |
| 90421 | 15 - 34 Mens White Pinpoint Oxford Shirt | September-00 | $204,120 | $204,120 | $41,756 | $0 | $0 | $481 | $0 |
| 90421 | 15 - 34 Mens White Pinpoint Oxford Shirt | October-00 | $204,830 | $204,830 | $45,287 | $0 | $205 | $253 | -$1,155 |
| 90421 | 15 - 34 Mens White Pinpoint Oxford Shirt | November-00 | $212,055 | $212,055 | $0 | $44,244 | $311 | $481 | $0 |
| 90421 | 15 - 34 Mens White Pinpoint Oxford Shirt | December-00 | $171,731 | $215,975 | $0 | $28,019 | $1,375 | $695 | $0 |
| 90421 | 15 - 34 Mens White Pinpoint Oxford Shirt | January-01 | $116,465 | $188,729 | $0 | $34,967 | $93 | $0 | $0 |
| 90421 | 15 - 34 Mens White Pinpoint Oxford Shirt | February-01 | $74,871 | $182,102 | $0 | $38,840 | $347 | $572 | $0 |
| 90421 | 15 - 34 Mens White Pinpoint Oxford Shirt | March-01 | $36,473 | $182,544 | $0 | $42,519 | $0 | $0 | $0 |
| 90421 | 15 - 34 Mens White Pinpoint Oxford Shirt | April-01 | $0 | $183,556 | $0 | $41,895 | $0 | $209 | $0 |
| 90421 | 15 - 34 Mens White Pinpoint Oxford Shirt | May-01 | $0 | $185,095 | $0 | $44,212 | $0 | $0 | $0 |
| 90421 | 15 - 34 Mens White Pinpoint Oxford Shirt | June-01 | $0 | $187,800 | $0 | $33,949 | $715 | $278 | $0 |
| 90421 | 15 - 34 Mens White Pinpoint Oxford Shirt | July-01 | $0 | $180,605 | $0 | $38,419 | $0 | $0 | $0 |

| Other Discounts (dollars) | Sales (dollars) | Actual EOM Inventory (dollars) | Stat EOM Inventory (dollars) | Inventory Budget (dollars) | Actual OTB (dollars) | Statistical OTB (dollars) | Lost Sales (dollars) | Statistical Overstock (dollars) | Statistical Overstock With PO (dollars) | Statistical Overstock Above MOQ (dollars) | Statistical Overstock Above MOQ with PO (dollars) |
|---|---|---|---|---|---|---|---|---|---|---|---|
| $69 | $34,370 | $204,120 | $204,120 | $205,000 | $880 | $880 | $4,058 | $0 | $0 | $0 | $0 |
| $93 | $40,473 | $204,830 | $204,830 | $205,615 | $785 | $785 | $4,326 | $0 | $0 | $0 | $0 |
| $49 | $38,711 | $212,055 | $212,055 | $215,025 | $2,970 | $2,970 | $3,014 | $0 | $0 | $0 | $0 |
| $112 | $39,421 | $171,731 | $215,975 | $230,010 | -$30,210 | $14,035 | $0 | $0 | $0 | $0 | $0 |
| $139 | $53,056 | $116,465 | $188,729 | $207,471 | -$53,521 | $18,742 | $0 | $0 | $0 | $0 | $0 |
| $68 | $41,433 | $74,871 | $182,102 | $209,094 | -$80,239 | $26,992 | $0 | $0 | $0 | $0 | $0 |
| $55 | $37,423 | $36,473 | $182,544 | $212,350 | -$116,265 | $29,806 | $0 | $0 | $0 | $0 | $0 |
| $75 | $41,433 | $0 | $183,556 | $214,474 | -$157,672 | $30,918 | $0 | $0 | $0 | $0 | $0 |
| $50 | $40,097 | $0 | $185,095 | $216,618 | -$216,618 | $31,523 | $0 | $0 | $0 | $0 | $0 |
| $74 | $41,433 | $0 | $187,800 | $218,784 | -$218,784 | $30,985 | $0 | $0 | $0 | $0 | $0 |
| $54 | $40,097 | $0 | $180,605 | $220,972 | -$220,972 | $40,367 | $0 | $0 | $0 | $0 | $0 |
| $61 | $41,433 | $0 | $177,530 | $223,182 | -$223,182 | $45,652 | $0 | $0 | $0 | $0 | $0 |

Figure 45

OTB DEPARTMENT REPORT
Activity: Class 0053
UserID: 'RAYL'
Report date: 8/6/2000

| Month | Actual BOM Inventory (dollars) | Stat BOM Inventory (dollars) | Firm Receipts (dollars) | Notional Receipts (dollars) | Permanent Markdowns (dollars) | Promotional Discounts (dollars) | SRP Change (dollars) | Other Discounts (dollars) |
|---|---|---|---|---|---|---|---|---|
| August-00 | $8,631,589 | $8,631,589 | $1,734,905 | $30,036 | $0 | $24,390 | $0 | $3,021 |
| September-00 | $8,844,733 | $8,874,769 | $1,581,986 | $233,501 | $0 | $20,897 | $0 | $4,032 |
| October-00 | $8,642,097 | $8,905,633 | $592,218 | $1,407,321 | $8,900 | $10,982 | -$50,235 | $2,109 |
| November-00 | $7,579,459 | $9,250,317 | $435,480 | $1,488,193 | $13,500 | $20,893 | $0 | $4,875 |
| December-00 | $6,261,726 | $9,420,776 | $0 | $1,218,220 | $59,803 | $30,235 | $0 | $6,054 |
| January-01 | $3,858,861 | $8,236,131 | $0 | $1,520,318 | $4,031 | $0 | $0 | $2,871 |
| February-01 | $2,050,428 | $7,948,014 | $0 | $1,688,701 | $15,092 | $24,874 | $0 | $2,391 |
| March-01 | $380,964 | $7,967,252 | $0 | $1,848,645 | $0 | $0 | $0 | $3,243 |
| April-01 | $0 | $8,011,216 | $0 | $1,821,510 | $0 | $9,086 | $0 | $2,165 |
| May-01 | $0 | $8,078,147 | $0 | $1,922,240 | $0 | $0 | $0 | $3,198 |
| June-01 | $0 | $8,185,751 | $0 | $1,478,060 | $31,093 | $12,094 | $0 | $2,356 |
| July-01 | $0 | $7,882,940 | $0 | $1,670,380 | $0 | $0 | $0 | $2,642 |
| ← 4610 | ← 4611 | ← 4612 | ← 4613 | ← 4614 | ← 4615 | ← 4616 | ← 4617 | ← 4618 |

| Sales (dollars) | Actual EOM Inventory (dollars) | Stat EOM Inventory (dollars) | Inventory Budget (dollars) | Actual OTB (dollars) | Statistical OTB (dollars) | Lost Sales (dollars) | Statistical Overstock (dollars) | Statistical Overstock With PO (dollars) | Statistical Overstock Above MOQ (dollars) |
|---|---|---|---|---|---|---|---|---|---|
| $1,494,350 | $8,844,733 | $8,874,769 | $8,871,030 | $26,297 | -$3,739 | $176,443 | $2,780,855 | $484,905 | $426,819 |
| $1,759,694 | $8,642,097 | $8,905,633 | $8,935,700 | $293,603 | $30,067 | $166,078 | $2,864,784 | $531,986 | $617,647 |
| $1,683,099 | $7,579,459 | $9,250,317 | $9,353,890 | $1,774,431 | $103,573 | $131,084 | $2,873,907 | $357,218 | $210,759 |
| $1,713,946 | $6,261,726 | $9,420,776 | $9,875,040 | $3,613,314 | $454,264 | $20,712 | $2,573,306 | $215,480 | $94,539 |
| $2,306,772 | $3,858,861 | $8,236,131 | $9,104,530 | $5,245,669 | $868,399 | $1,781 | $2,244,494 | $125,289 | $92,350 |
| $1,801,433 | $2,050,428 | $7,948,014 | $9,012,500 | $6,962,074 | $1,064,486 | $6 | $2,406,190 | $87,930 | $46,449 |
| $1,627,106 | $380,964 | $7,967,252 | $9,324,000 | $8,943,036 | $1,356,748 | $0 | $2,412,804 | $0 | $0 |
| $1,801,438 | $0 | $8,011,216 | $9,245,000 | $9,245,000 | $1,233,784 | $0 | $2,389,028 | $0 | $0 |
| $1,801,438 | $0 | $8,078,147 | $9,378,600 | $9,378,600 | $1,300,453 | $0 | $2,443,946 | $0 | $0 |
| $1,801,438 | $0 | $8,185,751 | $9,458,900 | $9,458,900 | $1,263,149 | $0 | $2,561,743 | $0 | $0 |
| $1,743,327 | $0 | $7,882,940 | $9,210,020 | $9,210,020 | $1,327,080 | $0 | $2,298,082 | $0 | $0 |
| $1,801,438 | $0 | $7,749,240 | $9,198,000 | $9,198,000 | $1,448,760 | $0 | $2,170,372 | $0 | $0 |
| ← 4619 | ← 4620 | ← 4621 | ← 4622 | ← 4623 | ← 4624 | ← 4625 | ← 4626 | ← 4627 | ← 4628 |

Figure 4.6

OTB DEPARTMENT REPORT
Activity: Class 0053
UserID: 'RAYL'
Report date: 8/6/2000

| Month | BOM Inventory (dollars) | Firm Receipts (dollars) | Notional Receipts (dollars) | Permanent Markdowns (dollars) | Promotional Discounts (dollars) | SRP Change (dollars) | Other Discounts (dollars) | Sales (dollars) |
|---|---|---|---|---|---|---|---|---|
| August-00 | $8,631,589 | $1,734,905 | $30,036 | $0 | $24,390 | $0 | $3,021 | $1,494,350 |
| September-00 | $8,874,769 | $1,581,986 | $233,501 | $0 | $20,897 | $0 | $4,032 | $1,759,894 |
| October-00 | $8,905,633 | $592,218 | $1,407,321 | $8,900 | $10,982 | -$50,235 | $2,109 | $1,683,099 |
| November-00 | $9,250,317 | $435,460 | $1,488,193 | $13,500 | $20,893 | $0 | $4,875 | $1,713,946 |
| December-00 | $9,420,776 | $0 | $1,218,220 | $59,803 | $30,235 | $0 | $6,054 | $2,306,772 |
| January-01 | $8,236,131 | $0 | $1,520,318 | $4,031 | $0 | $0 | $2,971 | $1,801,433 |
| February-01 | $7,948,014 | $0 | $1,688,701 | $15,092 | $24,874 | $0 | $2,391 | $1,627,106 |
| March-01 | $7,967,252 | $0 | $1,848,645 | $0 | $0 | $0 | $3,243 | $1,801,438 |
| April-01 | $8,011,216 | $0 | $1,821,510 | $0 | $9,086 | $0 | $2,165 | $1,743,327 |
| May-01 | $8,078,147 | $0 | $1,922,240 | $0 | $0 | $0 | $3,198 | $1,801,438 |
| June-01 | $8,195,751 | $0 | $1,476,060 | $31,093 | $12,094 | $0 | $2,356 | $1,743,327 |
| July-01 | $7,882,940 | $0 | $1,870,380 | $0 | $0 | $0 | $2,642 | $1,801,438 |

← 4710 (Month), 4712 (BOM Inventory), 4713 (Firm Receipts), 4714 (Notional Receipts), 4715 (Permanent Markdowns), 4716 (Promotional Discounts), 4717 (SRP Change), 4718 (Other Discounts), 4719 (Sales)

| EOM Inventory (dollars) | Inventory Budget (dollars) | Actual OTB (dollars) | Statistical OTB (dollars) | Lost Sales (dollars) | Statistical Overstock (dollars) | Statistical Overstock With PO (dollars) | Statistical Overstock Above MOQ (dollars) | Statistical Overstock Above MOQ with PO (dollars) |
|---|---|---|---|---|---|---|---|---|
| $8,874,769 | $8,871,030 | $26,297 | -$3,739 | $176,443 | $2,780,855 | $484,905 | $426,819 | $170,728 |
| $8,905,633 | $8,935,700 | $293,603 | $30,067 | $188,078 | $2,864,784 | $531,986 | $617,647 | $308,823 |
| $9,250,317 | $9,353,890 | $1,774,431 | $103,573 | $131,064 | $2,673,907 | $357,218 | $210,769 | $117,088 |
| $9,420,776 | $9,875,040 | $3,613,314 | $454,264 | $20,712 | $2,573,306 | $215,480 | $94,539 | $52,522 |
| $9,104,530 | $9,245,669 | $5,245,669 | $868,399 | $1,781 | $2,244,494 | $125,289 | $92,350 | $62,765 |
| $9,012,500 | $9,012,500 | $6,962,074 | $1,064,486 | $6 | $2,406,190 | $87,930 | $46,449 | $25,805 |
| $7,948,014 | $9,324,000 | $8,943,036 | $1,356,748 | $0 | $2,412,804 | $0 | $0 | $0 |
| $7,967,252 | $9,245,000 | $9,245,000 | $1,233,784 | $0 | $2,369,028 | $0 | $0 | $0 |
| $8,011,216 | $9,378,600 | $9,378,600 | $1,300,453 | $0 | $2,443,946 | $0 | $0 | $0 |
| $8,078,147 | $9,458,900 | $9,458,900 | $1,263,149 | $0 | $2,561,743 | $0 | $0 | $0 |
| $8,195,751 | $9,210,020 | $9,210,020 | $1,327,080 | $0 | $2,298,062 | $0 | $0 | $0 |
| $7,882,940 | $9,198,000 | $9,198,000 | $1,448,760 | $0 | $2,170,372 | $0 | $0 | $0 |
| $7,749,240 | | | | | | | | |

← 4721 (EOM Inventory), 4722 (Inventory Budget), 4723 (Actual OTB), 4724 (Statistical OTB), 4725 (Lost Sales), 4726 (Statistical Overstock), 4727 (Statistical Overstock With PO), 4728 (Statistical Overstock Above MOQ), 4729 (Statistical Overstock Above MOQ with PO)

Figure 47

OTB DEPARTMENT REPORT
Activity:TBS Dept 12 OTB
UserID: 'AP01C'
Report date: 5/5/2001

| Fiscal Year | Fiscal Month | BOM Inventory (dollars) | Firm Receipts (dollars) | Notional Receipts (dollars) | PERM Markdown (dollars) | Promo Discount (dollars) | Other Change (dollars) | SRP Change (dollars) | Production Need (dollars) | Change In Total Unfilled Production Need (dollars) |
|---|---|---|---|---|---|---|---|---|---|---|
| 2002 | 3 | $14,743,015 | $2,557,658 | $0 | $0 | $21,558 | $0 | $0 | $163,322 | $0 |
| 2002 | 4 | $14,071,372 | $2,566,047 | $0 | $316,663 | $91,417 | $0 | $0 | $202,332 | $83,293 |
| 2002 | 5 | $12,470,927 | $5,879,262 | $1,600,224 | $0 | $150,951 | $0 | $0 | $789,078 | -$34,404 |
| 2002 | 6 | $15,559,873 | $1,698,072 | $1,133,130 | $0 | $49,631 | $0 | $0 | $1,956,573 | -$48,889 |
| 2002 | 7 | $12,497,152 | $561,180 | $1,957,469 | $0 | $59,185 | $0 | $0 | $699,698 | $0 |
| 2002 | 8 | $11,273,057 | $1,055,532 | $2,401,040 | $0 | $10,756 | $0 | $0 | $0 | $0 |
| 2002 | 9 | $11,858,582 | $353,820 | $3,767,586 | $0 | $13,369 | $0 | $0 | $0 | $0 |
| 2002 | 10 | $12,787,073 | $353,820 | $3,914,370 | $0 | $28,868 | $0 | $0 | $0 | $0 |
| 2002 | 11 | $11,286,897 | $353,820 | $3,132,084 | $0 | $763 | $0 | $0 | $0 | $0 |
| 2002 | 12 | $12,119,963 | $250,140 | $2,912,406 | $0 | $0 | $0 | $0 | $0 | $0 |
| 2003 | 1 | $11,732,325 | $0 | $1,987,760 | $0 | $0 | $0 | $0 | $0 | $0 |
| 2003 | 2 | $11,076,576 | $0 | $2,558,016 | $0 | $0 | $0 | $0 | $0 | $0 |

← 4840 (Production Need)
← 4841 (Change In Total Unfilled Production Need)

| Sales (dollars) | All Stores Revenue Budget (dollars) | Inventory at End (dollars) | Present Inventory Budget (dollars) | Actual OTB (dollars) | Stat OTB (dollars) | Lost Sales (dollars) | Total Unfilled Production Need (dollars) | Statistical Overstock (dollars) | Available Statistical Overstock Above MOQ (dollars) |
|---|---|---|---|---|---|---|---|---|---|
| $2,973,852 | $2,816,928 | $14,071,372 | $14,000,000 | -$71,372 | -$71,372 | $206,608 | $0 | $1,203,852 | $0 |
| $3,639,373 | $2,432,167 | $12,470,927 | $12,200,000 | -$270,927 | -$270,927 | $80,258 | $83,293 | $839,028 | $0 |
| $3,416,106 | $2,517,575 | $15,559,873 | $15,800,000 | -$1,360,097 | $240,127 | $42,402 | $48,889 | $521,969 | $0 |
| $3,836,831 | $2,905,285 | $12,497,152 | $12,200,000 | -$3,030,506 | -$297,152 | $128,337 | $0 | $320,984 | $0 |
| $2,983,881 | $1,938,876 | $11,273,057 | $11,400,000 | -$4,563,880 | $126,943 | $77,950 | $0 | $220,897 | $0 |
| $2,860,291 | $1,976,235 | $11,858,582 | $12,000,000 | -$6,950,446 | $141,418 | $284,635 | $0 | $18,984 | $0 |
| $3,179,547 | $3,399,624 | $12,787,073 | $13,000,000 | -$10,646,522 | $212,927 | $151,491 | $0 | $1,003 | $0 |
| $5,739,698 | $6,804,840 | $11,286,897 | $11,500,000 | -$11,146,522 | $213,303 | $63 | $0 | $59 | $0 |
| $2,651,875 | $1,956,154 | $12,119,963 | $12,300,000 | $12,080,000 | $180,037 | $24 | $0 | $0 | $0 |
| $3,550,184 | $2,724,119 | $11,732,325 | $11,900,000 | $11,735,000 | $167,675 | $28 | $0 | $0 | $0 |
| $2,643,510 | $0 | $11,076,576 | $11,300,000 | $11,251,000 | $223,424 | $27 | $0 | $0 | $0 |
| $2,632,780 | $0 | $11,001,811 | $11,300,000 | $11,279,990 | $298,189 | $27 | $0 | $0 | $0 |

← 4842 (Total Unfilled Production Need)

Figure 48

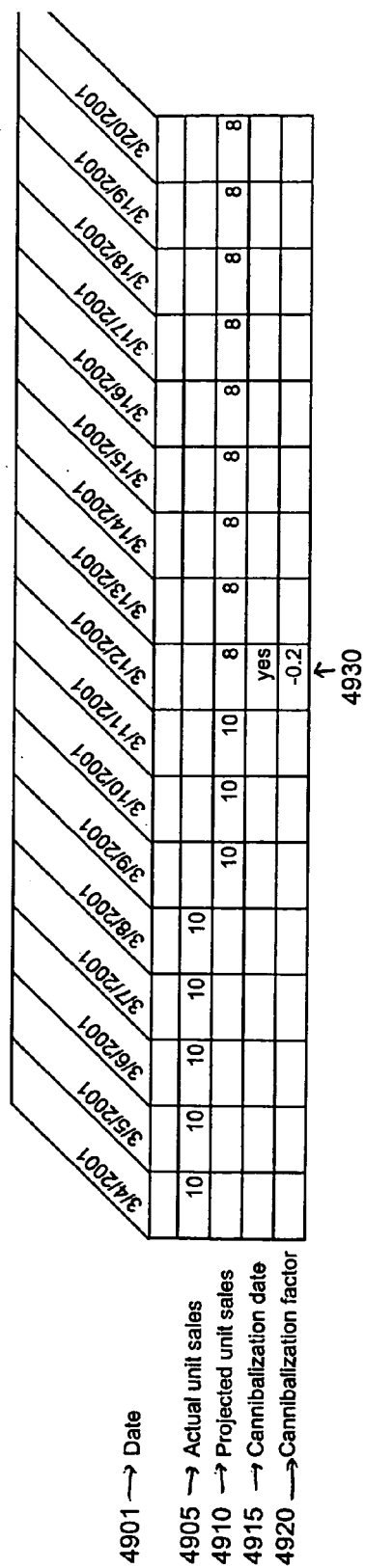
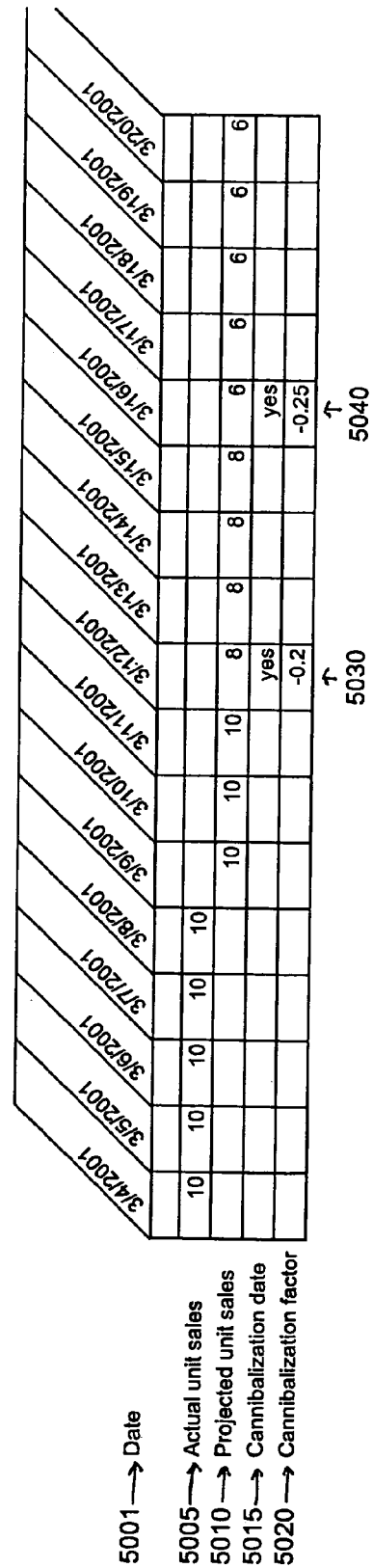
Figure 49
Figure 50

5101 → Date
5105 → Actual unit sales
5110 → Projected unit sales
5115 → Cannibalization date
5120 → Cannibalization factor 5201 → Date
5205 → Actual unit sales
       Past unit sales
5206 → cannibalization adjustment
5210 → Projected unit sales
5215 → Cannibalization date
5220 → Cannibalization factor

US 7,092,929 B1

METHOD AND APPARATUS FOR PLANNING ANALYSIS

RELATED APPLICATION INFORMATION

This application is a continuation-in-part of the following related applications: application Ser. No. 09/888,336, filed 22 Jun. 2001, entitled A Method and Apparatus for OTB Analysis, by inventors Robert Dvorak, Richard W. Pasternack, Ronald Samuel Cope and Beth Li-Ju Chen; application Ser. No. 09/766,539, filed 19 Jan. 2001, entitled Multipurpose Presentation Demand Calendar For Integrated Management Decision Support, by inventor Robert Dvorak; application Ser. No. 09/760,377, filed 12 Jan. 2001, entitled Multipurpose Causal Event Calendar For Integrated Management Decision Support, by inventors Robert Dvorak and Kevin Katari; application Ser. No. 09/755,355, filed 5 Jan. 2001, entitled Method And Apparatus For Supplying Synthetic Sales Histories, by inventors Robert Dvorak and Kevin Katari; application Ser. No. 09/755,635, filed 5 Jan. 2001, entitled Method And Apparatus For Modification Of Basic Good Forecasts, by inventors Robert Dvorak and Kevin Katari; application Ser. No. 09/708,944, filed 8 Nov. 2000, entitled Method And Apparatus For Distribution Of Fashion And Seasonal Goods, by inventor Robert Dvorak. The seven related applications are hereby incorporated by reference.

This application is further related to application Ser. No. 09/905,174, filed 13 Jul. 2001, entitled Method and Apparatus for Handling Disruptive Events and Replacement Items, by inventors Robert Dvorak and Beth Li-Ju Chen, which simultaneously filed application is incorporated herein by reference.

BACKGROUND OF THE INVENTION

Retailers use planning as a mode of driving their business. Two types of planning are, top-down and bottom-up planning. The top-down planning is generally done at reasonably high level in the product hierarchy, such as department (see FIG. 2,) based on many subjective assessments. For example, merchants will assess areas of business they plan to expand, market trends, changes in profitability among product lines and other subjective factors, as the develop a top-down plan. Merchants also develop a middle out or bottom-up plan. Development of these plans often focuses on the class level and works down to the item level or focuses on key items in an assortment.

Computer-implemented planning systems can require an unmanageable amount of user input to create and maintain a plan. Merchants can spend an unjustifiable amount of time making their plan agree with what has actually happened and then re-projecting the future sales, gross margins, inventories and other variables being planned.

An issue therefore arises on how to easily create an accurate plan and maintain it as a selling season progresses. In addressing this issue it is useful to track merchandise at the level where the business really takes place: by item and selling/stocking locations. It is further useful to take into account real world merchandising factors such as promotions, presentations that impact sale or stocking levels, markdowns, stockouts, actual performance against plan and other real world constraints, without overwhelming the planners. One long felt need is to integrate real world considerations with planning and other merchandise management functions. Another long felt need is for an integrated merchandise planning and management system that rolls plans up from the item/location level.

SUMMARY OF THE INVENTION

The present invention includes a computer implemented method of item level and above planning where the plans are dynamically updated using forecasts of item and location sales and inventory needs throughout the supply chain incorporating all the important decisions on how to present, promote, and markdown each item, automatically adjusting forecasts based on real selling results for the item and incorporating the impacts of any known constraints on the sales or inventory needs such as Purchase Orders (POs) not arriving in time to keep the selling locations fully stocked for sale. Aspects of the present invention include analyses based on a variety of ways the projecting future inventory. Aspects of the present invention are reflected in the detailed description, accompanying figures and claims accompanying this summary.

BRIEF DESCRIPTION OF THE DRAWINGS

FIG. 4 is an example item level planning report showing examples of the daily forecasts of Distribution Center and Store total unit inventories, Purchase Order unit deliveries, unit and dollar sales and unit and dollar estimated lost sales.

FIG. 6 is an example department level planning report combining past actual results with forecasted results for the next 12 months. It is generated from rolling up item level reports and then in this case adding department level budget values that are used for comparison to the actual or forecasted comparable numbers.

FIG. 7 is a variation on FIG. 6, with the addition of columns for the budget values. These budget values were created by taking higher product hierarchy values, like those in FIG. 6, and prorating them down to the item level via an automated proration approach.

FIG. 8 is an example of a promotional planning report showing the projected sales, lost sales, Gross margins (both projected for the event and normal SRP gross margin before any promotional discounting), starting and ending total unit inventories in all the stores and DCs and the first day of the event representative Presentation Quantities for a low, medium and high sales velocity store.

FIGS. 9A–9B illustrate handling of causal events which resulted in an artifact in historical data.

FIGS. 10A–10C graphically illustrate handling of the stockout causal event which resulted in an artifact in historical data.

FIG. 12 illustrates an interface for displaying the relative shares of locations or locations in product sales.

FIG. 13 illustrates interface for displaying day-by-day diagnostic sales profiles, which sum to 1.0 over the selling period.

FIG. 16 illustrates an interface for reporting a model stock of a particular item across all locations.

FIG. 17 illustrates interface for reporting distribution of particular item across all locations.

FIG. 20 illustrates an interface for selection of markdowns.

FIGS. 30–32 illustrate forecast correction in the case of stockout for a single location, with and without backorder correction, and for two locations.

FIGS. 36–40 depict tables for storing presentation quantities.

FIG. 44 depicts an open-to-buy department level report that might be generated by typical systems. It does not include notional orders or deliveries (notional receipts) or other aspects of the present invention.

FIGS. 45A–B (collectively "FIG. 45") depict a report at an item level in which an inventory budget has been rolled down from a certain level in the inventory management hierarchy to the item level. Notional orders and receipts or deliveries are reflected in report, together with various analyses.

FIG. 46 depicts application of aspects of the present invention depicted in FIG. 45, but applied at a department level, instead of an item level. FIG. 47 is a variation on FIG. 46, with more traditional labeling of columns. Fewer columns are displayed in FIG. 47 than in FIG. 46.

FIG. 48 is a variation on FIG. 47, with the addition of columns to track component inventory used to assemble kits or for other intermediate purposes. In this report, there are finished goods that are being used as intermediate goods in other finished goods, which are then handled differently.

FIG. 49 shows a simple example of day-to-day consistent past and future selling with one future negative cannibalization event.

FIG. 50 shows a simple example of day-to-day consistent past and future selling with two future negative cannibalization events.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
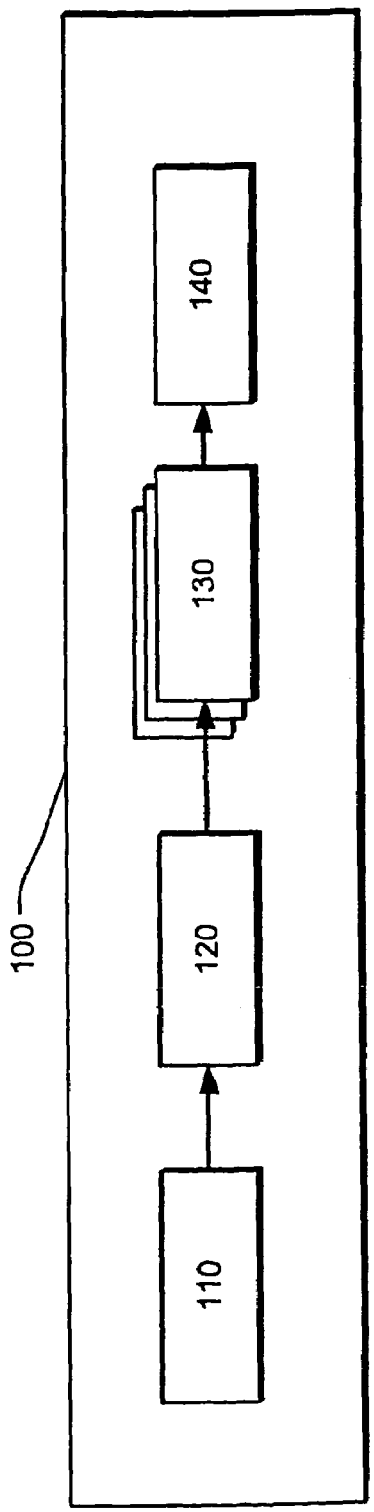
FIG. 1 depicts a system practicing aspects of the present invention.

FIG. 1 is a block diagram of a system practicing aspects of the present invention. A computer system 100 may include one or more computers or servers, having memory and resources for storing data and running analysis programs. The computers or servers may be integrated in a cluster, connected by a SAN or LAN, or coupled at a distance by a WAN. The system may function on an ASP basis, provided by a vendor. The system 100 hosts data files 110, a forecasting engine 120, analysis programs or modules 130, and output devices 140. The data files 110 may include presentation data, a causal calendar file, pre-season item set-ups, in-season changes of item set-ups, markdown set-ups and top-down planning decisions, as described below. The forecasting engine 120 can apply one or more forecasting approaches. For instance, it can operate on daily or more frequent data or on weekly or monthly data. Individual goods or groups of goods can be forecast, either for individual selling locations or groups of selling locations. Different approaches to forecasting include trending sales during this selling period (such as a year); trending sales for this selling period versus the a prior selling period (such as the same period last year); moving average forecasts, with or without exponential smoothing to reduce the effect the effect of outliers; time series forecasts; probabilistic sales forecasts; auto regressive integrated moving average forecasts; etc. Analysis programs produce outputs 140, which are human or machine readable. These outputs may include a display on a monitor in communication with the computer system, a spreadsheet of HTML, XML or other file which can be called up and reviewed by a user, or a printed report on paper, microfiche or optical media (e.g., CD-ROM, CD-R, CD-RW, DVD, etc.) The outputs may be automatically routed by e-mail. Machine readable outputs, for instance, for ordering, may be machine readable inputs to other program modules or systems which take action with or without user review or intervention, such as placing an order with a supplier.

Figure 2:
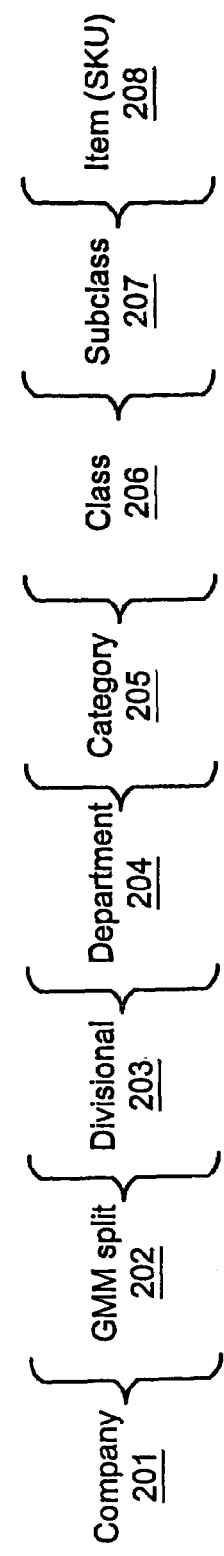
FIG. 2 is a typical hierarchy used by a company to manage or classify product and inventory.

FIG. 2 shows a typical retailer product hierarchy, to which merchandise management technologies are applied. Various retailers practice aspects of their merchandise management at different levels of their product hierarchy. The highest level of the hierarchy is the company 201. The company 201 may be divided into organizations controlled by general managers 202. These organizations may be separate subsidiaries and may even be in different lines of business. Within a GMM split 202, multiple divisions 203 may be organized. A single selling location may be part of a division or may encompass several divisions. Within a selling location, goods typically are presented in departments 204. A department organizes goods into categories 205, classes 206 and subclasses 207. At the lowest level of the hierarchy, an item 208 is typically identified by a distinctive SKU. Items in the same subclass may have different sizes, such as clothing sizes or sizes of packaged goods, each of which is a separate item with a separate SKU 208.

Planning

Figure 3:
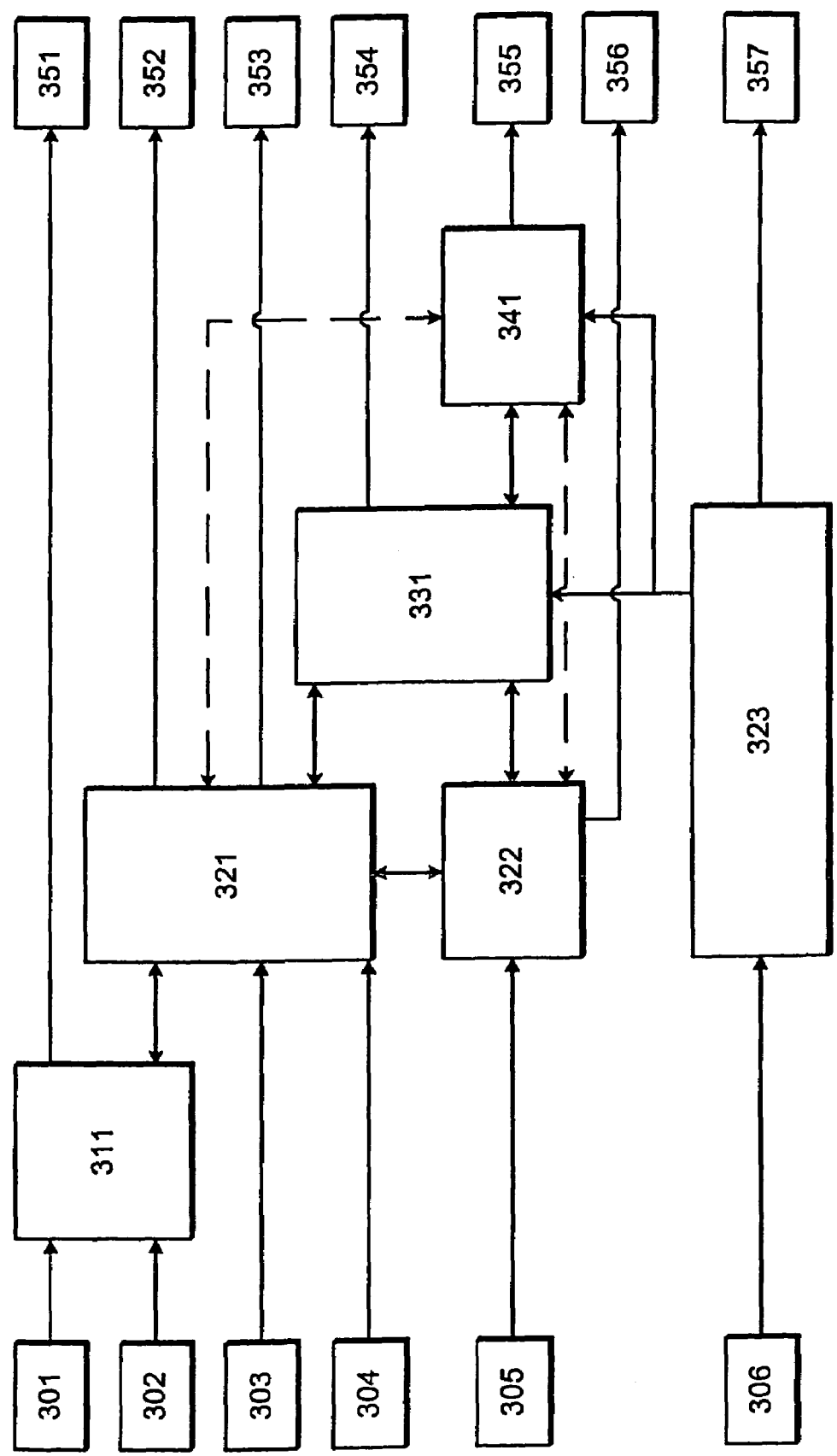
FIG. 3 is a block diagram of software modules implementing aspects of the present invention.

FIG. 3 is a block diagram of components of an integrated merchandise planning and management system. This logical block diagram includes inputs 301–306, software components 311–341, and outputs 351–357. While various components are depicted as logically distinct, they may be combined or disaggregated as proves useful for input, output or implementation of a software architecture. The core of the system is the buying and inventory optimizer 321. The buying and inventory optimizer 321 functions in slightly different ways for basic goods which are reorderable and fashion goods which typically are purchased for a selling season and not reorderable but can have in some cases some ability to reorder. The basic buying and inventory optimizer calculates and forecasts sales constrained by some form of inventory need optimization as required by any other modules of the system: for presentations, promotions or markdowns 311/322; for replenishment of inventory at selling locations 352; for orders and expedites 353; for open-to-buy analysis 331 and for bottom up planning 341. Calculations of model stocks can automatically factor in events and presentations, economic majors of effectiveness such as revenue in profitability, in and out dates for items, purchase orders and physical constraints of the selling locations. Forecasts and optimizations are done by item/location/day, or for some other time period selected by the user. Forecasting and the optimization activities are carried out on an end to end basis, taking into account coverage cycles for ordering, receiving and making goods available to sell. A variety of forecasting approaches can be built into the buying and inventory optimizer. Causal approaches are favored, to reflect data entered into the presentation and event manager. Statistical and other approaches can be selected automatically by the system when events entered by the user do not dominate the forecast. Forecasting encourages users to input causal event and PQ data prior to ordering, by utilizing this data in the ordering and distribution process. With this data in place, replenishment of selling locations from distribution centers, for instance, or reordering items can be accomplished automatically or with user oversight. Items subject to a 3–4 month coverage cycle, for example, can be automatically replenished in selling locations as the system captures the relevant presentation or promotion changes and updated sales and inventory data as it is posted. This allows the user to focus more on longer range selection of products and promotions that drive the business versus more clerical system running activities.

A variety of features may be incorporated into a basic buying and inventory optimizer in various embodiments of the present invention. A basic buying and inventory optimizer automatically takes into account events entered into the presentation and event manager. It recognizes stock out conditions in historical data being used for forecasting, by reference to on hand inventory data for individual item/location pairs. When a stock out in historical data is recognized, the system can select a method of compensating for the stock out, either automatically or with user intervention. Segmented average filling can be used to automatically fill out a day in the sales history with average sales from a similar day, that is from a day subject to the same events in the causal event calendar. The basic buying and inventory optimizer recognizes the introduction and discontinuation of sales for particular item. It recognizes in dates, out dates, clearance out dates and last purchase order receiving dates. For an in date, the system automatically initiates ordering, allocation or distribution activities to meet the specified selling in date. For out dates, the system automatically concludes ordering or takes markdowns to meet the specified program out date. For clearance out dates, the system automatically includes all activities and treats the goods as being cleared from a store, for instance to the clearance outlet. For last purchase order receiving dates, the system automatically includes all activities driven by the last receipt of goods at a location, such as a distribution center. The system accommodates addition of new items and new locations. It clones sales histories for new items or new locations, based on a historically analogous item or selling location selected by the user. These clone histories then are used to drive forecasting. When sales of the new item or at the new location have been posted for a user-specifiable length of selling time, the system automatically or with user interaction revises the cloned selling history to reflect the actual sales results. When sales of a new item or sales at a new location have been posted for another user-specifiable selling time, the system can automatically or with user interaction switch from using cloned histories to real histories for the item and selling location. The forecasting techniques used by the basic buying and inventory optimizer may include probabilistic, segmented probabilistic, regression or a variety of other techniques. A probabilistic forecasting technique may be selected for non normal sales distributions, such as sales represented by a Poission distribution. A segmented probabilistic forecasting technique can be used with larger samples of sales, where different time periods of sales are identified from the causal calendar and traded on a segmented basis. A multivariable regression analysis can automatically be linked to causal events. Selection of a forecasting technique can be automatic or manual. Forecasting of need, as opposed to sales, involves subtly different features. The forecasting of need accommodates a multi-echelon distribution system. In a multi-echelon system, every echelon and stocking or selling location is available for overall merchandise planning and management. Both needs in stock levels for all locations can be incorporated into a calculation. The full range of need satisfaction activities are integrated, so that order calculations and distribution calculations are coordinated. The overall ordering cycle can be compressed to the time actually required, instead of a fixed weekly cycle. For instance a 10 day cycle for ordering and replenishment can be used if 10 days is the time required, instead of a two-week (14 day) cycle which would result in four days of excess inventory. The safety stock can be taken into account. End-to-end optimization reduces exposure to stockouts and excess inventory at those locations having the highest variability in need, minimizing the overall safety stock requirement of the multi-echelon system. While traditional service level calculations for safety stock can be supported by the system, end-to-end economic stocking optimization can replace the service level approach. A hurdle rate control feature allows users to change an economic optimization hurdle rate to easily emphasize low profitability core assortment items or to take less risk with items approaching the end of their sales life. The hurdle rate controls the trade-off between lost sales and inventory-related costs. The hurdle rate reflects the time value of capital invested in inventory and both direct and indirect cost that would be added to carrying costs in a precise economic calculation. A relatively high hurdle rate, such as 50% or 100% of inventory cost or value may be used because a typical debt interest rate can be too low to fairly balance lost sales (lost revenue minus COGS, or some similar measure of lost contribution to profit) against inventory carrying costs where all of the full costs have not been deducted. In situations when excess or inadequate inventory of goods become apparent, the system can automatically deal with overages, underages and overrides. The system can automatically direct excess goods to locations with the highest sales potential in situations where the goods need to flow through the system. The system can automatically evaluate alternative allocations of scarce goods to reduce sales and profit damage due to shortages. In a shortage situation, preset minimums, such as presentation quantities can be automatically protected. Practical realities of ordering and distribution also can be taken into account, including minimum order quantities, minimum order quantity increments, and case rounding. Minimum order quantities may be established to reflect purchasing arrangements with vendors. Minimum order quantity increments can be taken into account, so that orders are properly generated for vendors that sell their goods in incremental quantities (e.g., increments of 1000 units.) Case rounding logic can assure that orders or distribution quantities are for whole cases instead of broken cases of goods. The analyses generated by the basic buying and inventory optimizer include projection of stockouts and overstocks at specific locations.

Without minimizing the difference between handling of basic and fashion goods, many of the system features are the same for both. More extensive discussions of features related to each of these types of goods are found elsewhere in this document. There are some highlights to the application of the buying and inventory optimizer to fashion goods. As fashion goods have a limited sales program life, the factoring in of actual sales to correct or scale estimated sales profiles should be emphasized. The set up of seasonal goods may be more sophisticated. For instance, in the course of establishing cloned sales histories, patterns of straight sales and orphan sales can be recognized. Inventory shrink that results in overstatement of on hand inventory at the end of the season can be overridden automatically or with user interaction. Orphan sales of goods at the end of a season, for instance when an item is returned or found mis-shelved and returned to its proper location, can be recognized based on a minimum level of selling. Orphan sales can be ignored for purposes of established cloned sale profiles. In addition to the segmented average filling described with respect to basic goods, profile filling can be used. Preset sales profiles or profiles from other locations, for instance can be used to fill in one or more stockout days in the sales profile for a particular location. The distribution of sales among selling locations of a fixed quantity of goods purchased for a seasonal program can be driven from historical shares. Shares represent the distribution of sales among selling outlets in prior seasonal programs. Shares can be automatically computed and then applied and scaled for a current sales program. Based on in-season selling of fashion goods, share distributions among selling locations can be automatically revised. The differences in causal events among the selling locations also can be taken into account. Shares are described in greater detail elsewhere in this document. The buying and inventory optimizer 321 forecasts sales, taking into account such real world considerations as presentation quantities, events, stockouts and markdowns. It optimizes forecast needs.

The buying and inventory management and markdown optimizers interact with the presentation and event manager 311. The presentation and event manager 311, in one embodiment is a single point of data entry that supplies presentation and event information to all other modules. The presentation and event manager 311 compares presentation quantities entered to economically optimal values calculated by the buying and inventory optimizer 321. One of its outputs 351 is an evaluation of presentation quantities that are above a user-specified multiple of the model inventory level calculated by the buying and inventory optimizer 321. Another of its outputs is an evaluation based on historical data of the sales and profitability of promotions. This output may be grouped at any level in the item hierarchy of FIG. 2 and for any category or grouping of presentations.

A wide range of features may be incorporated into a presentation and event manager which practices aspects of the present invention. The presentation and event manager recognizes a variety of presentation quantity types. A so-called "sell into" presentation quantity is an initial presentation quantity which may be used to satisfy demand. A so-called "protect" presentation quantity represents inventory which is always supposed to be available for presentation and is rarely sold into. That is, additional inventory is available at the selling location to satisfy demand without taking inventory out of the presentation. A so-called "phase down" presentation quantity is capped at a declining quantity, as a basic goods promotion or a fashion goods selling program runs its course. A so-called "introductory protect" presentation quantity is protected for an initial time and then converted to a sell into or phase down presentation quantity. A so-called "N levels" presentation quantity. When calculations are carried out for distribution centers, the system takes into account events, PQs and other factors at the selling location level, effectively rolling up the selling location effects into the distribution center that services them. This roll-up can be directly to the distribution center or through intermediate distribution centers to a central distribution center. This roll-up accommodates a multi-echelon distribution network. The presentation quantity used by the presentation and event manager can be applied at various times. It can be applied at the cycle end, which is the last day of the cycle being processed. It can be applied as of a delivery date, which is the day on which a shipment of items is received at a location. Or, it can be a maximum quantity of goods at the location during any part of the cycle being processed. The buildup of presentation quantities can be handled at various levels of aggregation. A single presentation quantity can be assigned to an item for a time across all selling locations. Specific presentation quantities can be assigned for a time to specific item/location pairs. Presentation quantities can be assigned to fixtures or fixture setups within fixtures. The fixtures, in turn, are assigned to locations. The presentation quantity special display minimum (SDM) can be specified in at least two ways. A specified value can be added to model stock, for instance when goods are used in window display and not salable during a time. A special display minimum can be driven by a presentation quantity value, as a function of the presentation quantity. Presentation quantities can be entered for analysis or as a plan. Presentation quantities entered for analysis can be compared to model inventory and those presentation quantities above a user-specifiable percentage of the model inventory flagged for user evaluation. Presentation quantities as part of a plan can be incorporated in all merchandise planning and management activities which derive their data from the presentation and event manager.

Causal calendar features which are aspects of the present invention are rich and varied. The causal calendar can track events which are non promotions, promotions or markdowns. A non promotional event may be removing swimming suits from the selling floor at the end of the summer season or to make way for selling of back to school goods. Promotional events may include placement of an item on a key high traffic or end cap fixture, discounting the item, introduction of a companion product, running a promotion which cannibalizes demand for an item or post promotion sales values. Permanent markdown events also can be managed through the causal calendar. One use of the causal calendar is to predict sales lifts. A specified sales acceleration value can be used by default, if there is no similar causal event to use as a basis for calculating sales lifts. When a similar historical causal event can be identified, resulting lifts can be calculated from the prior event. The buildup of causal event information can be handled at various levels of aggregation. A causal event can be specified for an item for a time across all locations. It can be specified for one or more item/location pairs for a time. A named causal event can be associated with a variety of items at locations which will participate in the event. Causal events can be entered for analysis or as a plan. The effect of causal events entered for analysis can be traced through any of the analyses typically generated by the system and compared to results generated without the effect of the causal event. Once causal events are entered as a plan, they can be automatically incorporated in all merchandise planning and management activities which derive their data from the presentation and event manager.

The presentation and event manager 311 accepts as inputs presentation quantities 301 and causal events 302. It supplies the buying and inventory optimizer 321 with data regarding presentation requirements at selling locations and events which will affect demand, sales and needs for goods. The presentation and event manager 311 produces various reports 351 that inform management's evaluation of promotional and presentation strategies. The optimizer interacts with users to accept preseason item setup data 303 and in season changes 304 to the setup data, which typically are minor.

The optimizer further interacts with a markdown optimizer engine 322. The markdown optimizer 322, in one embodiment, can run without additional input or it can accept a few incremental inputs from a user, utilizing data associated with the presentation and event manager and the buying and inventory optimizer. The markdown manager features to optimize revenues, profitability or some other measure of sales effectiveness for merchandise owned by the retailer. The goods may be in distribution centers, selling locations, in transit or elsewhere awaiting allocation. The markdown manager evaluates different selling scenarios and recommends or selects markdowns which increase sales effectiveness. Recommended markdowns for the balance of a selling season can be reported to a user so that in-store trade-offs can be evaluated by users and courses of action decided. The markdown manager incorporates all events entered into the presentation and event manager and can automatically take into account presentation quantities. The scenarios it generates include markdown timing, which can be synchronized with a day of the week schedule for markdowns at specific selling locations, and markdown depth, such is 25, 33 or 40 percent off. For goods programs, the impact of different scenarios can be determined and reported to the user in terms of revenue, profitability or any other measure of sales effectiveness. A markdown scenario can be automatically selected based on one of these measures of effectiveness and instructions issued for marking down the goods.

The markdown engine 322 draws data regarding sales of goods and forecast sales of goods from the optimizer 321. It also draws data regarding out dates for sales of goods from the optimizer 321. In saying that these data are drawn from the optimizer 321, the link between the software modules may be a software interface, a pipeline, or any temporary or persistent data storage, or the modules may be combined. The markdown engine 322 provides data to the optimizer 321 for modification of selling prices and resulting changes in needs and sales. Preferably, the markdown engine 322 is used to select, either automatically or interactively, markdown dates and price points which will maximize some measure of the retailers' performance, such as revenue, gross profit or the like. The markdown engine 322 also may supply data to the open-to-buy engine 331 or the bottom-up planner 341. The input 305 to the markdown manager is minor setup data, such as identification of the day of the week on which selling locations change the price of goods. It also can include selection of markdown scenarios.

The optimizer 321 also interacts with the open-to-buy (OTB) module 331. The open-to-buy module 331, in one embodiment, is a fully automated open-to-buy analysis engine working off of the latest results generated by other modules, such is the presentation event manager 311, the buying and inventory optimizer 321 and the markdown engine 322. These other modules can generate most of the data necessary for open-to-buy analysis, excepting budgets which may be obtained from a top-down planner 321 or imported from any source. The open-to-buy module can provide both a traditional and a statistical open-to-buy analysis. The statistical open-to-buy analysis uses notional orders to simulate future stocking patterns for reorderable items. These notional orders and simulated stocking in sales patterns can be used to put long and short lead time items on par for analyzing anticipated on hand inventory. The open-to-buy module utilizes item/location/day level forecasts available from the buying and inventory optimizer 321. It rolls item level data up to any level of a hierarchy such is illustrated by FIG. 2 for reporting purposes and allows a user to select detailed reporting in areas where problems are apparent from aggregated data. The open-to-buy module features estimates of lost sales caused by ordering that results in stock outs at selling locations. The open-to-buy module automatically incorporates events and presentation quantities entered into the presentation and event manager 311. Weekly, weekly adjusted, daily or more frequent forecasts of need and sales for basic and fashion goods can be generated as a basis for rolling up item level forecasts into aggregate reports. If automatic incorporation of markdowns for fashion goods is selected, the impact of markdowns can be reflected both in sales and in inventory values stated at selling prices. The amount of time forward for which the open-to-buy analysis is run is user-selectable, as is the time increment, such as weekly or monthly reporting. Reports generated by open-to-buy analysis identify overstocking. The system can automatically generate detailed reports identifying items within departments or some other level of aggregation which are overstocked. Automatic report generation can save the user from sorting through unneeded pages or from going back and requesting additional reports. Inventory budgets can be automatically prorated from levels of a hierarchy at which they are set down to items for overstocked identification. Lost sales estimates can be generated. Items purchased by the retailer to be used for production of finished goods can be accommodated by flagging the items that are going to be incorporated in other goods.

Analysis of open-to-buy inventory values may be carried out well into the future, even beyond the normal ordering cycle, in order to assure a rational balance between buying of short and long lead time items. Long-term analysis of open-to-buy inventory values provides a tool to counteract the unproductive behavior of cutting back on short-term purchases in order to reduce inventory on hand, when a better solution may be to markdown items purchased on a long lead time and reduce the on hand inventory of long lead time items. Long-term analysis promotes a balanced analysis of strategies for achieving desired on hand inventory levels. There may be substantial overlap between open-to-buy analyses 331 and bottom-up planning 341.

Integration of planning and need/sales forecasting is accomplished by coupling the planning module 341 with the forecasting engine (331), either directly (indicated by a dotted connection) or in conjunction with OTB reporting (341). The forecasting engine generates need and sales calculations which drive ordering and replenishment for fashion and goods.

A top-down planner 323, in one embodiment, is a department or class level subjective input planner that will automatically use past selling information if it is available. Users begin with historical plans or, alternatively, with historical information about actual sales, and subjectively adjust the historical information to generate current plans. The system can be configured to encourage the user to note the rationale for the plan. It can be self documenting in creating an audit trail of the starting basis for the plan and the changes used to generate the current plan. The historical data that it provides the users can encompass sales, costs, margins in inventory, to support setting of budgets for sales, costs, margins in inventory. In a "what-if" mode, multiple plans can be prepared by one or more users. The rationales for alternate plans, plan parameters and results of the plans can be reported for comparison. The top-down planner 321 accepts decisions 306 from users and supplies budget goals to the open-to-buy 331 and bottom-up planning 341 modules. The budget goals can then be rolled down to items or some other low level for open-to-buy analysis and bottom-up planning purposes.

A number of outputs can be provided to users. More specific detail is described below. In general, the optimizer 321 provides allocations of fashion goods and replenishment information regarding basic goods 352. It also provides ordering and expediting schedules 353. The open-to-buy module 331 provides open-to-buy analysis reports 354. The bottom of planner 341 provides bottom-up plans 355. The markdown engine 322 provides markdown strategy information 356. The top-down planner 323 provides top-down plans and budgets for use in OTB analysis and bottom-up planning 357.

Features that can be combined in a planning system, practicing aspects of the present invention, include event incorporation, presentation quantity inclusion, sales and needs forecasts for basic and fashion merchandise, markdown management, open-to-buy ("OTB") reporting, and bottom up planning. The bottom-up planner 341, in one embodiment of a system practicing aspects of the present invention, is a fully automated dynamic item-level planner that works using inputs processed by other modules. With these inputs, it can be run by a user, who makes a simple selection among alternatives such as annual planning by month, future annual planning by month, future monthly merchandise planning, monthly planning by department, weekly planning department, weekly planning by item and year-to-date plan by item. The bottom-up planner calculates preseason plans and in season replans each time it is run. The retail user might be expected to run the bottom-up planner on a weekly basis as a regularly scheduled job. Alternatively, it can be run on demand. The bottom-up planner generates item/location/day level forecasts, from which planning analyses are prepared. Detailed forecast can be rolled up to any level in the hierarchy of FIG. 2 that the user desires. The bottom-up planner generates comparisons between forecasts and budgets. Revenues, gross margin and inventory are typical subjects of comparison.

A wide range of features may be incorporated in a bottom-up planner which practices aspects of the present invention. The bottom-up planner automatically incorporates presentation events such as promotions that have been entered as data for the presentation and event manager. It also incorporates presentation quantities that have been entered as data for the presentation and event manager, taking the presentation quantity needs into account for need forecasting. The bottom up planner generates needs optimal inventory and sales forecasts for both basic and fashion goods. Again, the optimal need forecasts incorporate needs of goods for presentation. Sales forecasts take into account events that have been entered into a multipurpose causal calendar. Primarily for fashion goods, the bottom-up planner can automatically take incorporate optimal markdown strategies, if the user selects planning based on optimal markdowns. For basic goods, markdowns normally will be handled through the markdown engine when goods are closed out and not subject to reorder. During the time when basic goods are subject to reorder, promotions set up as events on the causal calendar are a preferred alternative to markdowns. The bottom-up planner interacts with the OTB analysis without a need for user inputs. The time horizon used for planning may generally be the same as for OTB analysis. Thus, the results of OTB analysis can be used for planning purposes. Alternatively, the bottom-up planner can be implemented with different time period increments for reporting than are used for OTB analysis; longer or shorter periods can be used for planning than are typical for OTB analysis. Outputs from the bottom-up planner include automatically generated data for item/location/day selling, inventory on hand at stocking locations, cost and gross margin forecasts. When the bottom-up planner is implemented as part of an integrated system, the forecasts that it generates are based on the latest outputs used for multiple merchandise planning and management purposes. By altering the event input to the presentation and event manager, alternate promotional plans can be evaluated for their sales and gross margin contributions. In one embodiment, what-if scenarios can be tested by inputting test promotional events into the presentation and event manager, without committing them to be part of the actual merchandise plan. The bottom-up planner automatically generates comparisons of sales, gross margin and inventory against budgets. The budgets can either be generated by top-down planning or imported from an independent system.

FIGS. 4–8 are examples of output from a bottom-up planner. Outputs of a bottom-up planning system can be organized by item/location/day and can include promotional plans and budget comparisons. FIG. 4 is a sample planning daily item sales and inventory report. It depicts columns of data that the bottom-up planner is capable of generating in one format. Column 402 is an SKU number for a particular item. In this example, different SKU numbers are assigned to what appears to be the same item. Normally, the same SKU number would be assigned to all instances of the same item. Column 404 is a product description. Column 406 is a date. This planning report is on an item-by-item, day-by-day basis. The 12 oz. normal shampoo statistics are displayed for each day in a 19-day period, from August 12 through August 30. Column 408 is a total for product availability, including inventory on hand in selling locations and distribution centers, and inventory in-transit from the distribution center to the selling locations. Column 410 is a variation on column 408, which does not include inventory in the distribution center. Column 412 presents the difference between columns the 408 and 412. Column 412 shows the inventory on hand in the distribution center. Not shown in the report is a model stock for the distribution center, based on a statistical analysis of inventory preferred to be in the distribution center, which is discussed below. Column 414 is the difference between the on hand inventory in column 412 and the desired statistical inventory. When the statistical on hand inventory in column 414 is negative, the inventory in the distribution center is below the desired level. When it is positive, it is above the desired level. Similarly, when the distribution center inventory in column 412 is zero, it is likely to be below the desired inventory level for redistribution to selling locations. Column 416 indicates units projected to be received on specific dates in the distribution center, based on actual purchase orders. Column 418 is like column 416, but reflects notional purchase orders. Notional purchase orders can be generated by the system, as discussed below in the context of open-to-buy analysis, to reflect the level of ordering which the system determines to be optimal. The quantity received from notional purchase orders is expected to be zero for dates close to the report date, due to the lead time for fulfillment of notional purchase orders, which can only be placed in the future, not in the past. Column 420 totals projected daily sales in units for all stores. Column 422 totals projected lost sales in units for all stores, given inventory on hand and stock out situations at particular selling locations. A low number of lost unit sales reflects a healthy tolerance for variation in demand among selling locations. A high number of lost unit sales reflects inadequate inventory. The calculations used to generate data in these columns are generally explained in the discussion of open-to-buy analysis, below.

Figure 5:
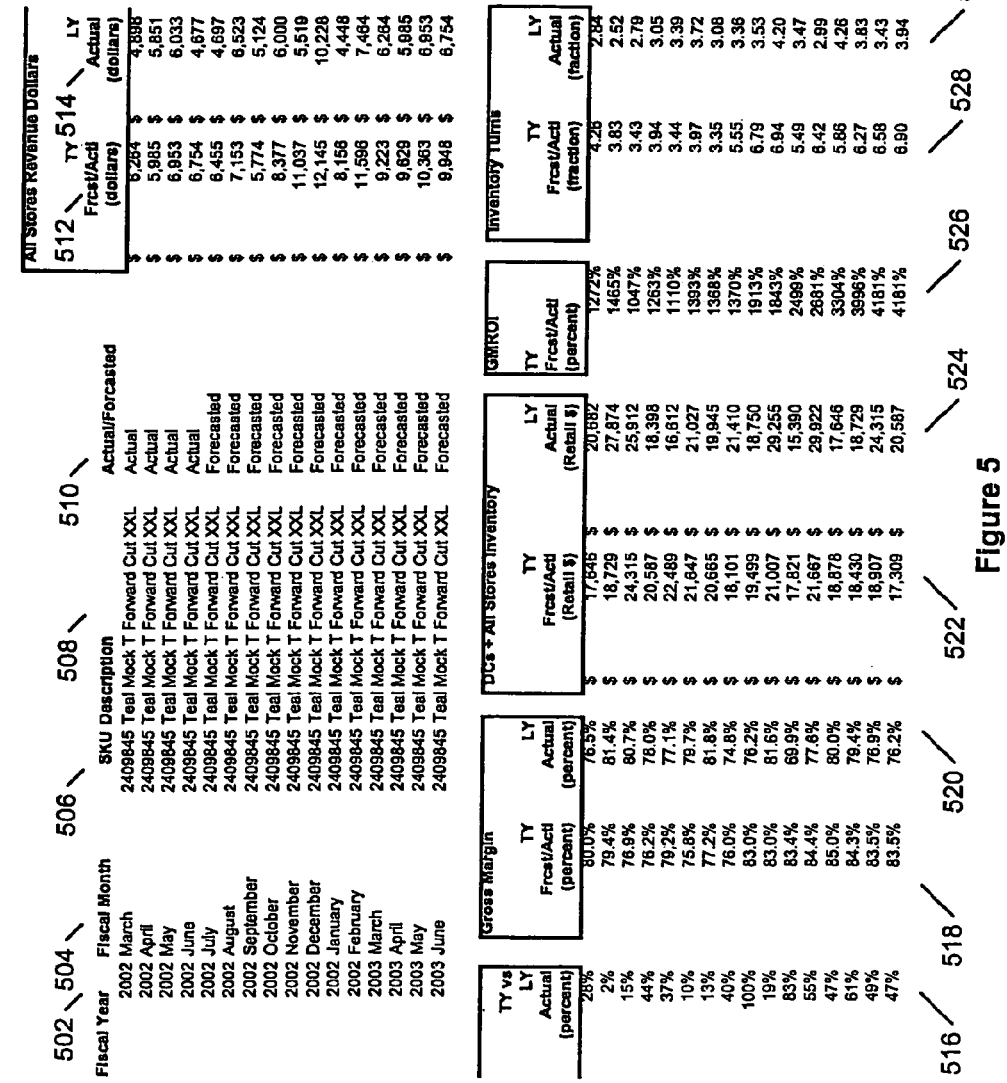
FIG. 5 is an example item level planning report combining past actual results with forecasted results for the next 12 months shown in monthly increments. The Revenue, Gross Margin and Inventory results are shown with comparable last year values as frequently is done and a calculation of GMROI is also shown.

FIG. 5 is an example of a monthly planning performance summary at an item level. This report is a monthly rollup for all locations for a month on the sales, gross margin and inventory projections. It compares some actual and then forecasted monthly projections to last year's same item results for dollar sales (revenues), gross margin, DCs and all Stores inventories, and inventory turns. It also does a past actual and projected future Gross Margin Return on Investment (GMROI) calculation for each month. Higher product level reports within the product hierarchy are then generated by mathematically combining all the item values within that level. For example, mathematically combining all the items in a specified department produces a Planning Monthly Department Performance Summary as described in FIG. 6. Column 502 is the fiscal year in which a month falls. In this example, the fiscal year runs March to February. Column 504 is the fiscal month covered by the monthly report. Column 506 is the SKU for the item being reported. This report uses the same SKU for all instances of the item. Column 508 is the item description. Column 510 indicates whether month reported is past (actual) or future (forecasted.) As this report is dated June 30, 2001, the data for March through June, 2001 is actual; the data for July through June, 2002 is forecasted. Columns 512–516 reflect aggregate revenue across all stores. Column 512 is for this year. Column 514 is for last year. Column 516 expresses this year compared to last year, as a percentage change. For instance, this year is 28 percent better than last year for March, 2002. Columns 518–520 state the gross margin on sales, both actual and forecasted for this year and last year, respectively. Columns 522 and 524 state the value of inventory in distribution centers and stores, both actual and forecasted, for this year and last year. These values are stated in terms of the retail value of the inventory, as opposed to the cost. The retail values are based on planned selling prices, as impacted by promotions and markdowns. In an alternative embodiment, the inventory on this report could be carried at cost instead of selling value. Column 526 is a calculation of gross margin return on investment for this year. There are many ways to calculate this statistic. In one calculation, GMROI (%)=gross margin %*(sales divided by average inventory at cost) where gross margin can be the gross margin for a point in time or an average over time. The sales would be revenue in dollars and the inventory at cost is usually the average inventory over the last 13 months. Another method of calculating GMROI ($)=gross margin in dollars for a period of time (usually a year) divided by average inventory at cost in dollars (usually the average over the last 13 months). Columns 528 and 530 are inventory turns, a standard measure of product movement. Inventory turns can also be calculated in many different ways. For example they may be unit turns calculated using unit sales over time versus unit inventories, or they could be some form of financial turn comparing dollar sales to some dollar value of inventory (e.g. at retail or at cost).

FIG. 6 is a monthly department performance summary which includes much of the same information as in FIG. 5, but aggregated at the department level, instead of detailed at the item level. Only a handful of budget-related columns, numbered 632–642, appear in this report but not in FIG. 5. Column 632 is a budget for department sales in all stores, on a monthly basis for this monthly report. Column 634 expresses the variation of this year's revenue for the department from this year's budget. Sales for March, 2002, in this example, are 101 percent of budget or one percent over budget. Column 638 states the budgeted gross margin for the department. Column 640 states the budgeted inventory for the department, inclusive of all stores and distribution centers, expressed in the retail value of inventory, rather than the cost of inventory. Column 642 states the budgeted inventory turns, making them available for comparison to last year's actual and to this year's actual forecast statistics.

FIG. 7 is a variation on FIG. 6, reporting at the item level instead of the department level. Because this report is at the item level, columns 506 and 508, for SKU and item description appear on this report but not on the department report. Top-down budget values have been prorated down from the level where they are specified, such as a class level, to the item level.

FIG. 8 is a future promotional planning report. Merchants frequently want to see the projected results of the future planned promotion. This report allows them to specify particular promotions and get projected results of the promotions for some or all of the items included. The report includes items such as sales, lost sales, pre-promotion gross margin and gross margin during the promotion, starting inventory and ending inventory, and typical presentation quantities (in this case, in variations for low, medium and high-volume selling locations.) As this report is based on projections made at the item/location/day level, the system can accurately project the impact of the promotion at the stores which are included. The report can mix promotions of different lengths and time periods, providing total figures for the period of the promotion. The promotions reported can be of any length: 1 day, 3 days, or 23 days. Column 802 specifies the department in which the promotion is carried out. Columns 804 and 806 give the SKU number and description of the item. Column 810 describes the promotion. In this example, like promotions are grouped together. Column 812 is a suggested retail price of the item. Columns 814–816 describes sales in all stores, expressed in units and dollars, respectively. Columns 818–820 express lost sales in all stores, in units and dollars. Columns 822–824 express in gross margin across all stores when the good is sold at the suggested retail price and the promotional price. Columns 826–828 are the starting and ending inventory of the promoted item, including all stores and distribution centers. Columns 830–834 express the presentation quantity required at typical or specified stores. In this report, three variations on presentation quantity are expressed: for low-volume store 830, a medium volume store 832 and a high-volume store 834. The stores can be selected by the merchant as representative or compiled statistically by the system based on the average of some band or the average of some specified group of stores expected to produce a representative composite view of stores in their category.

Fashion and Seasonal Goods

The handling of fashion and seasonal goods was explained in application Ser. No. 09/708,944, filed 8 Nov. 2000, entitled Method And Apparatus For Distribution Of Fashion And Seasonal Goods, by inventor Robert Dvorak, which is incorporated herein as if set forth fully. A fashion program typically consists of a number of items that will be sold for a fixed period of time. For each item, the retailer typically purchases a fixed number of units in advance and may not have the opportunity to reorder the item from the supplier. During the selling season, the retailer needs to send product from its distribution center to each of its locations to ensure that locations are in-stock in as many items as possible. As the end of the selling period approaches, retailers typically reduce the price of unsold items (markdowns) to ensure that all or substantially all of the inventory associated with the program is sold at or near the end date of the program.

The handling of fashion and seasonal goods, in accordance with aspects of the present invention, provides a computer-implemented method for adjusting a reference selling profile for a reference product, comprising retrieving one or more reference selling profiles corresponding to daily or more frequent historical data for one or more reference products, and adjusting the reference selling profiles to correct for one or more promotions which impacted the historical data.

The Fashion Allocation System Overview

A fashion allocation system embodying aspects of the present invention forecasts sales and calculates allocation quantities for each distribution flow from a distribution center to locations in a fashion or seasonal program. While the fashion allocation system does not determine required vendor order quantities (also known as the total buy), the system can be used to generate information useful in determining the order quantity, especially if a product comes in many sizes, colors, flavors or other distinction where past location or other selling profiles are relevant. Ultimately, the total buy quantity decision is driven by a planning function and merchant assessments. After the decision on the total buy is complete, the fashion allocation system provides information useful in determining where and when to send the goods.

The fashion allocation system can take advantage of historical data for comparable items and then real sales as they become available. Historical data on a reference product helps forecast how the different locations will sell the different items. Using well-selected historical reference product(s) provides insights into sales quantities and sales timing by location on a relative basis. These insights can be adjusted based on actual in-season sales results. The fashion allocation system may be used to combine the historical and real sales results. A reference product may be an individual product, for instance a product comparable to a particular product for which sales are being forecast, or it may be constructed based on user judgment or from a group of individual products.

In operating the fashion allocation system there are 5 activities, which involve several distinct aspects of the present invention:

1. Create Shares
2. Create Profiles
3. Setup Item and Location Data
4. Setup PQs and Causal Calendar
5. Run Distributions The first 4 activities are typically done once for each fashion or seasonal program and then changed if required. The fifth activity, running distributions, is typically done multiple times over the season.

The fashion allocation system can use both historical reference product information and actual sales results in its forecasting, allocations and distributions. The historical information is used in the form of shares and sales profiles, which are built for the new products using the reference products. Then item and location data and quantities (PQs) and a causal event calendar are set up. The casual event calendar can be used to capture promotional information such as advertising, preferential display of goods and price reductions or seasonal data such as the days preceding and following Christmas, the days preceding and including Valentines Day and the days preceding the start of school (typically called "back to school"), which can be used to adjust either shares or profiles. With this information in place, distributions can be run. Once in-season sales are available, shares, profiles and distribution runs may reflect both projections and actual sales. This blending of projections and in-season results is done in a way to not over react to random selling anomalies while not under reacting to real differences in what was expected and what is actually happening in the new item selling.

A share or location distribution share is a set of location-by-location sales fractions adding to 1.0, where a locations' fraction is an estimate of its unit sales relative to the total unit sales of all locations. Shares typically, but not always, are calculated for groups of items instead of single items, so that the location level sales do not reflect individual anomalistic situations such as random selling noise. Shares can be generated using a number of different historical sales periods (e.g., all the sales time for the historical items or just during a specified time period) and sales types (e.g., actual sales or stock out filled sales). One share is typically assigned to an item, and many items may use the same share. Shares should differ for items that sell differently across the locations. For example, some locations may be strong sellers at high price points and therefore if the item in question is at a high price point, a high price point share may be used.

A reference selling profile is a historical set of data corresponding to day-by-day or more frequent sales for reference product(s). Typically, the historical sales data is stored as fractions adding to 1.0, where a daily sales fraction is the fraction of season unit sales that would occur on that day. Alternatively, a reference selling profile may store actual historical unit or dollar sales data, with appropriate scaling, as will be apparent to those of ordinary skill in the art. However the data is stored, the invention can readily be adapted to historical data retained for intervals more frequent than daily, for instance, for three shifts a day. Like a share, a profile is typically determined for a number of past items so that the location level sales do not reflect individual anomalistic situations. Unlike shares, profiles typically are grouped by locations. In grouping locations, it is preferred to select a group sufficiently large to overcome random selling noise but not so large as to blend together locations with different sales patterns. For locations that sell large quantities of particular items, grouping may be unnecessary.

The profile created may be adjusted to reflect to a new time period corresponding to when the new items will be sold. So for example, a profile created for a first year during Thanksgiving and Christmas holiday may be shift to a second year reflecting the different days of the week and timing of events such as Thanksgiving. Likewise, a profile created in a first year in the spring may be time shifted for use in a second year during the summer. In making these types of changes a reference selling profile may be truncated to a shorter selling period by dropping early or late sales dates and then resealing the remaining days to more closely match the sales dates that are being projected resealing the profile, if desired, to sum to 1. Alternatively, the reference profile may be compressed to a shorter period rather than dropping dates. For in-season selling situations profiles may be changed in a way that they scale to a value greater or smaller than 1 reflecting whether unpromoted sales of a particular product should sell out a total buy quantity during the defined selling season (in cases where they will no markdowns are required or the season will take longer than planned). Profiles may be assigned at the item and location level or to groups of items or groups of locations. A number of items and locations may have the same profile. Profiles may be adjusted to reflect timing difference among locations in product sales. For example, locations in areas like Florida or Arizona often have sales profiles influenced by seasonal influxes of people. Locations in some geographies may have different day of week and week of year variations in selling. Profiles for a specific location may also differ by price point or by type of goods.

Profiles also may be adjusted to correct for seasonal effects which impacted sales of reference product(s). One seasonal effect is special selling days, such as the days before Mother's Day, Memorial Day weekend, the days before and after Thanksgiving, the days before and after Christmas. Depending on the product or location, any number of other special selling days may produce seasonal effects. Another seasonal effect is periods such as back to school days and Christmas shopping. Depending on the product or location, any number of other special periods may produce seasonal effects.

Corrections made to create shares can be applied to adjust reference selling profiles to generate projected sales profiles and vice-a-versa.

Once a share for an item and one or more profiles for locations have been selected, setup can proceed for specific items and locations. This may include setting the data elements that should remain the same throughout the distributions or change infrequently. These elements include the authorized locations for an item, the item buy quantity available for distribution over the life of the program and the in and out dates for the item at each specific location (if it differs by location). These may all be specified at the item or item/location level, as desired, and then are used by the system throughout the distributions. This data is typically modified if, as the selling progresses, if it becomes apparent that an incorrect share or profile was selected initially.

The presentation quality (PQ) and causal calendar are used to identify which promotional events will occur at each location and which items will be affected. Promotions, in this sense, may include advertising, preferential display or presentation of products, markdowns and the like. The PQs specify a desired quantity of inventory presentation in a location to be aesthetically pleasing. It can be specified on an item, location, and day basis (i.e., need to have 12 on hand in location number 62 to display from December $5^{th}$ to December $12^{th}$.) The causal calendar identifies promotional events (again, on a location, item, date basis) that will affect each item during the life of the fashion or seasonal program (i.e., item number 876 will be on 25% price reduction from December $1^{st}$ through December $7^{th}$ at these specified locations). The causal calendar will also identify the expected sales lift associated with the event (e.g., a 2× multiple of normal selling) and may use a value that is user a specified or historically derived.

Distributions can be run and reports generated after setup. The distributions suggest actual allocation quantities for each location, given the appropriate profile, share, actual selling, presentation quantity requirements, causal calendar, and total buy for the product. These distribution results are typically uploaded to another system for distribution center picking and shipping to locations.

Create Shares

One aspect of the fashion allocation system is an historical share. To recap, a share is an historical set of location-by-location sales fractions adding to 1.0, where a locations' fraction is an estimate of its unit sales relative to the total unit sales, typically over the total season. A single share typically, but not always, is created using a group of items, so that the location level sales do not reflect individual anomalistic situations such as random selling noise.

A share is created using historical sales data, which may previously have been loaded into the fashion allocation system. It is useful to select a set of past items with selling drivers similar to the selling drivers for the new items for which the shares being created. The right time period to use and type of sales (actual or filled) also may be taken into account when selecting historical data with which to create a share.

Selection of raw historical data is accompanied by selection of desired historical corrections. This includes selecting a type of stock out or out of stock correction method to use and a type of filling. Other corrections may include correction for promotions, including corrections on a location-by-location basis, and correction for seasonal effects. After the selections are made, the fashion allocation system can generate a share to which the user may assign a unique name.

A share is typically, but not always, built up from the historical sales of a number of historical items or reference selling profiles. For each of those items it uses the actual unit sales, on hand inventory (if selected and available for determining stock outs) and information from the causal calendar. In building the share, the fashion allocation system may remove the past impacts reflected in the causal calendar so that different promotions done across different locations (if it was done that way) or different impacts of seasonality do not influence the calculated shares. Such promotions may include advertising, preferential display or reduced pricing of reference product(s). Such seasonality may include different holiday periods such as Christmas, Easter and Mothers Day and other periods like "Back to School". Once a share has been constructed, it can be automatically adjusted to reflect future promotions or seasonality entered into the system on a location-by-location or higher-level basis (e.g., regional or total item).

The fashion allocation system enables user selection of past items that are expected to sell in the same manner as new items. The user's thinking should take into account a number of factors such as target consumers, price point, fashion ability, branding, and size selling. In addition, it is some times necessary to think about factors such as male to female crossover sales or cross assortment impacts. One usually does not need to think about promotional impacts, as one aspect of the fashion allocation system is adjustment for promotions.

The group of items used to create a share is selected. This selection depends in part on the sales volume of the items being selected; fewer items are required when the sales volume is large. One trade-off worth considering is selecting enough items to avoid a profile that is driven by a few anomalistic events, but selecting a few enough items to avoid averaging away discernible selling differences. That is somewhat driven by the unit sales volume for the past items. For example, if particular styles or size splits have relatively predictable location selling differences, it is preferred to make sure that the shares created have those splits and not some higher level grouping that averages away those impacts.

The fashion allocation system allows the user to test shares after they are created, by running different alternative groupings and then evaluating whether those groupings show predictable differences over time. Typically, groupings are refined over time and change as consumer preferences and trends change. One strategy is to start with somewhat larger groupings and develop smaller groupings based on experience. Beginning with small groupings exposes the user to differences that are potentially anomalistic and not replicable. Choosing a broader grouping takes advantage of a function of the fashion allocation system that corrects differences between projected and real sales, as real sales results become available.

After selecting a reasonable set of comparable products, a time period should be selected to use for the share that is being created. It is useful to select the time period with the most representative sales. The fashion allocation system includes an option to make this decision less critical by using a sales type that fills stockouts. The system may compensate for stockouts throughout and at the beginning and end of the sales period, to avoid having a particular location underrepresented in the share calculation. Alternatively, a time period that ends before the best selling locations in the chain run out of the comparable products can be selected, or a combination of the two approaches.

Corrections may be made when historical data reflects stockouts of items. The number of historical corrections to be made depends on the quality of the data selected. Software can interact with a user in determining the stockout types present in the data and offers filling options. The user may decide whether to accept the default or to alter the default assortment fill weighting method. Alternatively, the software may select the fill method to be used.

Logic for correcting data by filling stockouts is illustrated in FIGS. 9A–B and 10A–C. The system may provide for overriding any of the stockout types using straight or orphan logic. Both straight and orphan logic determine when sales start and stop (depending upon user specified parameters) and, as necessary, override in stock assessments. In FIGS. 9A and 9B, the data used by the system includes calendar date 901, whether or not stock was on hand 902, the sales on the specific date 903, the sales program starting date 904, and the sales program ending date 905. At the beginning of the program, for early sales, using the straight sales logic the system interprets the lack of sales 906 as a stockout condition. Although the on hand data 902 suggest that inventory was available for sale, the sales pattern suggests that the inventory was not on display. The system may present the user with options for filling the stockout period from October 1 to Oct. 4, 1998 (labeled 906).

At the end of a sales program, the system interprets the lack of sales on Jan. 5, 2000, labeled 907, consistent with the on hand data 902 as indicating that the inventory stockout immediately followed the program close out date 905. In this example, a single sale 907 nearly two weeks after the earliest prior sale may be flagged by the system as a likely mistake in the data, which the user may choose to override. A threshold can be set to identify orphan sales which should be ignored for purposes of detecting stockouts at the beginning or end of a sales program, such as one or two units sold at a location separated from other sales by two or more days of no sales, at the beginning or end of the sales program.

Two different options for filling stockouts, average and profile filling, are graphically illustrated in FIGS. 10A–C. The average filling approach calculates the average sales for in stock days during each promotional period and then applies the calculated average to each day stocked out. The profile filling approach uses the stocked out day's percentage share, from a profile, to calculate the filled sales. If a user elects to use profile filling and the item is not associated with a profile, then a profile may be assigned for use or average filling can be used. Other forms of filling or other forms of average filling may be used, such as taking the sales for a number of days around the stockout day and using the average sales for those days.

Figure 11:
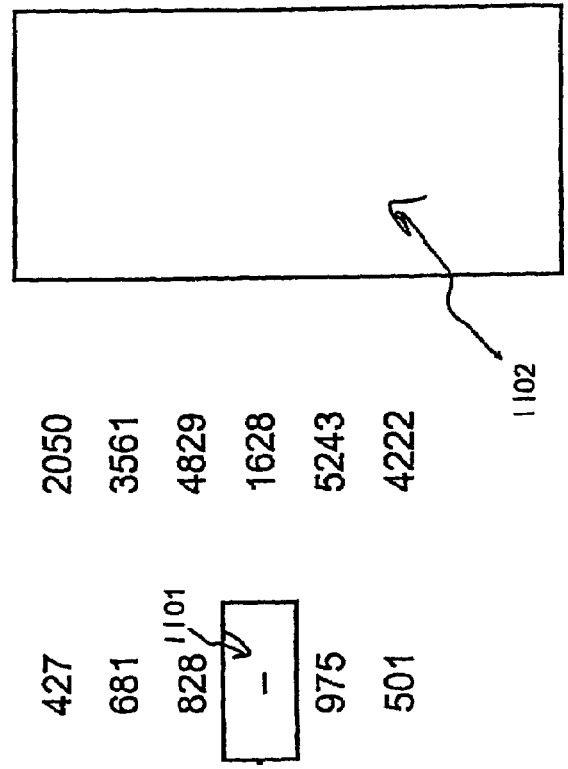
FIG. 11 depicts historical corrections by assortment fill.

An additional historical correction may apply when shares are based on an assortment of items, particularly when some of the locations did not stock all of the same products as other locations. This correction is called an assortment fill. Assortment fill applies to situations where the item was not stocked at a location; this is different from stockout filling which applies to individual days when an item stocked at a location was out of stock. FIG. 11 illustrates this. Cell 1101 is blank because product 105423 was not stocked at some particular location. One option is to fill the cell, so that the total shares by location calculated and displayed in column 1102 are not prejudiced by the assortment of goods carried at the particular location or by the group of products selected as a basis for calculating shares. The assortment fill function provides that locations that did not sell one or more of the items used to calculate a share will not be given an inappropriately low share.

The type of assortment fill weighting used may be selected when a user creates shares or profiles. Two different types of weighting include: unit sales and percent sales. Unit sales weighting is based on total units sold and is useful for large unit volume items. Percent sales weighting is based on the share for each item. Other forms of weighting may be used such as the dollar sales of each of the items. Selecting the best form of weighting for a situation can vary, for example if for a high volume item units may be the best approach while for a high price item dollars may be the best and for a typical item percent sales, but is important to generating a most representative weighting of the items.

While stockout corrections are presented in this example in the context of adjusting shares, the same method applies to adjusting reference profiles and to projections made from historical data impacted by stockouts.

Selection of the items of interest, the time period, the stockout type, the stockout filling, and the assortment filling selected primes the system to create shares. The shares algorithm typically is run for all of the locations for which an operator is responsible. Being over inclusive of locations does not distort the relative shares of a subset of the locations; being under inclusive requires that shares to be recalculated. Calculated shares are named. FIG. 12 is an example of calculated shares. Column 1201 specifies location codes. Column 1202 gives names of locations. Column 1203 gives unit fractions for specific locations. These unit fractions total 1.0.

Create Profiles

In the example described here, shares are created before profiles. However, these aspects of the present invention may be practiced separately or in a different order. In the course of setting up shares, most of the data has been collected to create profiles. The required data and resulting outputs are described in a table below. A profile is a set of historical data corresponding to day-by-day or more frequent sales. Typically, this set of data is stored as fractions adding to 1.0, where a daily sales fraction is the fraction of season unit sales that would occur on that day. Alternatively, actual sales volume can be stored, subject to scaling as necessary. Again, however the data is stored, the invention can readily be adapted to historical data retained for intervals more frequent than daily, for instance, for three shifts a day. Like shares, a profile may be determined for a group of items so that the location level sales do not reflect individual anomalistic situations. A user typically selects locations to group together which could, but does not have to, be all locations. Those groups should have similar time selling profiles and the group should be sufficiently large to overcome random selling noise but not so large as to blend together locations with different time selling.

Figure 13:
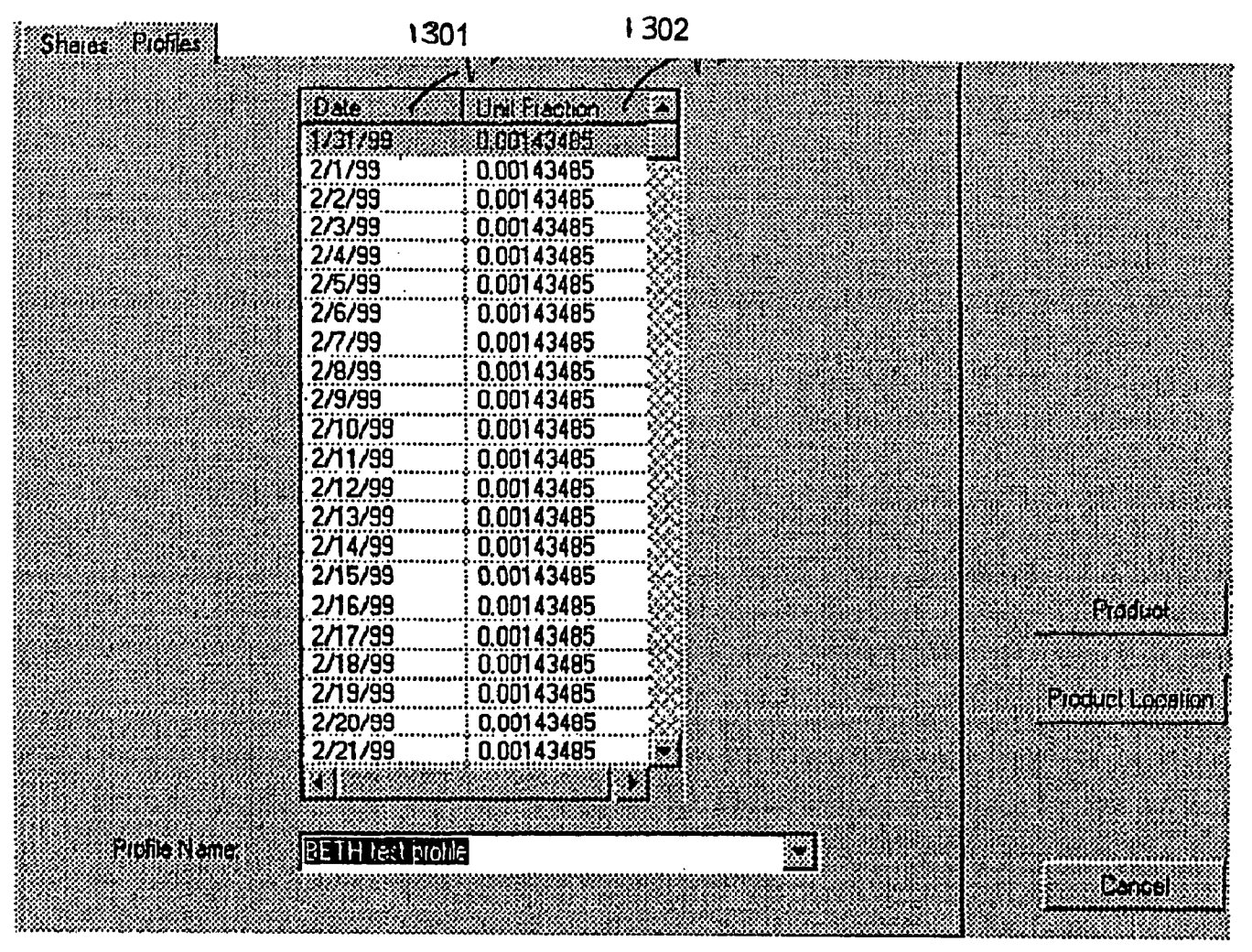

A system embodying aspects of the present invention may provide utilities to generate a diagnostic profile output for an item or set of items and a number or all of the location locations. This is done by selecting the stockout type(s) and stockout fill. In addition, a share/profile weighting needs is selected. The diagnostic profile output provides a day-by-day unit sales profile for each of the locations specified, enabling a user to look for unexpected differences. Unexpected differences can to be evaluated to determine whether they are legitimate differences or result from anomalies. Diagnostic profiling facilitates grouping locations that have roughly similar profiles. Profiles can be run by group. Users may prefer to have fewer rather than more profiles, to evaluate the differences among profiles, and to make judgments about whether differences observed in the past will continue into the future. A sample output for a uniquely named profile is shown in FIG. 13. Column 1301 lists dates covered by the profile. Column 1302 is unit fractions for a profiled period, which add up to 1.0.

Profiles can be created based on more than one reference product or more than one reference profile. It may be useful to create a seasonality selling profile, distinct from the product selling profile. A general profile reflecting seasonal selling can be created based on sales of a group of more basic or non-seasonal items. Alternatively, it could be created based on sales of a group of non-promoted seasonal items. A reference selling profile can then divided by or ratioed to the general profile to give a seasonally adjusted product selling profile. A seasonally adjusted selling profile can usefully be applied to a different calendar period as a reference profile. Otherwise, days can be shifted to reflect differences in the calendar from year to year and time period to time period.

In addition to the creation of shares and profiles, a user typically works with the fashion allocation system to set up items and locations. However, the order in which the user carries out the steps described in this example is optional; many of the steps can be carried out in no particular order or in parallel.

The set up of items and locations for the fashion allocation system, typically is done once. Set up information should be modified when the sales program changes and when there are refinements to what is done. There are a number of settings that are done at the item level and that are done at the item/location level.

| | INPUTS (OUTPUTS) | |
|---|---|---|
| Input | Description | Considerations |
| Item level | | |
| Share | A share | Select an appropriate named share. |
| Share Group | Set of items used to make in-season share adjustments | Which items have similar selling characteristics |
| Available Buy | Quantity available for specified locations | The total buy for these locations |
| DC availability override | Quantity available for distribution | What will really be available |
| PQ distro minimum | Flag to specify whether to use PQ minimum or not | Whether you want each location to get a minimum of the PQ |
| Case distro minimum | Flag to specify whether to use case minimum or not | Whether you want each location to get a minimum of one case |
| Coverage index | Safety stock-like coverage factor varying by sales percentage | Balancing safety stock vs. liability of putting stock in wrong place |
| DC availability override | Override quantity for distribution in units | When you want to run a distro, distributing more stock than is in the DC |

-continued

INPUTS (OUTPUTS)

| Input | Description | Considerations |
| --- | --- | --- |
| Location level | | |
| Profile | A profile | Select an appropriate profile for an item/location |
| In date | Date when item is ready for sale at location | In-location setup date |
| Out date | Date when item should be sold out | Plan |
| Pivot date | Date when specified item sell through desired | Whether there is some special timing driving the use of a pivot date |
| Pivot before percent | The percent sell through specified by the pivot date | Plan |

Following settings may apply at the item level. Because the same settings often apply for a group of items, the fashion allocation system may facilitate making settings for an entire group. For convenience, it may allow a user to make settings for a group and then go back and change the settings for exceptional items.

A user may select the item or items that they want to set up and specify a share to use, a share group to use, whether a PQ and/or purchase minimum is required, a coverage index to use, and whether a distribution center availability override is desired. Specifying the share typically involves selecting the name of a previously created share to be used. A share group is a set of items that are grouped together for in-season share determination purposes, for example the share group could be a single item, a single style, many items of the same size across a number of styles or a number of items or styles that share common characteristics. As with a share, specifying a share group involves selecting the name of a previously created share group.

Figure 14:
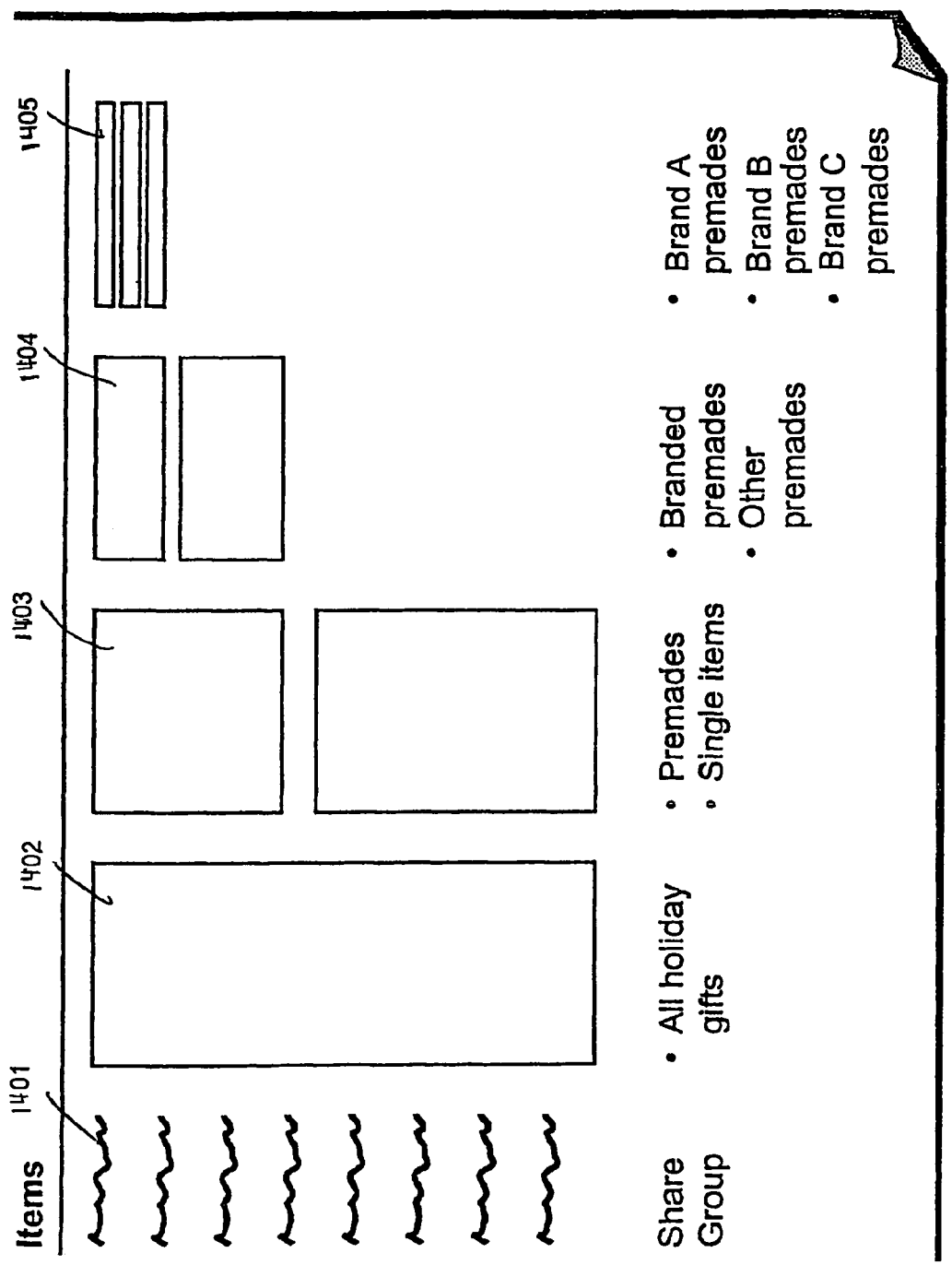
FIG. 14 graphically depicts a hierarchical share group.

A share group serves an aggregation function similar to that of the share, constructed for group of items. FIG. 14 illustrates a hierarchical share group. Column 1401 is a list of items in an overall share group. Column 1402 symbolizes the highest categorical level of the share group. Column 1403 subdivides column 1402, as into premades and single items. Column 1404 further subdivides part of column 1403, separating premades into branded premades and other premades. Finally, column 1405 further subdivides the column 1404 branded premades into premades from Brand A, Brand B and Brand C.

Once in-season sales began, the fashion allocation system may be capable of modifying the share used in creating the model stocking level based on actual sales. This modification is applied by location. However, in cases where the selling quantities are relatively small at the location level, the system may avoid modification to the model stock based on a single item/location sales results. This may be avoided because the usual randomness of selling results in some locations selling a number of items quickly and others selling none; both of these events are within the expected range and variation of selling. Therefore, to quickly pick up real trends in selling, the system may to use a share group to look at a number of items selling in a location and make adjustments based on a share group, rather than a single item.

Upon completion of initial data input, a system practicing aspects of the present invention may prompt the user to specify for each location whether the location will receive a minimum of one case of product, the economic stocking level, the item/location specified PQ or the larger of the economic stocking level or specified PQ. This assumes that there are enough units available to satisfy a selected minimum. However, if the minimum is not satisfied, the system should do its best to fulfill the requirement and then let the user know that there was insufficient available product. Then the system may attempt to fulfill the missing quantity next time that a distribution is run and continue to do so until the minimum is fulfilled.

A Coverage Index can be specified. The Coverage Index specifies a multiple of expected sales for the coverage cycle that will be distributed in the first allocation to the locations. It is similar to so called safety stock for basic goods; however, it does not function quite like safety stock, because all of the fashion goods in a sales program are intended to be distributed in a specific time period. Any so-called safety stock sent out early in the sales program serves as a cushion against sales occurring faster than expected, but also amounts to a potential liability for distributing stock to a slow selling location.

Figure 15:
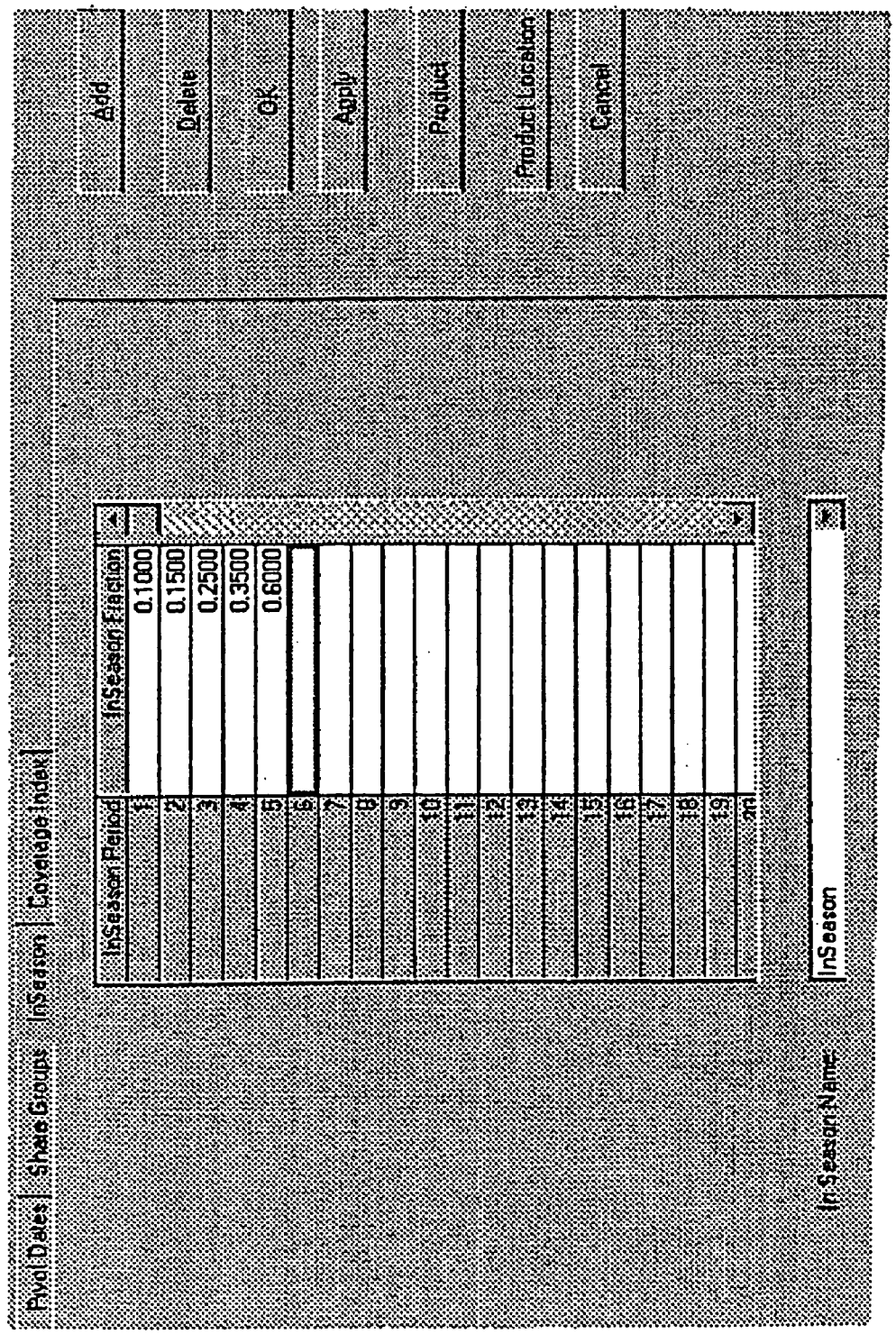
FIG. 15 illustrates an interface for entering or changing in season fractions or factors.

FIG. 15 illustrates an interface for entering or modifying in season fractions or factors. As actual sales results become available, the mix between relying on projections and actual sales may shift. In season fractions may automate the process of shifting this mix. FIG. 15 illustrates five different weighting factors applicable in five different in season periods. The in season periods may correspond to fractions of the planned period for a sales program or it may correspond to the fraction sold of the planned total buy or total planned sales volume. The weighting factors may be applied directly or according to a formula.

The fashion allocation system process also involves specifying a distribution center availability override, if applicable. A key distribution center override allows the user to run a distribution with a quantity greater what is available in the default distribution center.

Additional setups are done at the item and location level, which are sometimes referred to as location level setups.

Location setup can be done for a single item/location combination or it can be done for many combinations of the same time. If it is done for many, each of the many will get the same setup. In some instances, the quickest way to input certain settings may be to specify all of them at once and then edit the few exceptional items/locations. The user may proceed to set up and specify the profile to be used, a sales in date, a desired sales out date or close out date and, if the sales program includes it, a pivot date and pivot before fraction. Specifying the profile involves associating particular item(s) and location(s) with a profile. Specifying the sales in date is a matter of inputting the date when an item is expected to be in the location ready for sale. The out date is the date by which the item preferably is completely sold out this location. Finally, a pivot date is used in special event selling situations where the sales plan involves having sold a specified percentage of the goods by a specific date. Specifying a pivot date anchors a sales plan, so that the specified percentage of goods to be sold by the pivot date remains the same, even if the in or out dates change. For example, if it is preferred to have sold 90% of units of a product by Christmas day, then the Pivot Date would be December 24$^{th}$ and the Pivot Before Fraction would be 0.9.

Setup PQs and Causal Calendar

Presentation Quantities (PQs) may be set for each item, location, and time period. These PQs represent potential increases to the allocation quantities that would otherwise be calculated. The PQs are typically set to ensure that fixtures within locations are visually appealing with sufficient product on hand, presumably increasing customer propensity to buy. These PQs may be subject to a cap. Such a cap may be a proportion of the projected remaining sales, for the life of the sales program. Or, it may be a factor of the ratio of stock on hand at a location to projected remaining sales. Over time, such a cap naturally may be reduced, much as the reliance on actual sales as opposed to projected sales is increased over time. It is useful to reduce and eliminate the use of PQs for distribution as the end of a sale program approaches because stock on hand must drop below the PQs in order to sell out or close out the stock.

The causal calendar can identify historical or planned promotional events on an item, location, and time period basis, with the user analyzing sales lifts associated with historical promotional events or setting the expected sales lift associated with a planned event. For example, an item may be promoted with a 25% price discount from one date to another date in all locations, and this might result in an expect 100% increase in sales. These causal calendar entries will be used to adjust the projected sales profile at the location-item level. These adjustments can be made by historically based sales lift calculations, current in season selling lift calculations, a blend of historical and current calculations or different variants of specified values.

Run Distributions

The table below identifies some of the inputs and outputs that may be useful for running a distribution.

| ELECTRONIC INPUTS | |
|---|---|
| Sources | Data elements |
| Other elements | Shares |
| | Profiles |
| | Item and location setup |
| | PQ and Casual Calendar |
| | Actual Results |
| Shipments | Item/location shipments so far |
| Shipment changes | Any discrepancies, transfers or other impact to item/location shipments |
| Actual | Actual unit sales for the item/location so far |

| USER INPUTS | |
|---|---|
| Inputs | |
| Distribution Date | When distribution will take place |
| First Distribution Flag | First distribution |
| Last Distribution Flag | Last distribution |
| Next Distribution Date | Date of next distribution (if this is not the last distribution) |

| OUTPUTS | |
|---|---|
| Element | Description |
| Item/location distribution | Quantity of goods to be sent to each location |

As the season progresses, the fashion allocation system may automatically react to actual sales and modify the distributions to reflect overall item and individual location sales trends. The fashion allocation system can be programmed to highlight major differences. Major differences may then be evaluated to determine whether the differences flagged indicate are a real trend that should be reacted to, or whether there are some extenuating circumstances. The system logic and resources can react automatically to trends; this automatic reaction may be tempered or overridden by a user when there are extenuating circumstances.

Using shares and profiles, PQ and causal calendar information, a system practicing aspects of the present invention can easily produce a distribution. To do so, the user sets up and names an activity. That activity specifies the items and locations to be included in the distribution. That activity is "run" and then saved for reuse. To run a saved activity, the user may simply specify the date of the intended distribution, whether that distribution is a first, last or intermediate distribution and if it is not the last distribution then the date of the next distribution. With these or a subset of these parameters, the distribution run can proceed.

The user specifies the reports to be printed for the distribution. Two typical reports include the Model Stock report (FIG. 16) and the Distribution report (FIG. 17). The Model Stock report includes key inputs and outputs for determining the item/location cumulative model stocks. The Distribution report then starts with the model stock and works through to the actual quantity for distribution to each location. An approved Distribution report may then be uploaded for distribution by a Distribution Center.

FIG. 16 shows a layout of the model stock calculated for multiple locations for a single item. The column for Location Number is the number assigned to the location by the retailer; Location Description is the description assigned to the location by the retailer; In Date is the first selling date of the item in the location; Out Dates may be the last intended selling date or the close out date of the item in the location; Activity Cycle End is the expected receipt date in the location of the distribution subsequent to the one for which the model stock is being calculated, or, alternatively, the out date if no more distributions are planned; Profile Name is the name that has been assigned by the retailer to the specific profile being used for the purpose of distribution; PQ is the presentation quantity assigned by the retailer for this item and location in order to ensure an aesthetically pleasing presentation; Plan Share Percent is the share for the location and item calculated in advance of the season. Group Sales Share Percent: the share for the location and item based on actual selling in-season; Interweave Share Percent is the Plan Share adjusted by the Sales Ratio (as defined in the distribution calculation described below.) This represents a weighting between the Plan Share and the Group Sales Share Percent depending on the Interweave Factor in effect.

Cumulative Model Stock is the cumulative model stock for the item and location. Sales Thus far is sales to date for the item and location.

FIG. 17 is a Distribution Report that shows the actual distribution quantities calculated for location for a given item. In the report Location Number is the number assigned to the location by the retailer. Location Description is the description assigned to the location by the retailer. In Date is the first selling date of the item in the location. Out Date may be the last intended selling date or the close out duty of the item in the location. Activity Cycle End is the expected receipt date in the location of the distribution subsequent to the one for which the model stock is being calculated. Cumulative Model Stock is the cumulative model stock for the item and location. Previous Shipment is the quantity of the item that has already been shipped to this location. Desired Shipment is the desired shipment quantity to the location (equal to cumulative model stock less previous shipment). Case Rounded Shipment (Units) is the desired shipment constrained by rounding to the nearest integer case quantity or to the next larger integer case quantity but constrained by the total available to distribute. Case Rounded Shipment (Cases) is desired shipment as above, in cases as opposed to units. PQ Distro Minimum is user input flag, where Y indicates that any calculated shipment quantity will be overridden to ensure the distribution of a minimum of the presentation quantity for the location, item, and time, and N indicates that it will not be overridden. Case Distro Minimum is user input flag, where Y indicates that any calculated shipment quantity will be overridden to ensure the distribution of at least one case per location and N indicates that it will not be overridden. Insufficient PQ is a calculated flag, that indicates if the system was unable to satisfy the presentation quantity needs in all locations.

The actual distribution quantity can be calculated to take into account the model stock, previous shipments to the location, such factors as transfers, sales and other factors impacting quantities available such as damaged and therefore non saleable items. The following formula is useful in calculating model stock:

$$\text{ModelStock} = \text{TotalBuy}_{item} \cdot (\text{Share}_{item,location}) \cdot (\text{Pfile}_{item,location,date1,date2}) \cdot (\text{SalesRatio}_{item,location}) \cdot (\text{CoverageIndex}_{\%sellthru}) + (\text{CappedPQ}_{item,location})$$

In this equation, $\text{TotalBuy}_{item}$ is equal to the total quantity of the item available to be sold during the entire length of the program. It may also be called the "buy quantity" or "total buy." $\text{Share}_{item,location}$ is equal to the share calculated for the specific item and location as described earlier. It represents the single location's expected selling quantity of the product as a fraction the total. $\text{Pfile}_{item,location,date1,date2}$ is equal to the sum of the daily profile quantities for the item and location from day1 to day2, where day1 is the date of the start of the item selling, frequently called the in date, and day2 is the receive date of the next distribution. (This formula and the invention can readily be adapted to historical data retained for intervals more frequent than daily.) For example, if the in date were November 1, the next distribution date were November 8, and the shipment would take five days to get to the location, then the Pfile would be equal to the sum of all the daily profiles from November 1 to November 13.

$\text{SalesRatio}_{item,location}$ is equal to $(\text{UnadjustedSalesRatio}_{item,location}) \square (1-\text{factor}) + (1 \square \text{factor})$, where the $\text{UnadjustedSalesRatio}_{item,location}$ is equal to the ratio of actual selling to projected sales. In cases where the sales ratio is calculated to be less than 1.0 the system, depending upon user specification or automatic set up, a user optionally may elect to use 1.0 instead of the smaller number. The rationale for that option would be that the selling is below plan but markdowns can and may be made on short notice to increase sales to the plan level and therefore distributions should anticipate that possibility and have sufficient goods out in the locations. When a distribution is run, the projected sales for a time period typically equals TotalBuy multiplied by the sum of daily profiles (fractions adding to 1.0) from the beginning of the program through the day prior to the distribution run. A factor, such as the in season factor, may be user specified as a function of sell-through or elapsed part of the planned selling period. At low sell-through levels, it is useful for the factor to approach 1.0, while at higher sell-though levels, it may be more useful for the factor to approach zero. This factor determines the relative weighting of planned sales to actual sales.

In the formula above, Coverage Index is an index typically specified by the user during user setup. During setup, the user can specify a range of coverage indexes that vary over time, for instance linked with the percent sell-through of the product. Typically, it is useful to start with higher values (e.g., 3) and then drop to 1 as the product approaches complete sell-through. $\text{CappedPQ}_{item,location}$ is equal to the desired presentation quantity set for the item and location for the time periods relevant for the distribution, but reduced such that the sum of the presentation quantity and the balance of the calculated distribution quantity does not exceed a fraction of remaining expected sales for the item and location for the balance of the program (as calculated by Total Buy $\square$ Share $\square$ Profile $\square$ SalesRatio).

A system practicing aspects of the present invention can automatically react to in-season selling results by altering the distribution of goods to match sales trends. For instance, when selling starts and the item moves faster than plan, the fashion allocation system can immediately adapt to the higher selling sales rate and increase the size of the next distribution to catch up. Since the fashion allocation system has a safety stock-like cushion built into its early distributions, usually an adaptation to a higher than projected sales rate can take place without sales disruptions.

The fashion allocation system also can react automatically to any changes in the causal calendar. When a user adds, subtracts or changes promotions, the impact on sales can be automatically reflected in subsequent distributions. Likewise, the fashion allocation system can automatically react to markdowns. In typical cases, a markdown is taken because sales have not met expectations, leaving more inventory in the locations than desired. Therefore, the markdown may be a "catch up" to move actual sales closer to planned sales. However, if it results in a faster than planned sales rate, the fashion allocation system can react at the next distribution and increase the flow of goods to compensate for the markdown actions. It also can alert the user to adjust additional scheduled markdowns.

A system practicing aspects of the present invention may be able to react to trends in in-season selling in two or more ways. First, if the Share Group Factor for an item and location is changing, the distributions can be increased or decreased to reflect that impact on the item/location Model Stock. That Share Group Factor will change if the items that constitute the Share Group are selling above or below plan. That trend in sales can be reflected in the calculation of Model Stocks. There is also a second mode applicable at the item and location level. If an item has sold more or less than planned to date, the specific difference can be added to or subtracted from its next distribution. In other words, if an item/location has sold 10 more than its plan to date then it will be shipped an extra 10 in its next shipment to replace those sold. However, this replacement should not necessarily be on a one-to-one basis, as such a reaction might result in an inordinate increase in model stock for that item and location. Response to changes in the Group Share Factor, instead of an individual items sales, can reduce over reactions to random sales events.

The system's capacity for automatic in-season changes makes it useful for users to exercise judgment and to make sure that anomalistic events do not precipitate unwanted, automatic changes.

Monitoring of in-season selling vs. planned selling is one way to test whether the user selected the right shares and profiles. Two indicators reported by the system are whether there are large differences in the plan versus actual location sales shares (usually measured for the share groups) and whether the week-by-week sales rate (relative to plan at the item level) is moving a great deal. If the Share Group Factor is moving a great deal for many if not all of the locations then the user may not have used the right share. The user may have selected a special event share when they should have used a more regular selling share or visa-a-versa. If that is the case, the system can easily be used to correct the error and rerun the distribution.

If the Share Group Factor is moving a great deal for a single location or a small number of locations, then the user may be alerted to check whether there has been some abnormal selling impact at those locations. Goods may have been delayed or set up early. Locations may have under or over presented the items. The user also may consider whether the right share was selected.

In addition, distributions may encounter shortages in product available to be distributed at the time desired. This may be during the middle of a sales program, while awaiting additional inventory, or at the end of the program. In the instance of shortages during the program, logic may be provided to best decide where to send the limited amount of goods. One logic provides for proportional shipping to each of the selling locations. Other logic may take into account case quantities the item(s), so that full cases are shipped, or for other user definable priorities such as filling the presentation quantities first. These factors can automatically be factored into the actual distribution quantity sent to each selling location.

Markdown Manager Overview

The Markdown Manager includes aspects of the present invention which can assist the user in determining the timing and magnitude of markdowns of fashion and seasonal items, as they impact gross margin, profit, sell out date, remaining on-hand inventory or other measures of effectiveness.

Based on the sales profiles associated with items and locations during the fashion allocation system setup, Markdown Manager can create an array of potential markdown scenarios, based on the allowed markdown levels and markdown dates, and calculate revenue and other measures of effectiveness all or some of these scenarios. The scenarios are run for combinations of markdown levels and dates. These combinations can be specified by a user or generated automatically from lists of markdown levels and dates. Rules can be applied to the markdown levels, such as markdowns should become more attractive during the selling season, not less attractive. One or more scenarios may be reported. Typically, the markdown report produced by the Markdown Manager is then reviewed by merchants and planners to accept or adjust the specific system recommendations, and then the resulting markdown decisions are entered in the causal calendar.

Five activities comprise the Markdown Manager operation:
1. Select items and locations
2. Select markdown dates
3. Setup markdown discount percentages
4. Run Markdown Manager
5. Enter selected markdowns into the causal calendar In addition to the set up described above, item/locations may be associated with to pivot dates, which anchor markdown activities even if the in and out dates for a sales program are modified.

Figure 18:
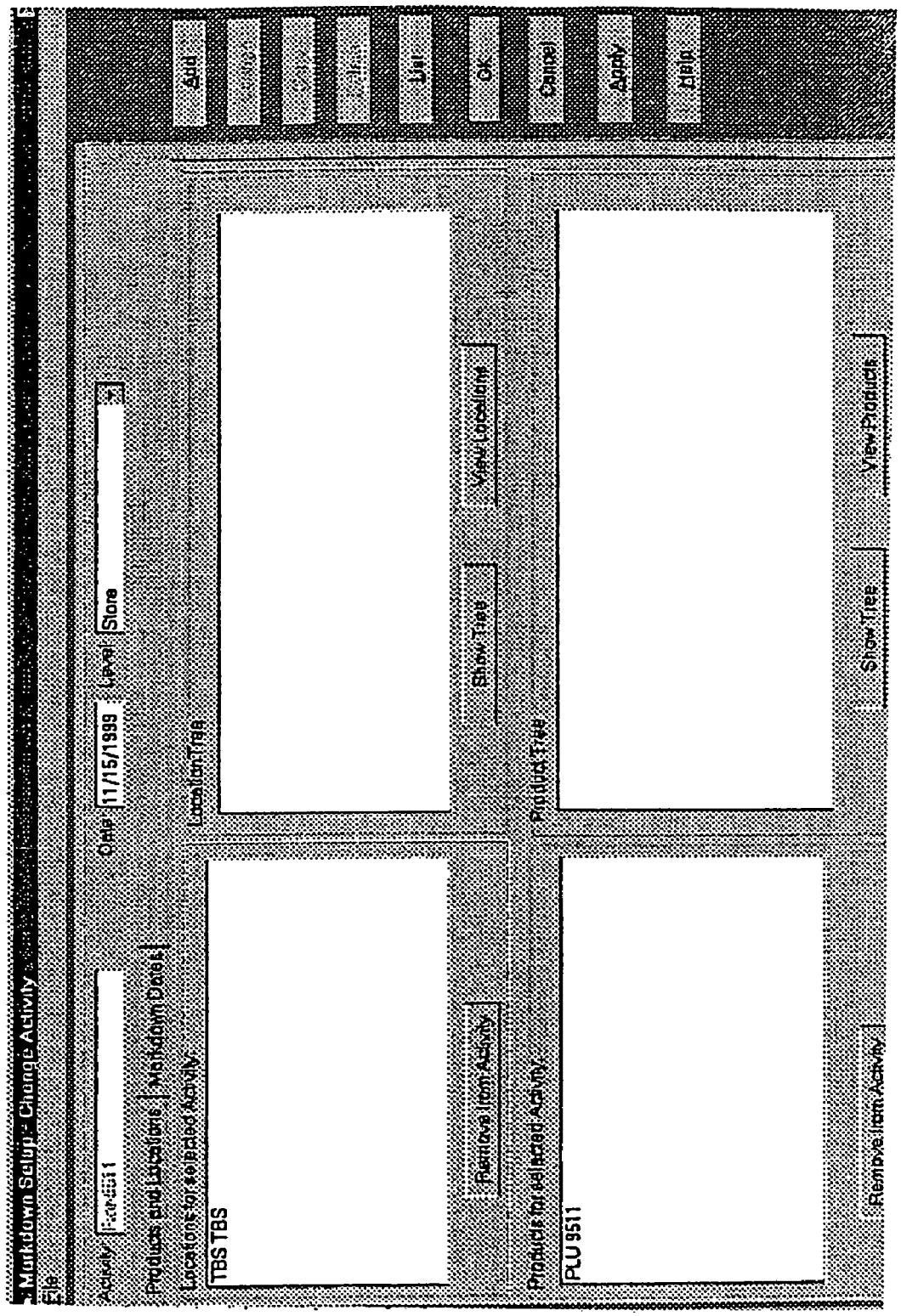
FIGS. 18 and 19 illustrate an interface is for setting changing markdowns.

Setting up a markdown activity includes selecting items and locations for which markdown scenarios will be generated and reviewed. An interface for doing this is depicted in FIG. 18. One option is for the Markdown Manager to generate scenarios using the same markdown for each product across all of the different locations; that is, so pricing is always constant from location to location. One input is a specification of the items and locations for running markdowns scenarios.

In many cases, a useful way to create a markdown activity may be to copy a fashion allocation system activity that was created for fashion distributions. If all of the fashion activity items are eligible for markdown at all of the locations to which the items were distributed, copying the existing activity may be substantially all that is required. If select items are not eligible for markdown, they may be removed from the markdown activity before or after copying. Even items ineligible for markdown can be included in a run in order to see what markdown recommendations emerge, because system recommendations can always be ignored.

Figure 19:
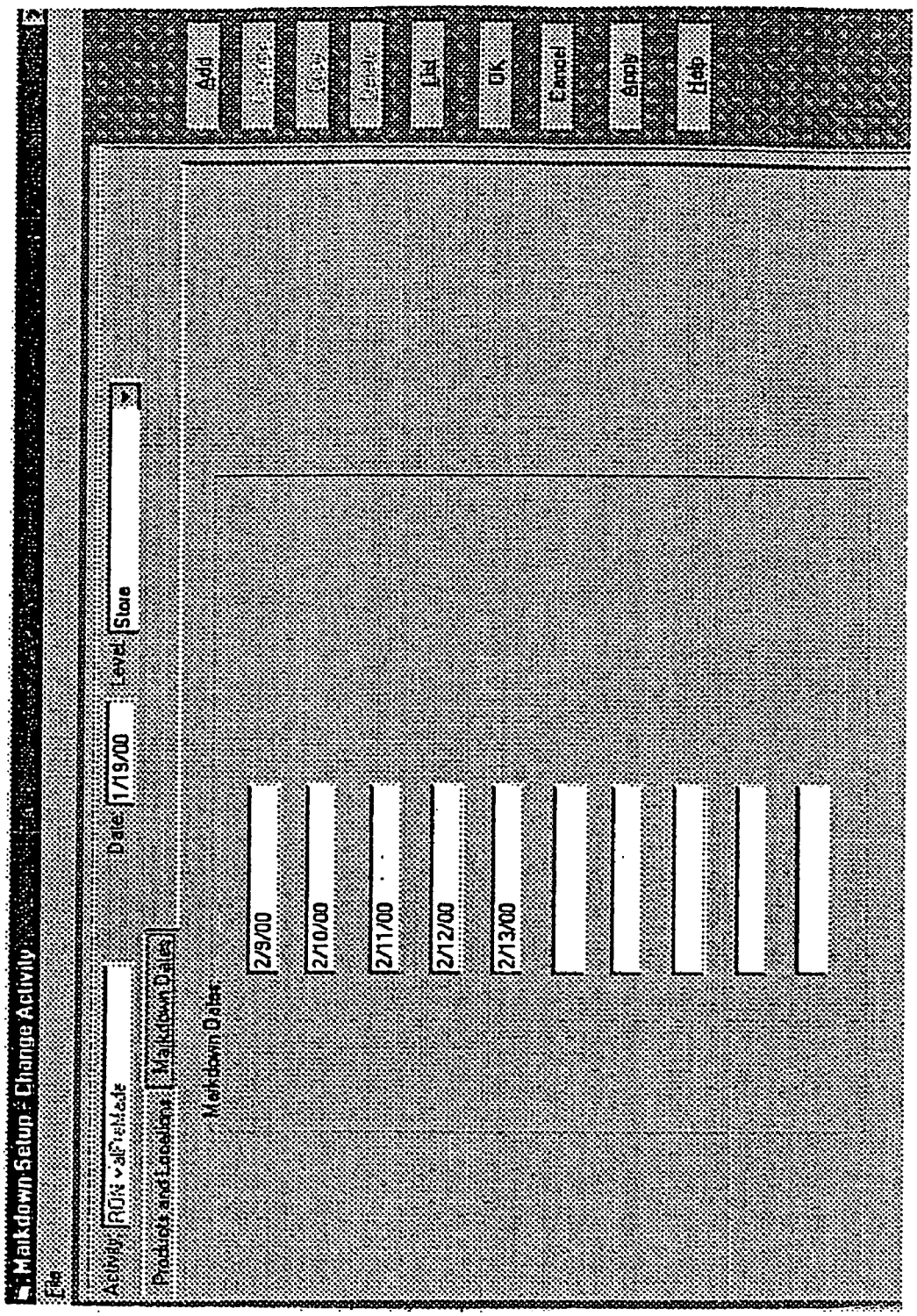

Setting up a markdown activity also includes specifying the eligible markdown dates. An interface for doing this is depicted in FIG. 19. These dates indicate to the system which days markdown actually may occur. The system can test all eligible markdown levels at each of these dates to generate potential markdown scenarios.

The eligible markdown dates should begin after the start date of the program and the last date should be before the conclusion of the program. For a Christmas program, for example, eligible markdown dates might include weekly Wednesday markdowns beginning the Wednesday before Thanksgiving and ending the Wednesday before Christmas. In this example, each of the Wednesday dates would be entered into the system. The system could then use those dates as potential dates to begin a markdown.

Figure 20:
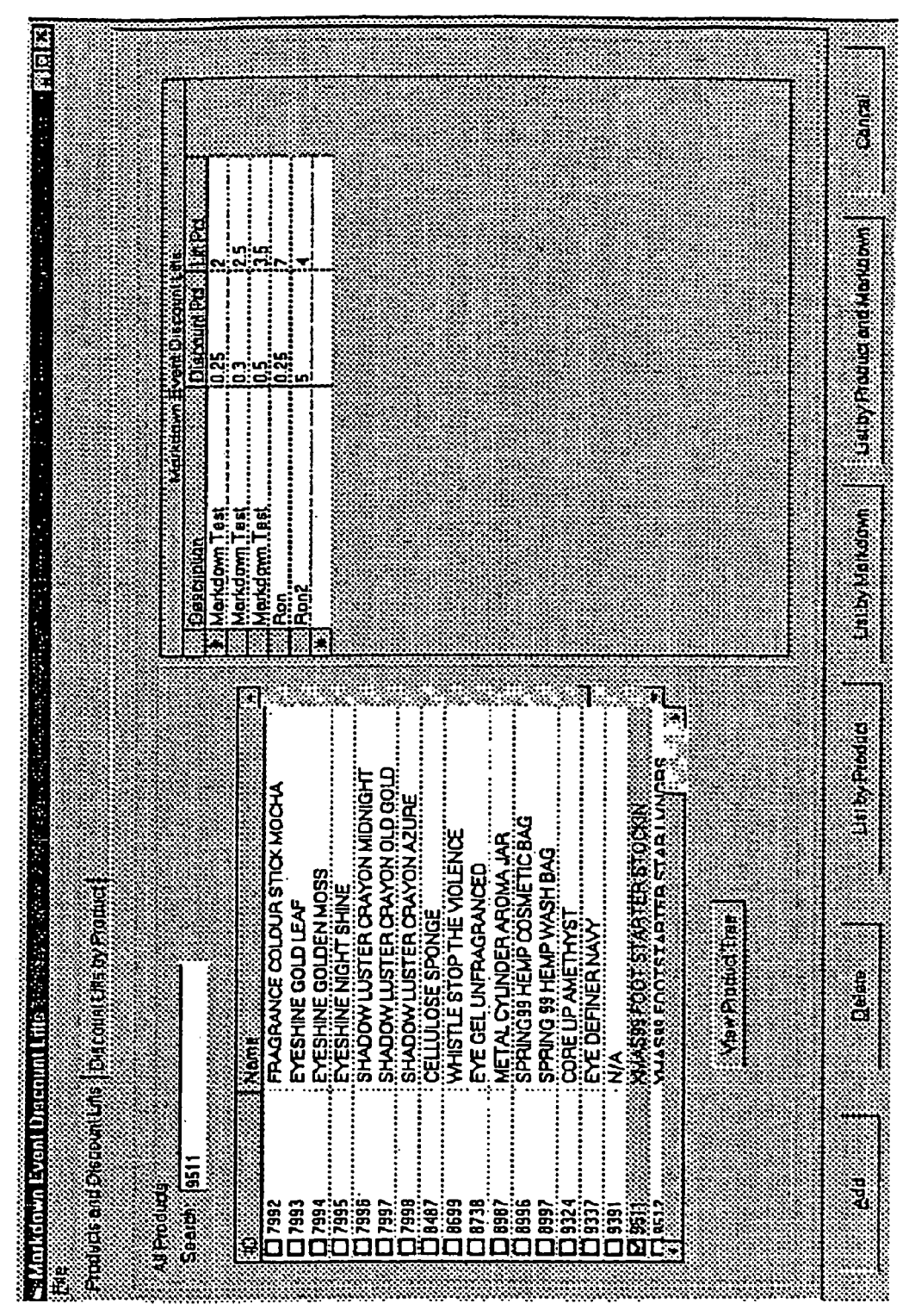

Preparing for a markdown run further includes associating items with potential markdown levels and associated sales lifts. An interface for doing this is depicted in FIG. 20. If the same potential markdown levels (e.g., −25% and −50%) apply to all products and the sales lift associated with each of these markdown levels is identical across all items, then all that is required may be entering and selecting these two price levels and then applying them to the entire product tree. If different potential markdown levels apply to different departments or even different items within the same department, then all of the markdown levels may be entered into the system and associated with the items. Alternatively, sales lift data can be stored in a library or database accessible to the user, so that a sales lift can be selected based on past experience.

The markdown levels specified for an item are the levels tested. For example, if the eligible markdown levels are −25% and −50%, then these are the levels that they system will recommend. In providing the recommendation, the system will determine the appropriate date (constrained by the set of dates specified in the activity) that the markdown should take place or if a markdown would be counter productive.

In one embodiment of the present invention, each markdown level is assigned a descriptive name (such as "25 off"), a discount percentage (0.75, in this case, to represent 25% off), and a lift percentage. The lift percentage indicates the sales acceleration generated by a markdown of this level. For example, a lift factor of 2.0 associated with a discount percentage of 0.75 indicates that a 25% off discount results in a sales multiple of 2.0. If different items respond differently to the same discount percentage, the same discount percentage can be entered multiple times in the table. For example, "25% off fragrance" and "25% off colorings" will both have a discount percentage of 0.75, but they may have different lift percentages. When matching markdown levels with items, the appropriate markdown discount and consequent lift should be selected.

A further aspect of the present invention is using the system to analyze and evaluate past sales results to determine the markdown lift percentages. This analysis can take the form of a graphical comparison of projections based on early actual sales versus historical actual sales after a markdown, or a more analytical lift percentage or factor.

With the setup activities complete, the Markdown Manager can be run. Typically, the Markdown Manager will be run one to three days in advance of each of the potential markdown dates, so that the results can be reviewed, the markdowns decisions made, and the decisions implemented on the markdown date.

Figure 21:
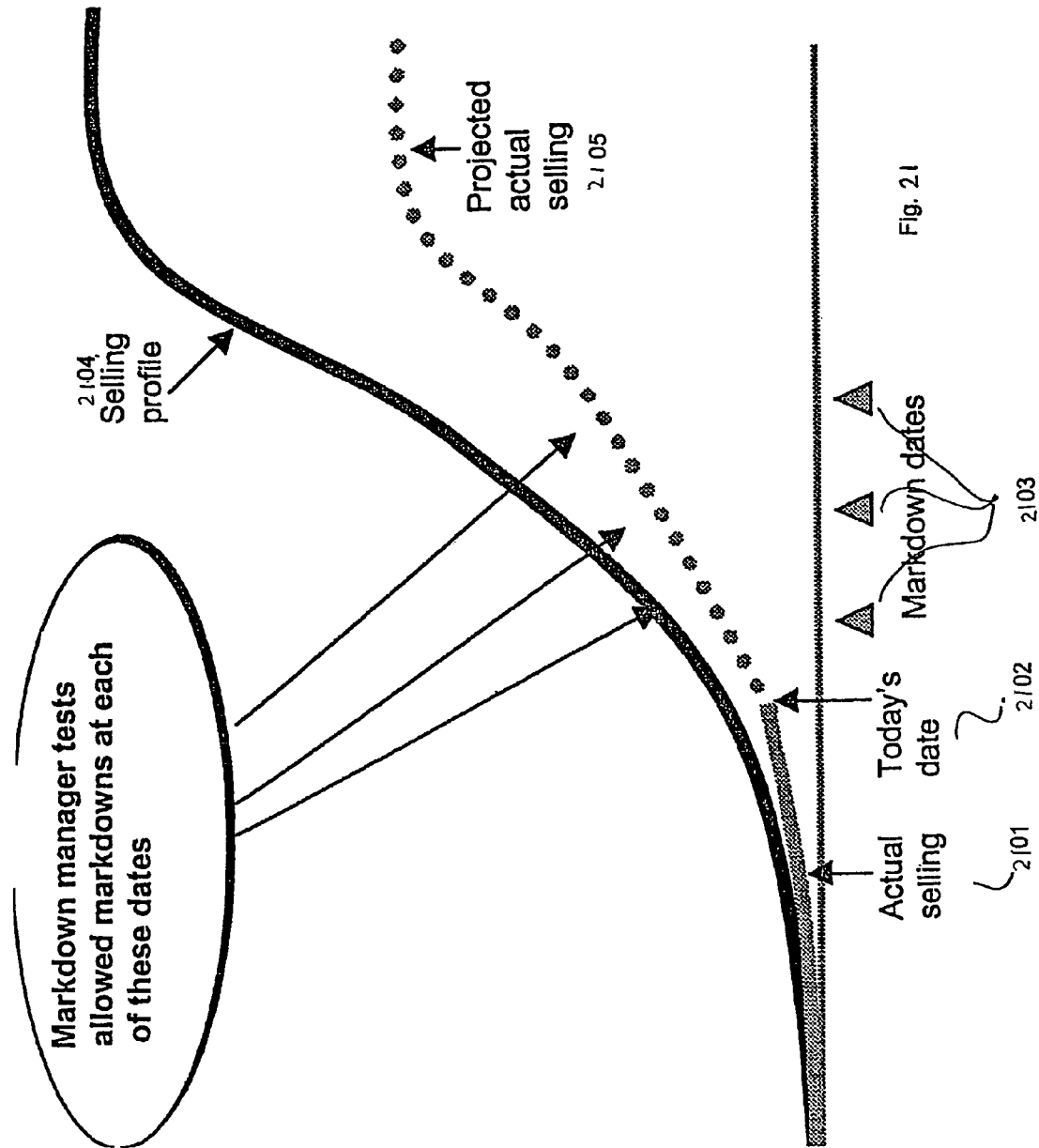
FIGS. 21 and 22 graphically depict aspects of a markdown manager.
Figure 22:
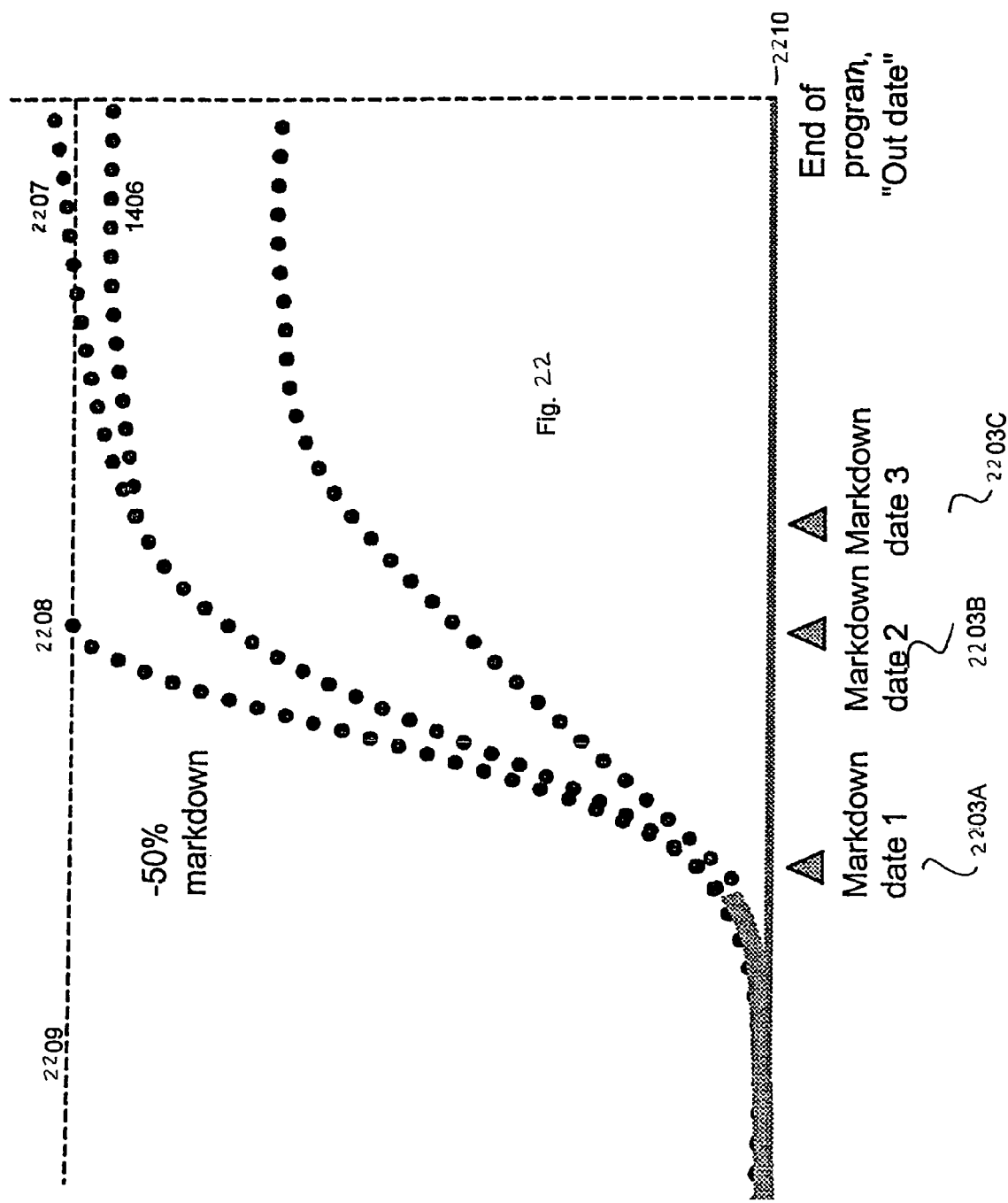

FIGS. 21 and 22 illustrate how the Markdown Manager evaluates alternative scenarios. It first generates all valid scenarios of markdowns, based on all permutations of allowed markdown prices and allowed markdown dates. Scenarios where the price increases over time (caused by a larger markdown followed by a smaller markdown) may be excluded by a rule. Markdown Manager then calculates total revenue and the number of clearance units for each of the scenarios generated. One or more of the highest revenue scenario may be selected for inclusion in the markdown report. Other measures of effectiveness can be calculated and used as a criteria for inclusion in a report. FIG. 21 depicts how the markdown manager detects a short fall of actual sales, as compared to the a priori selling profile. Actual sales are represented by the line 2101. Actual sales information is available through today's date 2102. Potential markdown dates 2103, such as Wednesdays during the Christmas selling season, are entered into the system. The original selling profile 2104 is the reference for comparison against revised projected sales 2105 which can be adjusted to reflect actual sales through today's date. FIG. 22 depicts alternative sales profiles based on an array of alternative markdown strategies. The markdown dates are 2203A–2203C. The end of program "out date" by which all units are supposed to be sold is 2210. The scenarios in this figure are no markdown 2205, a 25 percent markdown 2206, a 25 percent markdown followed by a 50 percent markdown 2207, and a 50 percent markdown 2208. From the curves, it can be seen that much less than the entire stock 2209 will sell out if the no markdown strategy 2205 is followed. The entire stock will sell out early if a 50 percent markdown 2208 is offered early. Other strategies produce intermediate results. A report generated by the markdown manager quantifies the results shown graphically in these figures.

A markdown report on paper, displayed at a terminal or otherwise presented, can identify, for each item, the recommended markdown level at each of the specified markdown dates, a measure of profitability, a sell out date and a number of units left on hand after the close out date.

After the markdowns are reviewed and markdown decisions are made, these decisions can be implemented by entering them into the causal calendar so that future distributions and markdown analysis will reflect the decisions. For each markdown decision made, inputs should be made to reflect the item, the markdown level, and the effective dates. Once the markdown level and time period are entered into the causal calendar, the system will be able to appropriately calibrate selling performance for the next markdown and make the appropriate distribution recommendations.

Basic Goods and Distribution Centers

The handling of basic goods in a distribution network was explained in application Ser. No. 09/755,635, filed 5 Jan. 2001, entitled Method And Apparatus For Modification Of Basic Good Forecasts, by inventors Robert Dvorak and Kevin Katari, which is incorporated herein as if set forth fully. Reorderable goods for resale are sometimes called basic goods. The ordering, post allocation and distribution of basic goods involves significant stakes for operators. Many forecasting methods have been developed to help operators estimate sales of basic goods that will be sold and needed stocking levels. Mere forecasting does not address certain real world considerations; in many ways, projected demand requirements are just a starting point for processes of ordering, post allocation and distribution of goods. Useful methods should modify projected demand requirements to reflect real world considerations, before decisions are made to order, post allocate or distribute goods.

At the beginning of a product lifecycle, it is useful to bring goods into stocking and selling locations in a sensible fashion. In a multi-layer or complex distribution network, such as one involving national and regional stocking locations, there can be substantial complexity in ordering, post allocation and distribution of goods.

The handling of basic goods, optionally in a distribution network, in accordance with aspects of the present invention, provides a computer-implemented method of rolling up projected demand requirements for a plurality of selling locations. This includes, associating respective selling in-dates with a good at a plurality of selling locations; associating respective time elements, corresponding to times for an action to lead to availability of the good at the respective selling locations, with the good at the selling locations; and looking forward from a date related to the action and rolling up projected demand requirements for one or more predetermined selling periods, which commence at one or more dates related to the respective time elements, for the good at the selling locations.

Goods may be distributed to selling locations from suppliers and stocking locations in a variety of patterns. Selling locations may be retail stores operated by a retail chain or its franchisees. Selling locations for catalog or online retailers may be distribution centers. For distributors, selling locations may be distribution centers. Suppliers may operate distribution centers or plant warehouses as selling locations. Selling locations, as used herein, refers broadly to locations from which an operator draws the inventory which it sells to others. Both selling and stocking locations have on hand inventory of goods. The stocking locations, as used herein, refers to inventory locations which distribute goods to selling locations. In a simple distribution network, a group of selling locations may be supplied with goods from a single national distribution center which acts as a stocking location. In a multi-layer distribution network, one or more national distribution centers may distribute goods received from suppliers to regional distribution centers, which, in turn, distribute goods to selling locations. In this case, both the national and regional distribution centers are stocking locations. In a complex distribution network, goods may flow from suppliers to both stocking and selling locations; goods may be distributed from one level of stocking location alternatively to either another level of stocking location or directly to selling locations. Most generally, stocking and selling locations can be considered as a network, rather than a hierarchy of distribution channels.

Projected demand requirements are typically forecast. The methods and devices of the present invention can apply real world considerations to projected demand requirements regardless of the manner in which the forecast is made. Finely granular forecasts, preferably using day by day or more frequent time intervals, are preferred, but not absolutely necessary to the present invention. The focus of forecasting is to project demand requirements at the selling level. Inventory at stocking locations is arranged to support sales from selling locations, not for its own sake. Projected demand requirements reflect demand for goods to be sold. In some instances, projected demand requirements may be stated as desired stocking levels at the selling locations. Desired stocking levels may reflect addition of so called safety stock to demand for goods to be sold. The safety stock is one way of protecting against variations of actual sales from projected demand for goods to be sold. However projected demand requirements are determined, it is useful to adjust projected requirements to take into account real world considerations.

Decisions which impact the availability of goods at selling locations lead to ordering, post allocation and distribution actions. Ordering may include placing purchase orders on a company wide, stocking location or selling location basis. Between the time that orders placed with a supplier and goods are ready to ship from the supplier, a post allocation action may direct the supplier's goods to certain locations, either stocking or selling locations. Goods in stocking or selling locations may be distributed to other stocking or selling locations. An action directing distribution of goods determines the movement of goods among any combination of stocking and selling locations.

The time for an action announcing or implementing a decision to lead to availability of goods at a selling location can generally be referred to as cycle. A plurality of time elements are combined in a cycle, such as a cycle which begins with the assembly of on hand inventory data at stocking and selling locations and extends until a second delivery becomes available at the selling location. A simple distribution cycle can be illustrated with one stocking location and one selling location.

Figure 23:
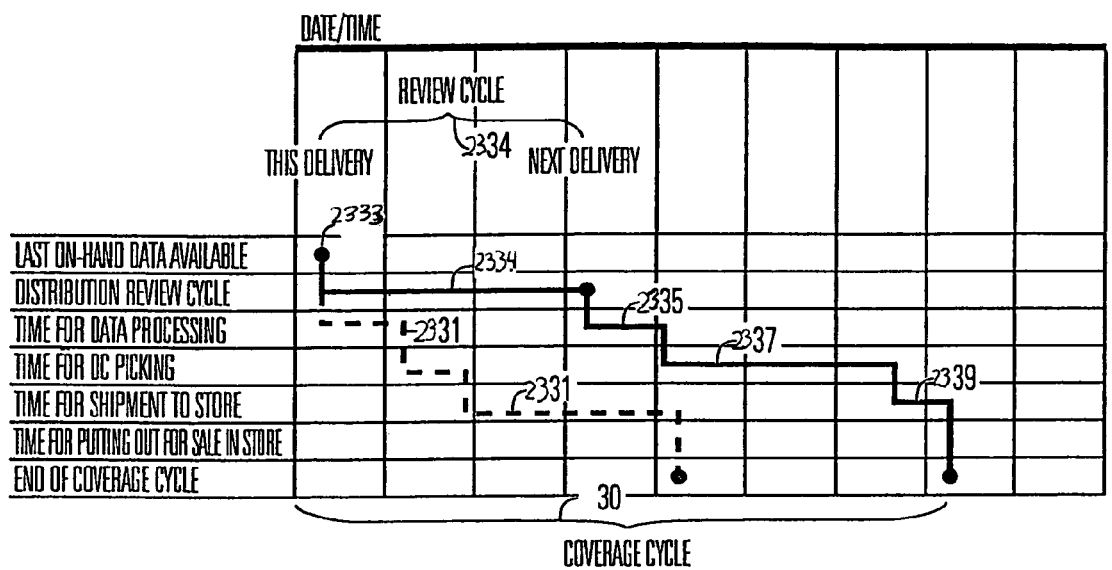
FIG. 23 depicts a stocking to selling location distribution coverage cycle.

FIG. 23 illustrates a simple distribution network, having one stocking and one selling location. The coverage cycle 2330 in this figure includes time from when on hand data is obtained (potentially with some lag time before processing or review begins) 2333, until a next delivery (after the current delivery being planned for) has arrived at a selling location and is available 2332. This coverage period may be referred to as a predetermined selling period, for some purposes. There is only one level in this example of a distribution network. Indicated as by the dotted line 2331, this delivery, being planned for, becomes available at the selling location during the coverage cycle. A distribution review cycle 2333 is a time in which begins with the availability of data. It corresponds to the time between this and the next shipment, and allows inventory personal (if human intervention capability is desired) to consider data and system generated recommendations, potentially including recommendations for ordering, post allocation and distribution. With or without intervention of inventory personnel, time is allowed for data processing 2335, which may include generation of directions or pull orders to stocking locations. At a stocking location, time is allowed for picking goods 2337 and readying them for shipment to selling locations. A time element is then included for shipment of goods to selling locations 2339. Optionally, a time element can be provided (not in FIG. 23) for unpacking and displaying goods at the selling location. In FIG. 23, time elements 2334, 2335, 2337, and 2339 combine into a coverage cycle 2330. An action directing distribution of goods sometime during the distribution review cycle 2334 results in availability of goods at the selling location 2332 after several time elements have passed. The goods that become available at the selling location from this delivery 2331 may be used by the selling location to fulfill projected demand requirements for an interval of a predetermined time selling period, such as the time from this to the next delivery of goods. Alternatively, they may satisfy presentation requirements during the interval. If too few goods are available at the selling location from delivery 2339 through the subsequent delivery, either presentations may suffer or projected demand requirements may go unfulfilled.

Figure 24:
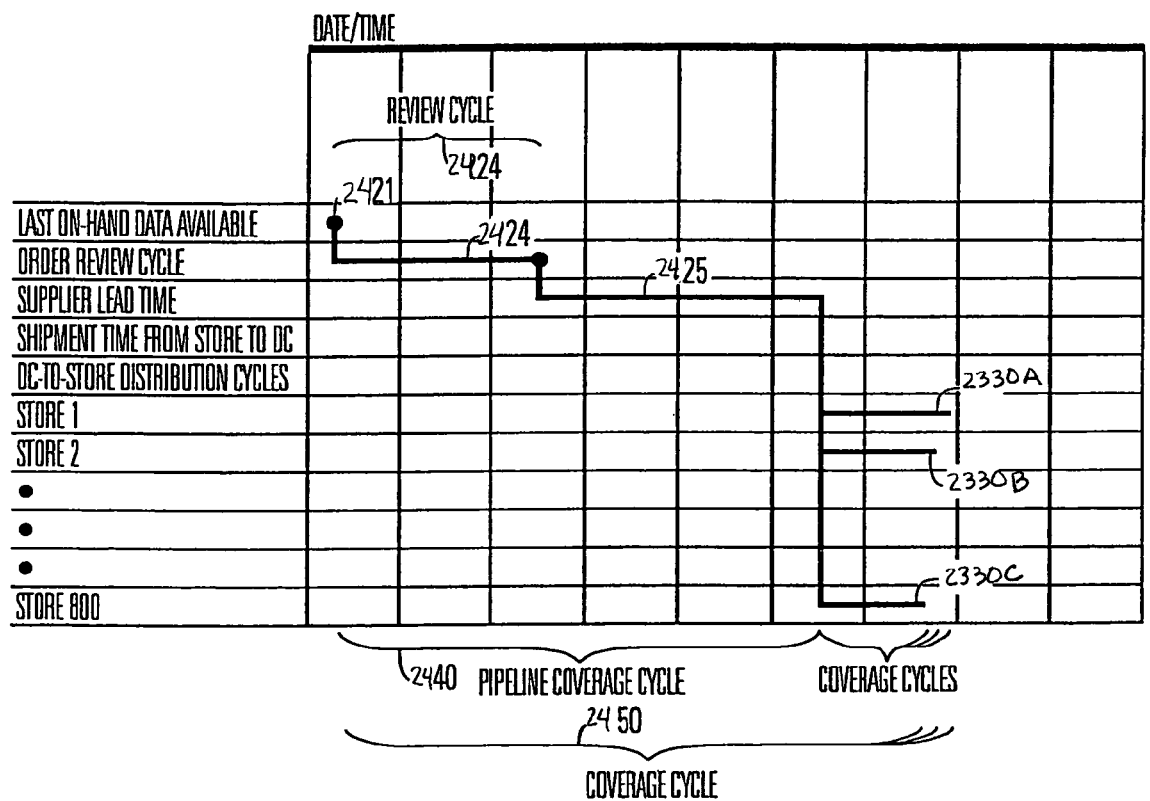
FIG. 24 depicts a total coverage cycle.

Variability in the time for an action to lead to availability of the good at respective selling locations is illustrated in FIG. 24. This figure illustrates a distribution network having one supplier, one stocking location and a plurality of selling locations. On hand inventory data is available at the beginning 2421 of the overall coverage cycle 2450. An order review cycle 2424 corresponds to the time between this and the next order, and permits inventory personal or the system to place an order with a supplier. The selected point in time corresponding to the next shipment typically is when another an order will be placed, leading to availability of the good at the selling location. In cases where orders are placed as soon as there is some need or some minimum need for the good, this time period could be very short. Supplier lead time 2425 reflects the time for the supplier to respond to the order and for goods to become available at the stocking location. The so-called pipeline includes time for placing orders with a supplier and having goods available at the stocking location for distribution to selling locations. A plurality of time elements combined into a pipeline coverage cycle 2440. Various periods of coverage cycles 2330A–C create variability in the total coverage cycle 2450. Due to this variability, various start and stop dates apply to one or more predetermined selling periods for the selling locations.

Figure 25:
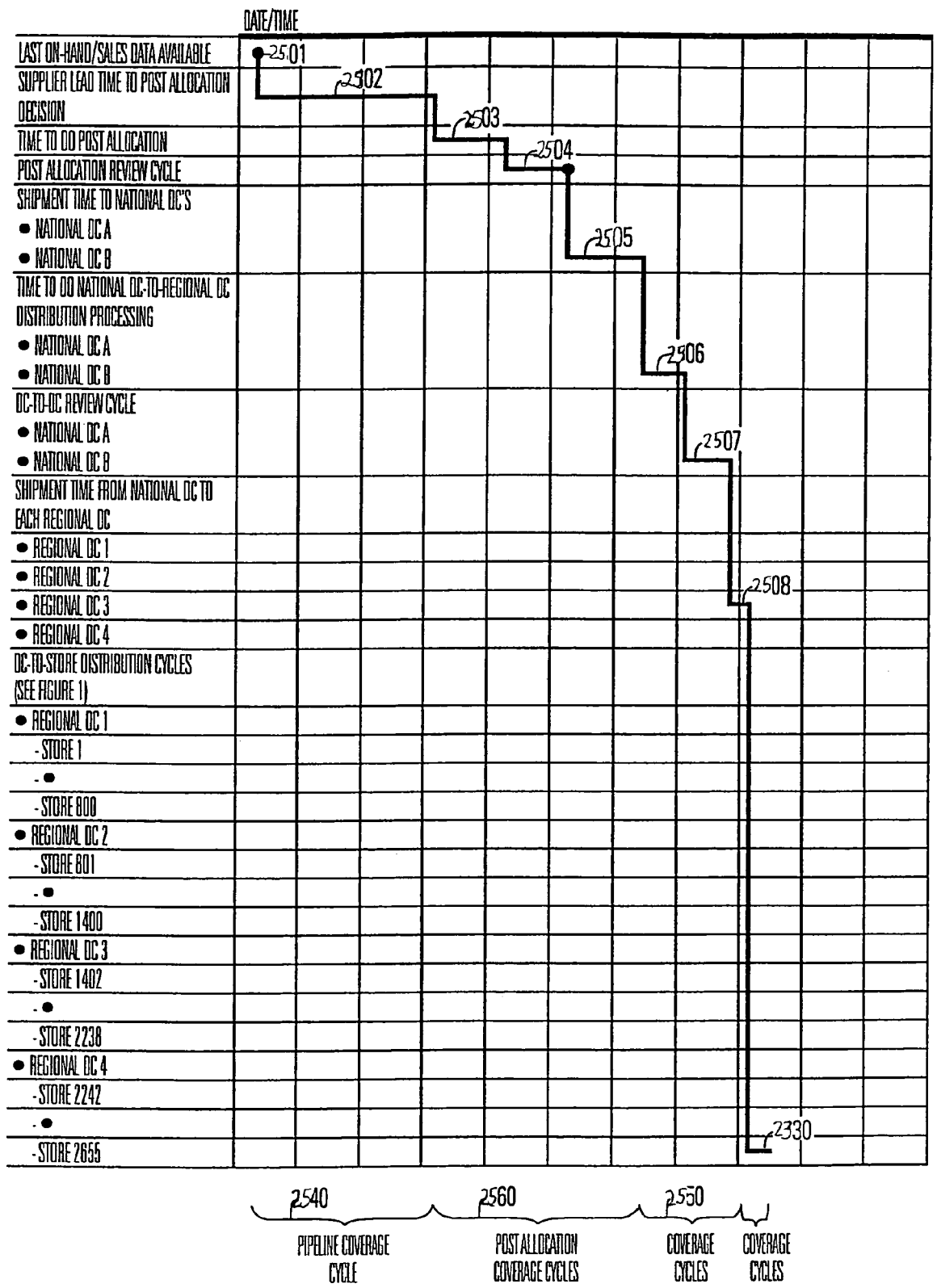
FIGS. 25–26 depict a multi-layer or complex distribution network and a total coverage cycle for multiple locations.
Figure 26:
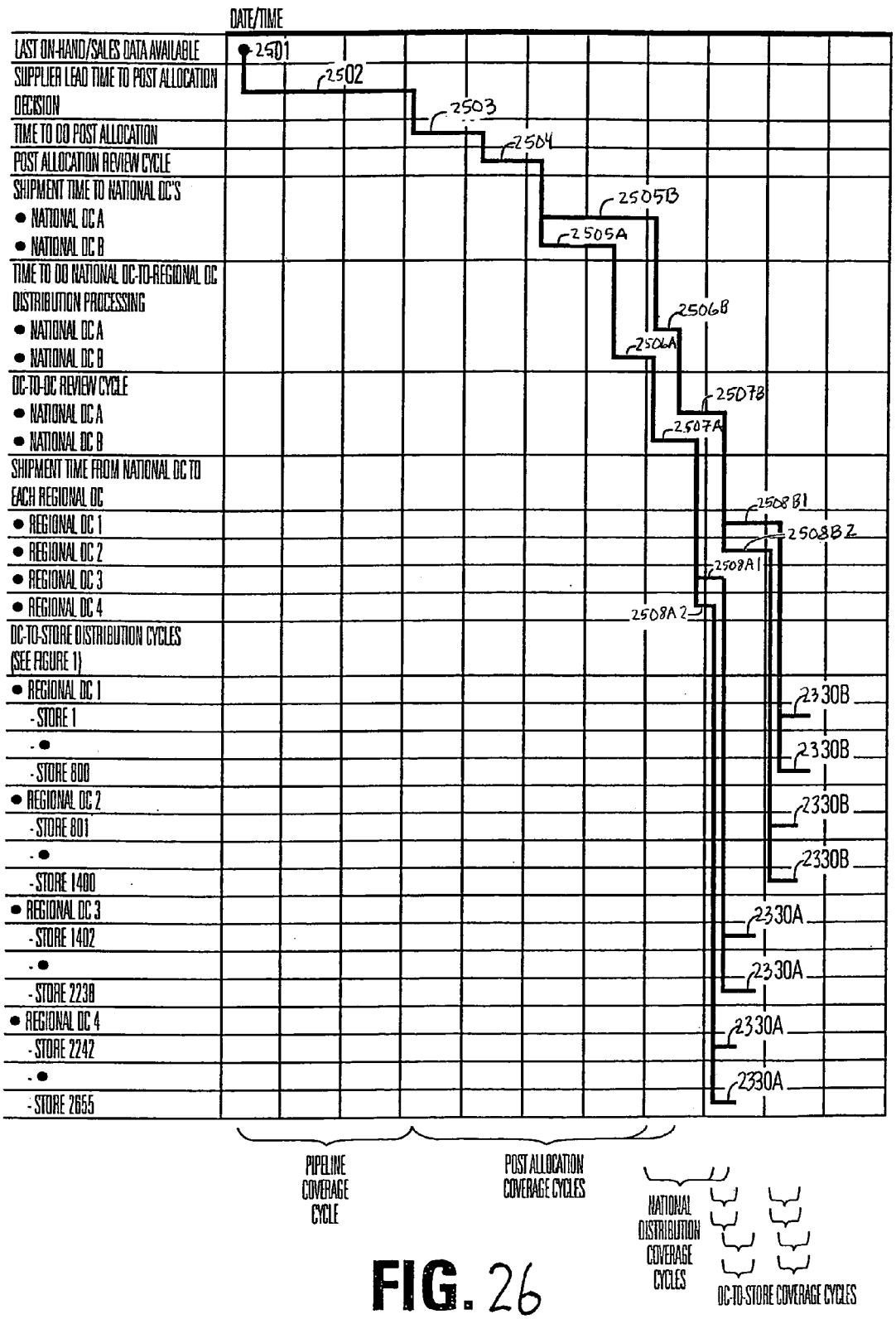

Single and variable coverage cycles for a multi-layer distribution network are illustrated in FIGS. 25 and 26. FIG. 25 illustrates a single overall coverage cycle involving a supplier, a national stocking location DC B, a regional stocking location DC 4 and selling location store 2655. The overall coverage cycle includes a pipeline coverage cycle 2540, post allocation coverage cycles 2560, national to regional stocking location coverage cycles 2550, and stocking to selling location coverage cycles 2330. On hand data is obtained (potentially including lag time for processing or review) 2501. A single order of goods is placed with a supplier. After time 2502, the system processes data for post allocation 2503 and a post allocation review time corresponding to time between this and the next post allocation decision or action 2504. In this example, at least part of the order for the good is shipped from the supplier to the stocking location national DC B in time 2505. Data processing and review of recommendations time 2506, 2507 allows decision-making and directions to ship the good from one level of stocking location to another. In this example, the good is shipped from national DC B to regional DC 4 in time 2508. The cycle for distribution of the good to the selling location (from regional DC 4 to store 2,655) is time 2330. Only one post allocation coverage cycle 360 and one coverage cycle 350 appears in the figure, because only one distribution path is illustrated.

FIG. 26 builds on FIG. 25, adding the complexity of multiple distribution paths. Differentiation of distribution paths first appears at 2505A–B, as different time is required for shipment from the supplier to stocking locations national DC A and B. Time elements from an action to availability of the good at respective selling locations are further differentiated at 2508 A1-2 and 2508 B1-2, due to varying shipment time from a first level of stocking location (national DCs) to another (regional DCs.) Still further differentiation appears in stocking to selling location distribution, 2330A–B. From these diagrams, the impact of assigning one or more selling in dates can be illustrated.

Figure 27:
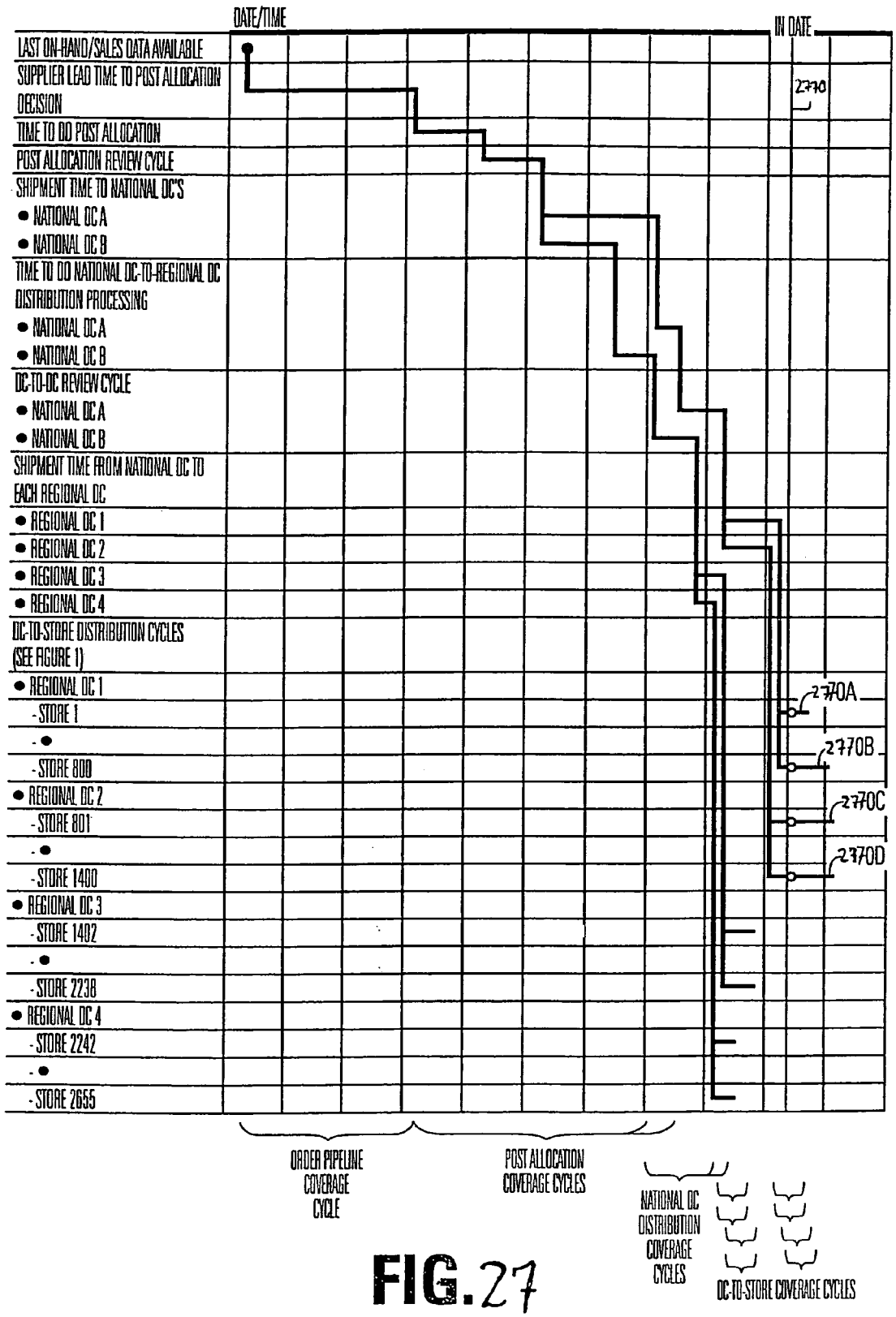
FIG. 27 illustrates handling of selling in-dates at particular selling locations.

FIG. 27 builds on FIG. 26, adding selling in dates 2770A–D for stores 1, 800, 801 and 1400. In this figure, stores 1402, 2,238, 2,242 and 2,655 have coverage cycles that do not approach the selling in date 2770. Although the same selling in date is illustrated in this figure for all selling locations, a respective selling in dates for the selling locations can alternatively be regionally or logically grouped or even different for each selling location.

Figure 28:
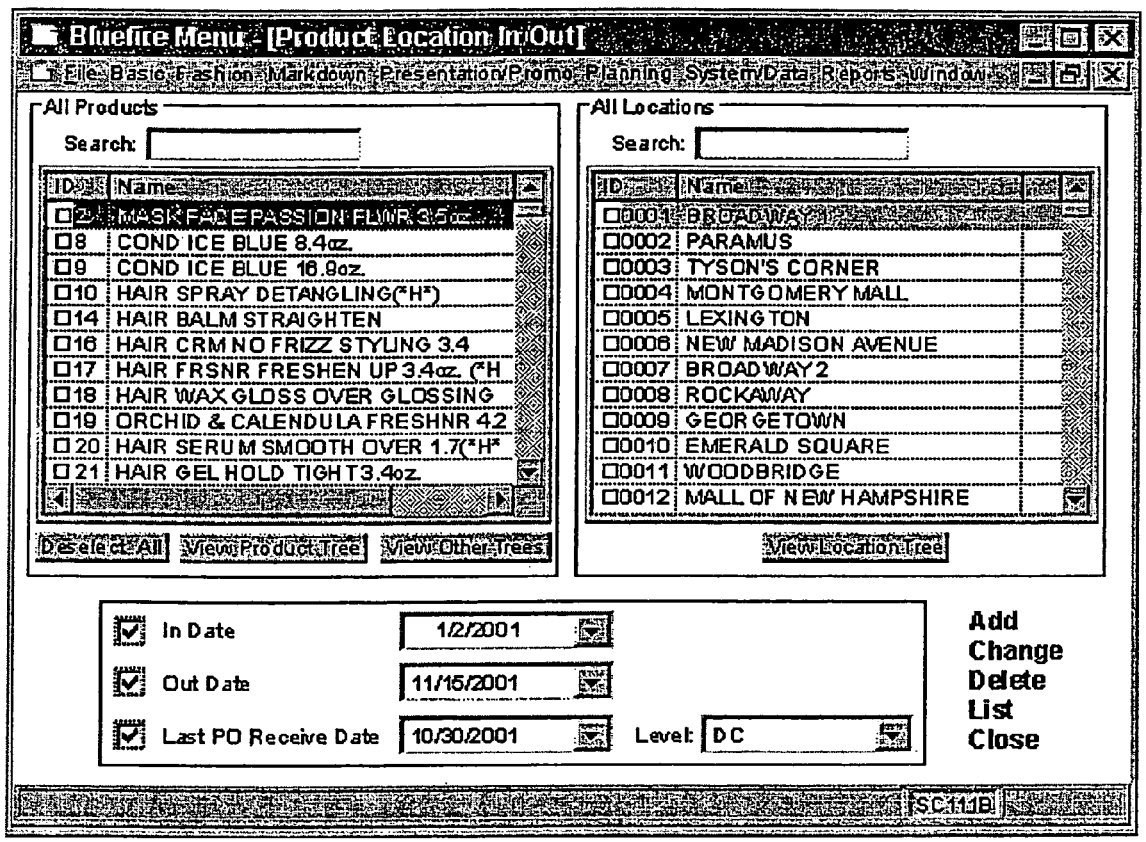
FIGS. 28–29 illustrate user interfaces for in dates, out dates and time elements of a coverage cycle.

A method applying the present invention uses in dates to modify projected demand requirements. On a computer system having memory for programs and memory for data, a program is used associate respective selling in dates with a good at a plurality of selling locations 2770A–D. The selling in date may be a date on which selling of the good is scheduled to begin at a particular location. Respective selling dates may be assigned to a plurality of locations. A selling in date for the good may be assigned to all or substantially all selling locations, by one or more user actions, to predetermined groups of selling locations or to a single selling locations. A user interface may allow the user to select selling locations from a list using a standard protocol from a Windows environment. For instance, a block of selling locations may be selected using a hold and drag command, including pointing a mouse cursor at a first selling location on a list, depressing a mouse button and dragging the mouse cursor to another selling location, leading contiguous block of selling locations highlighted. The same effect may be accomplished with the wheel mouse by rotating the wheel to drag the mouse cursor to the other selling location. Another way of selecting contiguous selling locations may be to click on a first selling location, move the cursor to another selling location, depress the shift key and click on the other selling location. Noncontiguous selling locations may be selected from a list by depressing the Ctrl key and issuing mouse click commands or the mouse first or his point and various selling locations. A user interface may allow a selling in date to be assigned to all selling locations and then modified for selling locations or groups of selling locations which are different from the first assigned in date. A checkbox interface for assigning either selling in dates or selling out dates, or both his illustrated in FIG. 28. One or more goods can be selected from the left-hand list. One or more locations can be selected from the right hand list. In dates and out dates can be specified. Values can be added, change, deleted or listed using this user interface.

Respective time elements, corresponding to times for an action to lead to availability of the good at the respective selling locations, are associated with the good at the selling locations. Availability may include delivery of the good at a selling location from a distribution center. It may further include preparing the delivered goods for sale at the selling location. The time elements may include any or all of the time elements illustrated in the previous figures, including include time required to collect data, review action recommendations, process data, pick goods at a stocking location, and ship the goods to a selling location. The time elements may further include periodic dates for actions necessary may be good available at the plurality of selling locations. For instance, shipments from a particular stocking location to a particular selling location may only take place on Wednesdays. Thus, the cycle time from issuing distribution orders to stocking location availability of goods at particular selling locations may vary, depending on the day of the week when the distribution order is issued, and may be accommodated by the system. In other cases the shipments may occur on an as needed basis. The respective time elements may include time for distributing the good from one or more first level stocking locations to a plurality of second level stocking locations, as in a multi-layer distribution network. Periodic dates for actions may be combined with time elements for a multi-layer distribution network. The respective time elements may include time for distributing the good from the supplier through one or more stocking locations to a plurality of selling locations. Periodic dates for actions may be combined with time elements for distributing the good from supplier through stocking locations to selling locations. The action which results in availability may be distributing the good from one or more stocking locations to a plurality of selling locations or it may be issuance of an order directing distribution of the good. Alternatively, the action may include ordering the good from a supplier or post allocation (allocating) delivery of the good to stocking or selling locations sometime after ordering the good from supplier.

Figure 29:
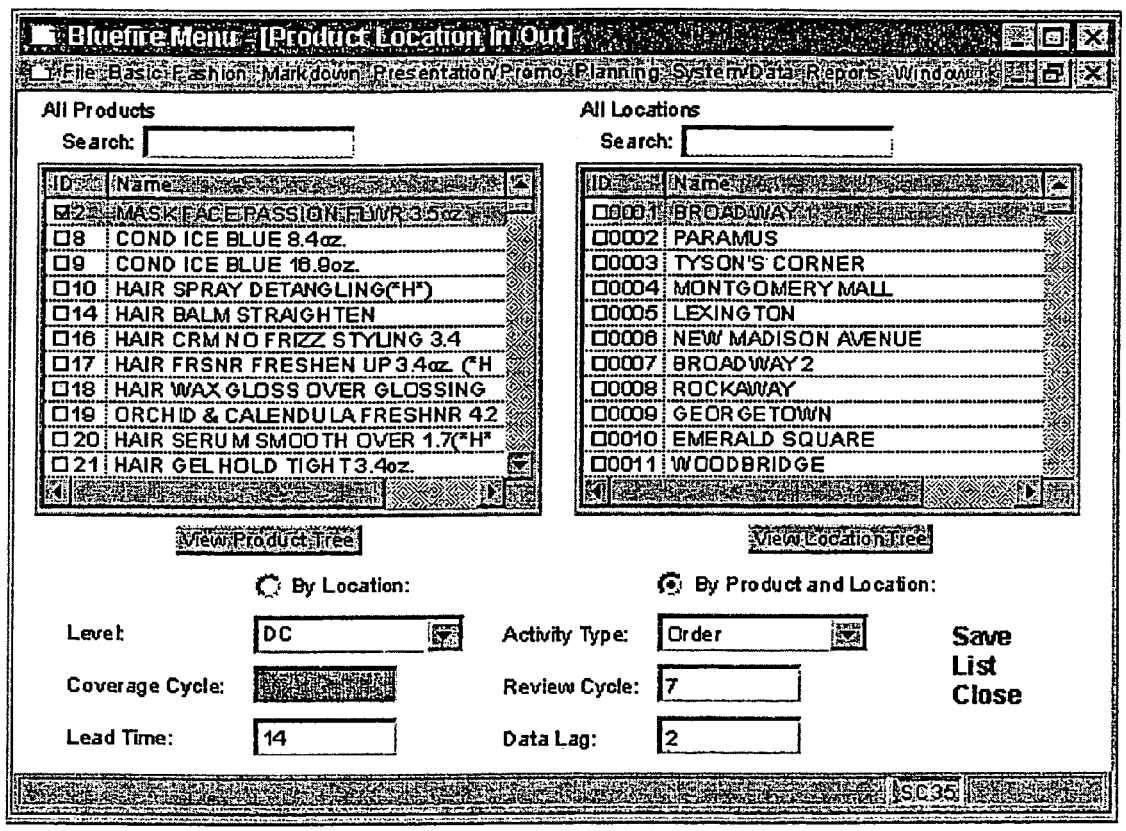

An interface for associating certain time elements with one or more goods at one or more selling locations is illustrated in FIG. 29. This interface may use any of the conventions described above or any equivalent conventions for associating good-location pairs with time elements. In this illustration, the time elements include lead time, review cycle and data lag in the distribution of goods from a stocking location to a selling location. The same interface can be applied at the level of distributing goods from a first level (e.g., national) stocking location to a second level (e.g., regional) stocking location. One could easily associate other time element components with good-location pairs, such as order assembly lead time, handling and processing time, or shipping and delivery time.

Associating respective selling in-dates and time elements with the good at the selling locations is usefully combined with looking forward and rolling up projected demand requirements, taking into account the selling in-dates. Looking forward means looking forward into the future from a particular date. The date may be the date of the on hand inventory data (2333, 2401, 2501), the date on which analysis is performed, a proposed date for a decision or action, or any other date related to the decision or action. The decision or action may involve ordering the good from a supplier, post allocating the supplier's delivery of the good or distributing the good among stocking and selling locations. The look ahead extends to one or more time periods following the impact of the decision or action on availability of the goods at the selling location 2331, to determine how the decision or action can help fulfill the projected demand during one or more predetermined selling periods. One useful predetermined selling period includes the look forward date through the date when the next delivery of the goods is available at the selling location 2332. Then, the impact of the decision or action being taken is taken into account. A useful interval of the predetermined selling period to focus on, for instance for analysis of presentation quantities, is from the date when this delivery of goods becomes available at the selling location 2331 through the date when the next delivery of goods is available at the selling location 2332. For instance, if intermediate totals from prior runs have been kept, it may be possible to focus on just the selling period most directly impacted by the decision or action under consideration. When the projected demand requirements are rolled up, there are alternative ways of taking into account the respective in dates. Projected demand requirements, whatever they are, can be zeroed for all dates prior to the in date for the respective good-selling location pair. Alternatively, the system can test projected demand dates against the in date and ignore projections predating the in date. In some methods, the forecasting tool may have access to the associated in dates and time elements and may assign a zero demand requirement to dates preceding the in date, in which case, virtually any way of taking into account the respective in dates will work, because nothing in particular is necessary.

Another real world consideration is presentation quantities. Selling locations may choose to display goods in specials shelves, racks or other presentation factors in order make an attractive presentation which enhances sales. Fixtures used for presentation may include tables, rounders, four walls, wall shelving, promotion tables, tills or display windows. Large square footage stores may have more presentation fixtures than small square footage locations. Presentation quantities also may very for reasons other than location physical characteristics, such as the sales level at the location.

It is useful to associate presentation quantities and presentation dates (e.g., start and end dates for the presentation) in advance of use in ordering, post allocation or distribution analysis. Presentation quantities can be tracked rigorously or on an exception basis. Rigorous tracking could include a buildup of presentation quantities for every good in every selling location. A user could assign each good to at least one fixture and assign dates that each fixture setup would be used on a particular fixture. Given reference information regarding which fixtures are associated with or in which selling locations, the system could assign presentation quantities by time and selling location. Alternatively, a user could set presentation quantities only for items prominently featured, which have presentation quantities that would significantly impact ordering, post allocation or distribution of goods.

One way of associating presentation quantities with a good at a selling location is to create a unique name for a particular fixture, promotional display point or other mode of presentation. A set of named fixtures are then associated with each selling location. When the layout of a selling location changes, different named fixture can be associated with the location. Fixture setups are associated with the fixtures for particular goods and periods of time. The named fixture setups can be assigned specific quantities (capacities) of goods per fixture setup or fixtures can be assigned different good quantities per fixture for different periods of time. The end result is that the system takes into account the capacities of named fixtures and the number of named fixtures at each selling location when it calculates presentation quantities. For good selling location pairs, one or more of the available setups at the selling location can be allocated to the good. In this approach, the system can calculate the presentation quantity from assignment of goods to particular setups in particular fixtures.

Alternatively, inventory personal could directly assign presentation quantities on a good location pair basis. An interface similar to those in FIGS. 28 and 29 may be useful for associating presentation quantities and dates with the good at a plurality of locations, regardless of whether fixtures and fixture setups are used as proxies for presentation quantities or presentation quantities and assign directly.

As a next method step, respective time elements, corresponding to times for an action to lead to availability of the good at the respective selling locations, are associated with the good at the selling locations, as described above in the context of selling in dates.

Associating respective presentation quantities, presentation dates and time elements with the good at the selling locations is usefully combined with looking forward and rolling up projected demand requirements, taking into account the presentation quantities and presentation dates. As explained above, looking forward means looking forward into the future from a particular look forward date. The date may be the date of the on hand inventory data (2333, 2401, 2501), the date on which analysis is performed, a proposed date for a decision or action, or any other date related to the decision or action. The decision or action may involve ordering the good from a supplier, post allocating the supplier's delivery of the good or distributing the good among stocking and selling locations. The interval during which the presentation quantity affects the analysis is the time between when this delivery 2331 and the next delivery 2332 will be available at the selling location. This interval is analyzed because it is when this action will lead to this delivery and will impact the inventory level at the selling location.

When the projected demand requirements are rolled up, there are alternative ways of taking into account presentation quantities, which depend to an extent on the decision or action being taken. One manner of taking into account presentation quantities is tracking their impact on a so-called model stock for a selling location. A model stock can be calculated, taking into account presentation quantities, using either of the following equations:

ModelStock(selling location,good)=Maximum of
((PresentationQuantity(selling location,good, time), DemandProxy(selling location, good))+ SDM(selling location,good,time)

or,

ModelStock(selling location,good)=DemandProxy (selling location, good)+PresentationQuantity (selling location,good,time)+SDM(selling location, good,time)

If the first equation is used, the quantity available in the stocking location will be allowed to fall below the presentation quantity between receipt of distributions. If the second equation is used, the presentation quantity will be protected; the quantity available in the location should not typically fall below the specified presentation quantity between receipt of distributions. Variables in these equations include:

PresentationQuantity(selling location, good, time) is determined using either of the approaches described below.

DemandProxy(selling location, good) may be a measure of projected demand requirement for the coverage cycle. It typically includes projected selling and safety stock forecasts. For the present invention, virtually any DemandProxy can be modified to reflect the real world consideration of presentation quantities; the manner in which the Demand-Proxy is calculated is not a part of the present invention.

SDM(selling location, good, time) is a shorthand for "special display minimum." It is a user specified value that can be directly assigned. For instance, a SDM may be useful when using the first equation above and desiring to protect a special display quantity from being sold during the coverage cycle (such as an item in a display window that you are not willing to sell during the display period). It can also be used as an additional safety factor to cushion model stocks against problems of poor data integrity.

When the decision or action of concern involves a distribution, the model stock equations can be extended to calculate distribution quantities. One equation for this calculation is:

DistributionQuantity=ModelStock(selling location, good)−Onhand(selling location,good)−Intransit (selling location,good)

Variables in the equation include:

ModelStock(selling location, good) from prior equation(s).

Onhand(selling location, good) is the quantity of the good at the selling location, based on the available information.

Intransit(selling location, good) is the quantity of the good in-transit to the selling location. This quantity would include quantities already allocated but not picked, as well as quantities picked but not shipped, and quantities physically in-transit to the selling location.

These distribution quantities may then get adjusted by further factors such as minimum distribution quantities, shipment increment quantities (e.g., that shipments are in multiples of 120 but not in between), case pack quantities (e.g., shipments are in multiples of the physical shipment case) and distribution center stock availability (in the event of the total shipment desired for an good being more than the DC has available some logic is applied to send out the quantity available in the manner that will best support it going to the stores most likely to need it first). Application of any one of these may be as simple as any positive distribution quantity below the minimum distribution quantity gets moved up to the minimum distribution quantity or there may be logic that says anything below x percent of the minimum distribution quantity is rounded down to 0 and the rest are rounded up.

When the decision or action involves ordering goods, an order quantity for can be determined as follows:

OrderQuantity=OrderPipelineModelStock+SumOfLowerModelStocks−LocationOnHand−LocationOnOrderInTransit−LowerOnHand−LowerOnOrderInTransit The variables are:

PipelineModelStock is an economic stocking level calculated for the Pipeline coverage cycle currently being determined. The OrderPipelineModelStock is calculated for the Order Pipeline coverage cycle, for example shown in FIGS. 25–26, in a manner identical to the ModelStock described above in the distribution calculation, except that it is done for the Order Pipeline coverage cycle and using the time period DemandProxies supplied for the Order Pipeline coverage cycle for the specific time period being done and recognizing that frequently it is not done for an activity coverage cycle that includes presentation quantities and SDMs.

The SumOfLowerModelStocks is equal to the sum of the ModelStocks for all other cycles within the overall activity cycle. So in the case of FIG. 4 it would include the ModelStocks for all the post allocation cycles, all the national DC distribution coverage cycles and all the regional DC to selling location coverage cycles. The ModelStock for each coverage cycle is calculated using one of the equations above recognizing the most non selling locations do not have any presentation quantities or SDMs.

LocationOnHand is the quantity on hand for the stocking location, if there is one in the coverage cycle currently being calculated. Note that if another coverage cycle within the overall coverage cycle being done has already included the inventory on hand, then it is not double counted. In the case of the order in FIG. 26 there is no stocking location within the Order Pipeline coverage cycle so the OrderLocationOnHand will be zero. However, within the Post allocation cycle you have the inventory in the 2 National DCs, National DC A and National DC B which would be included. It should be considered that the quantity on hand may differ by activity because a distribution being done right now may not include inventory in rework that is not immediately available but when calculating the distribution quantity on hand for an order that will arrive well out into the future then that rework quantity will be counted as it will be available well before the next order is received.

LocationOnOrderInTransit is equal to the quantity that the stocking location or locations, has being delivered to it within the coverage cycle. It usually includes outstanding purchase orders and any intransit goods coming to the location and can include other forms of commitments that have been made. Like LocationOnHand, if a quantity has already been counted in the other cycles within the overall cover cycle, it is not double counted.

LowerOnHand is equal to the sum of the number of units on hand in all locations (at any level of the hierarchy) within the later coverage cycles that complete the overall coverage for this activity (avoiding double counting.)

LowerOnOrderInTransit is equal to the sum of the number of units credited as on order or in-transit (at any level of the hierarchy) to any location within the later coverage cycles that complete the overall coverage for this activity (avoiding double counting.)

These formulas may be useful in rolling up projected demand requirements and presentation quantities for the good at the selling location. For each of these formulas, a particular presentation quantity may need to be selected, when there are a variety of presentation quantities within the period of concern. In a coverage cycle, there may be multiple different PQs, for instance, when a presentational or promotional event takes place in the middle of the cycle but not at either end. In the case of multiple different PQs, a number of approaches can be taken to selecting a PQ to use. One option is to use the PQ for the location on the last day of the coverage cycle. This will ensure that you end up with the desired PQ factored in on the last day. Another option which generally results in higher stocking levels is to use the maximum value during the cycle. This is useful for a presentational event which is shorter than a review cycles. It covers the peak PQ value for the activity. Another option is to use the maximum value of the PQ within the dates between distribution coverage cycle end date and an earlier date reflecting the length of the distribution review cycle. This option delivers the maximum PQ value between when the current shipment or distribution arrives and when the next shipment arrives. Another option is to use the value on the date that the desired activity goods are received at the location. This date, if not otherwise indicated in the system, can be determined by subtracting the length of the distribution review cycle from the distribution coverage cycle end date. Thus, a preferred PQ for a coverage cycle can be selected.

A third real world consideration is stockouts, which occur when on hand goods at a selling location are inadequate to meet a projected demand requirement, a desired presentation quantity, or both. According to this aspect of modifying a projected demand requirement, inadequate on hand inventory may result in unfulfilled demand at a selling location. To the extent that this demand results in buyers going elsewhere, it is never realized and the system reduces the total projected demand requirements over time to reflect the unfulfilled demand. To the extent that a portion of the demand is recaptured, by waiting lists, rain checks or the like, the total projected demand requirements over time are reduced to reflect the portion of the demand which is unfulfilled. Alternatively, the system can flag significant stockouts and seek intervention of inventory personnel.

Stockouts can be detected by comparing daily or more frequent projected demand requirements with daily or more frequent projected on hand stock for good at a plurality of selling locations. Then, projected demand requirements are reduced corresponding to unfulfilled demand for at least one of the selling locations or stockout has been detected. When the system looks forward and rolls up projected demand requirements, for one or more predetermined selling periods commencing at one or more dates corresponding to time this for an action to lead to availability of good at the selling locations, the total projected demand is less than if it were not adjusted to reflect stockouts. The model stock formulas set forth above can be modified to reflect stockouts:

ModelStockStockoutCorrected(selling location,good)
=Maximum of ((PresentationQuantity(selling location,good,time),StockoutCorrectedDemand Proxy(selling location,good,time))+$SDM$(selling location,good,time)

or,

ModelStockStockoutCorrected(location,item)=StockoutCorrectedDemand Proxy(selling location, good,time)+PresentationQuantity(selling location,good,time)+$SDM$(selling location,good, time)

StockoutCorrectedDemandProxy starts with the daily (or shorter time period if that is what is used) average DemandProxy and its comparable daily average ProjectedSales and then looks at the on hand situation for the location in question to determine whether there is sufficient stock to support the selling. If there is sufficient stock, then it does not adjust the average DemandProxy. If there is insufficient stock to support the sales, then that day's DemandProxy is reduced to reflect the inventory shortfall. That reduction can be done a number of ways with one of the most prevalent being to simply zero any DemandProxy value greater than the remaining on hand inventory on the preceding day and to then zero the inventory on hand at the end of that day. These calculations continue day-by-day (or shorter time period if that is what is used) until the products from this activity show up at the location at which point there will be ample stock available unless the location sending the product has insufficient available product to meet the desired shipment. If a stock shortfall is then the case in the sending location then that shortfall is also factored in to the DemandProxy calculations from the arrival of the shipment until the end of the coverage cycle. The reduced shipments caused by the sending location shortage are then distributed by the various locations and then the above method used to determine whether a give location runs out of stock and therefore reduces the daily DemandProxy value. Once all those calculations are done then the StockoutCorrectedDemandProxy is the summation of all the daily StockoutCorrectedDemandProxies within the coverage cycle.

As discussed in the distribution example calculations above, with reference to orders and post allocations, the system also can correct forward forecasts, however made, to reflect the impact of stockouts. Suppose that a forecast is made of daily or more frequently stocking levels of all the stocking and selling locations into the future, and demand requirements are also projected. We then estimate based on the forecasted selling and the timing of shipments from suppliers and the flow of goods through the supply chain when a selling location is likely to be out of stock. On those stocked out days we identify the projected lost sales and then since those sales are not projected to take place we reduce the forecasted needs back through the supply chain. So in doing this we have not just made forecasts of what would happen but made those forecasts specific to the dates of shipments and the like which have been set in motion for this particular item at this particular moment. As you will see in our examples of this we have also not only done this for a single element activity but have done this for activities that span numerous stocking locations and supply chain considerations.

In our first example, see FIG. 30, we lay out a situation where forecasting without working through the actual timings of what will occur would result in overstocking of the location by 9 units. A forecast that did not look forward and know that the location was going to stock out on day 5 and be out of stock until day 10 would predict needing 25 units over the coverage cycle while one taking into account the actual day by day selling and stocking would instead forecast a need of 16 units to support sales with of course and additional safety stock number, but the stockout determination would identify lost sales of 9 units that do not need to be sent to the location. You may also convert some of the stockout period potential sales to real sales by some mechanism like a back order. In that case you would not totally lose the sales during the stockout time period but, as done in FIG. 31 would convert some of them to later sales. The way the system does that is essentially accruing a fraction, in FIG. 31, minus 33 percent of the otherwise lost sales, and then taking them on the days that they would have been sold if stock was available or more correctly actually realizing those sales when the goods show up in the store as indicated in the final row of FIG. 31 with the 6 unit sales on day 11 (3 above what you would have otherwise sold).

The single location distribution scenario is one of the simplest. When looking at ordering for a Distribution Center or a National Distribution Center we project out how all the selling locations serviced by those Distribution Centers will stay in stock. What occurs here is contingent upon the stocking rules at hand which can range from allowing cross transfers between locations and Distribution Centers and Distribution Center distributions to locations in another Distribution Center's region to allowing none of the above. In all of the cases our system will model what will happen as the days progress and the system attempts to keep as many locations in stock as possible. The system will then project when locations go out of stock and the resulting selling losses that result. Those selling losses will be translated into smaller orders as there is not point delivering goods after they are needed and therefore in excess of what is needed. Selling induced stockouts are not the only kind our system will forecast and react to. Presentation quantities in excess of what is needed to support selling can also cause stockouts. Since in many cases an order coverage cycle will embody many distribution cycles and therefore many distributions, if a distribution includes supplying presentation quantities well in excess of the projected selling then that action can lead to stockouts in subsequent distributions that a system that did not model out would not know about. Therefore, we forward forecast time increment by time increment (usually day by day) the inventory situations of all the inventory stocking locations to determine when selling, presentation or other induced stockouts take place.

Therefore, like the distribution DemandProxy calculations, the order and post allocation calculations take into account stockouts. The equations are the same except that the DemandProxies used in the OrderPipelineModelStock and in the SumOfLowerModelStocks are all stockout corrected:

OrderQuantityStockoutCorrected=OrderPipelineStockoutCorrected
ModelStock+SumOfLowerModelStocksStock-
outCorrected−LocationOnHand−LocationOnOr-
derInTransit−LowerOnHand−LowerOnOrderIn-
Transit The stockout correction of forward forecasting works well in concert with another correction referred to as need adjustment. The need adjustment is factored into an allocation or an order using the following modification to the calculation equations:

OrderQuantity=OrderPipelineModelStock+SumOf-
LowerModelStocks−LocationOnHand−Location-
OnOrderInTransit−LowerOnHand−LowerOnOr-
derInTransit+NeedAdjustment or OrderQuantityStockoutCorrected=OrderPipelineStockoutcorrected
ModelStock+SumOfLowerModelStocksStock-
outCorrected−LocationOnHand−LocationOnOr-
derInTransit−LowerOnHand−LowerOnOrderIn-
Transit+NeedAdjustment and AllocationQuantity=AllocationPipelineModelStock+
SumOfLowerModelStocks−LocationOnHand−
LocationOnOrderInTransit−LowerOnHand−
LowerOnOrderInTransit+NeedAdjustment or AllocationQuantity=AllocationPipelineStockoutCorrectedModel
Stock+SumOfLowerModelStocksStock-
outCorrected−LocationOnHand−LocationOnOr-
derInTransit−LowerOnHand−LowerOnOrderIn-
Transit+NeedAdjustment Where the variables are described below.

The AllocationPipelineModelStock is calculated for the Allocation Pipeline coverage cycle, for example shown in FIGS. 25–26, in a manner identical to the ModelStock described above in the distribution calculation, except that it is done for the Allocation Pipeline coverage cycle and using the time period DemandProxies supplied for the Allocation Pipeline coverage cycle for the specific time period being done and recognizing that frequently it is not done for a coverage cycle that includes presentation quantities and SDMs.

The AllocationPipelineStockoutCorrectedModelStock is calculated as is the AllocationPipelineModelStock except where except that the DemandProxies used in the AllocationPipelineModelStock and in the SumOfLowerModelStocks are all stockout corrected.

NeedAdjustment is equal to the sum across all stocking locations served by the initial stocking location of the amount that the current onhand and intransit exceeds the expected sales on the last day or other period of a predetermined selling period. The simple example of this is shown in FIG. 32 for two stores where both stores in total have 50 units on hand one day zero. However, one had 5 units on hand and the other has 45 and neither have anything intransit. Each store is forecast to sell 25 items over the course of the coverage cycle and therefore if the inventory was in the correct place they would need no further items to support all the selling (this example ignores safety stock). However, because the stock is not in the correct place the 50 units can not support the 50 sales and some of the units in the overstocked store, namely the 20 units left at the end in Store 2 are not needed and the other store, store 1 will sell less than its full potential of 25 because it is understocked. So the NeedAdjustment recognizes that for stocking purposes for this example coverage cycle the effective on hand was not 50 but 50−20=30 and therefore there was a need adjustment of 20 needed to accurately represent what was on hand in a mode that many retailers use where inter-store transfers are not allowed. The projected demand requirement for the selling location is increased corresponding to all or part of an excess quantity of the good at least one selling or stocking location. Totals across selling locations are rolled up, as in other methods described above.

We take this one step farther in that we do not only determine which locations are overstocked now and correct for that, but we forecast forward locations that may become overstocked and those corrections required. This again is probably worth more explanation as there are many factors that could lead to a location that is not overstocked today becoming overstocked during an activity cycle. One common driver is that there is a future event planned that requires a substantial presentation quantity which is in excess of what would be required to simply support the selling. If you just look to the end of the cycle and not at what is occurring during the cycle then you could miss the presentation or other factor induced overstocking. You would also not know which locations are impacted and which may not be. Therefore our system works through all the locations from the start of the cycle to the end of the cycle determining all the overstocks and all the potential understocks and factoring that into what is needed in orders, post allocation or distributions.

Our system can also run other corrections where store transfers are allowed and therefore overstocks can be moved from the overstocked location to another location that needs it. In that case the system factors in the transfer time and will move stock as required by user selections of first moving overstock inventory or moving overstock inventory only as normal shipment inventory is not available. These differences will then alter or eliminate the Need Adjustment as well as potentially impact the stockout calculations.

An additional real world consideration is discontinuation of a good from one or more selling locations. When items are discontinued in locations, they may be taken off of the active SKU list or they can have an out date of some form set. Out dates come in different modes like an out date that is when you stop fully supporting and achieving the desired DemandProxy, such as an inventory level, whether based on economics or a desired service level or some other criteria. There is a more extreme out date often called "last sale out date" beyond which the item will be removed from display and moved to an outlet location or sold off to a clearance retailer. There are also out dates that are distribution center driven where a "last purchase order receive date" is set after which no more shipments will be received in the distribution center. After that point in time then locations will fall below their model stocks and be allowed to go out of stock. The same set of goals can be achieved using deauthorization dates after which an item is no longer optimally stocked in a location or ordered into a distribution center. Or you can have the item move to a non active SKU list (which could vary by location).

Out dates work in somewhat the reverse manner as in dates, once an order cycle crosses the out date boundary for a part of the cycle that part of the cycle is eliminated from the analysis for the particular good (e.g., the DemandProxy can be zeroed for dates after the out date.) Out dates can be set as a single date for all stores or set differently for each store. Frequently these would be set regionally with products being discontinued at different times in different parts of a country. So in the example in FIG. 33, Store 1 and Store 800 of Regional DC 1 and Store 801 and Store 1400 of Regional DC 2 have crossed the out date line and therefore their future requirements will be excluded from an ordering activity and all other coverage cycles (e.g., Order pipeline, post allocation, National Distribution Cycle, and DC to Location Cycle determination in FIG. 33). Now given that each location could have a different end point for the total order cycle and/or a different out date it means that some locations could be included and others excluded.

Last purchase order receive dates work somewhat like out dates but usually are set at the DC not individual location level (unless the locations receive orders directly from suppliers) and therefore are the same date for all the stores served by a DC. Once the coverage cycle feeding goods to the DC crosses the Last purchase order receive date then all the store selling locations are removed from generating needs for ordering, allocation or distribution activities supplying the DC. There are other dates which may get used by different clients and are incorporated into our system that function in similar manners like last sale out date which shares characteristics with out dates and commitment dates which share characteristics with in dates.

Last sale out dates trigger like out dates but instead of just turning off orders, allocations or distributions actually signal the stop of selling with the remaining inventory sold off by other means such as outlet stores or goods liquidators. Commitment dates which can be the equivalent to an in date used to generate commitments that precede firm purchase orders. They trigger in the same way as an in date with the part of the total coverage cycle being utilized in the calculation.

Figure 33:
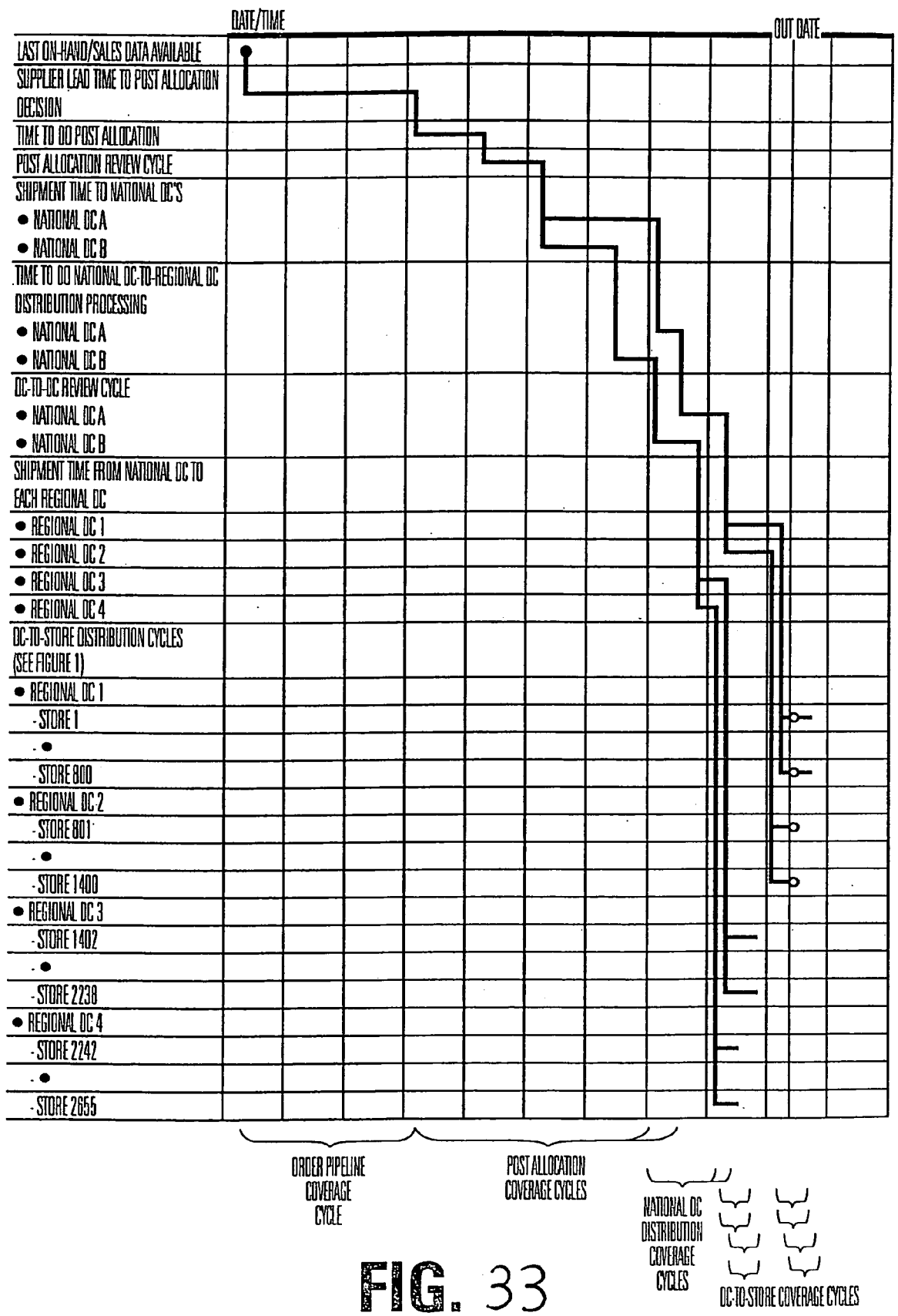
FIG. 33 illustrates handling of selling out-dates at particular selling locations.

The impact of a multi-layer distribution network with examples of multiple paths to selling locations is illustrated in FIG. 33. As the various coverage cycles move beyond the respective selling out dates, whatever projected demand requirements have been forecast can be zeroed for all dates after the selling out dates that have passed. Similarly, as the distribution time moves beyond the last PO receipt date, the respective good-selling location pairs supplied from the stocking location with that last PO receipt date can be zeroed for all dates after the last PO receipt date has passed.

Thus, the aspects of the present invention include a number of corrections to a projected demand requirement or forecast, to take into account practical realities of selling goods.

Synthetic Sales Histories

A method of reducing the user's burden in forecasting sales and needs was explained in application Ser. No. 09/755,355, filed 5 Jan. 2001, entitled Method And Apparatus For Supplying Synthetic Sales Histories, by inventors Robert Dvorak and Kevin Katari, which is incorporated herein as if set forth fully. Practice of this aspect of the present invention includes a computer-implemented method of supplying a sales history for a good lacking a sales history, including associating sales history data for sales of a cloned good at a plurality of selling locations with an other good; scaling the associated sales history data upward or downward based on anticipated sales of the other good; tracking actual sales of the other good for an interval; and rescaling the associated sales history data based on actual sales of the other good during the interval.

Figure 34:
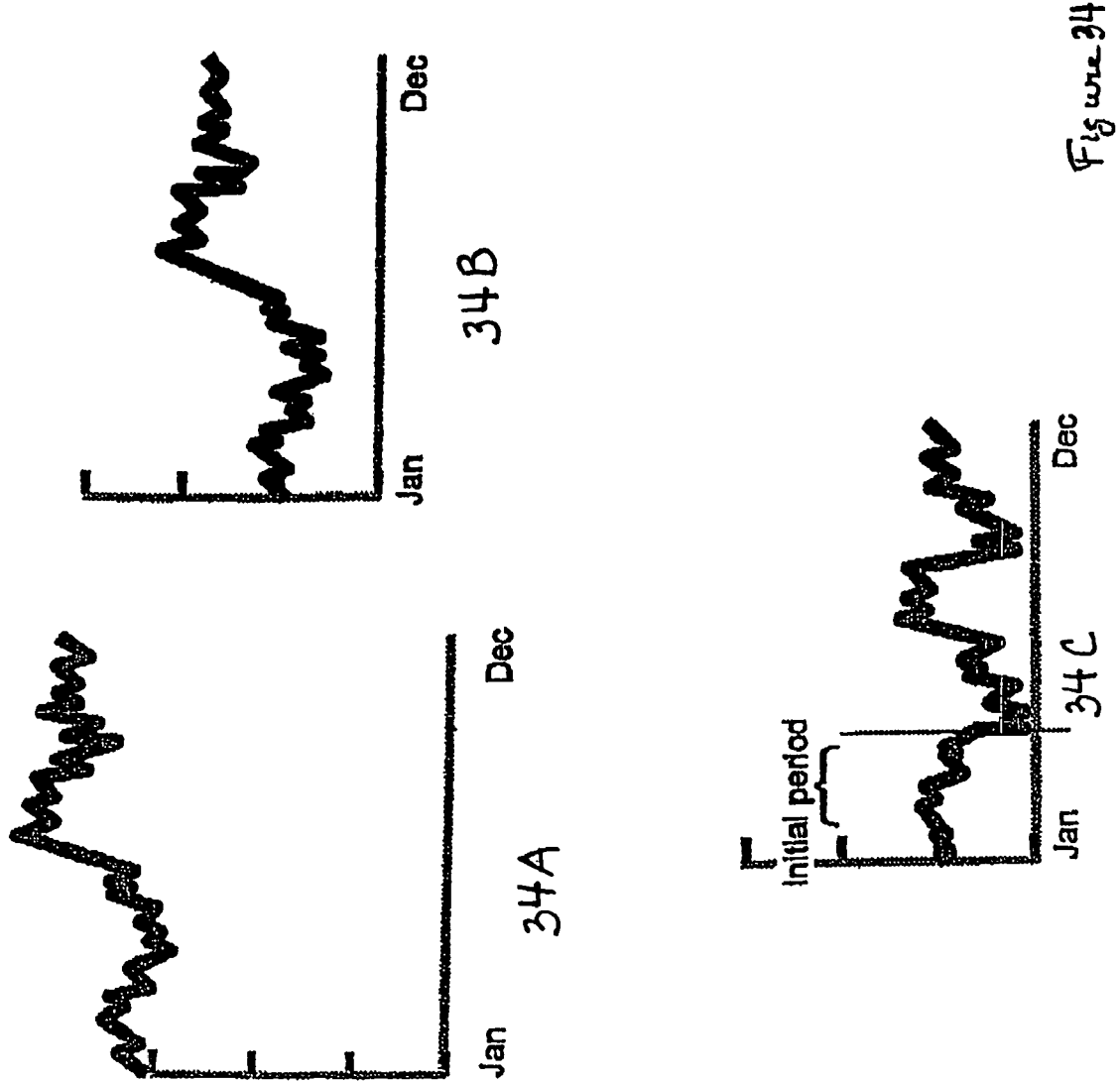
FIGS. 34A–C depict scaling of a cloned sales history. (There is no FIG. 35.)

Sales history cloning is useful for new goods and new selling locations which lack sales histories. This process is illustrated in FIGS. 34A–C. A sales history for a new good, lacking its own sales history, can be created from a cloned good. The cloned good is selected, preferably with an expectation that the new, other good will follow a selling pattern similar to the cloned good across a plurality of selling locations. A computer is used to associate the sales history for the cloned good with the other good at a plurality of selling locations. The sales history data of the cloned good can be copied into memory associated with the other good. Alternatively, it can be associated with the other good by a reference, such as the SKU for the cloned good or a record number, or by a pointer to a memory location or database record where it is stored.

As illustrated in FIG. 34A, the expected sales volume of the new good can be compared, quantitatively or subjectively, to the actual sales volume of the cloned good. A scaling factor, in some instances a ratio of the expected and actual sales volumes, can be used to scale the cloned sales history, as illustrated in FIG. 34B. This scaling factor can be used to modify or scale the cloned sales history, for instance by multiplying the factor by the data and storing the product. The scaling factor can be stored separately, and applied when the cloned sales history data is used, for instance by a forecasting engine.

The conversion factor can be modified based on actual sales, after an interval. This interval can be selected by a user when the cloned good is selected or it can be supplied as a default value (e.g., 7 days, 2 weeks, 4 weeks, 30 days, a month, a quarter, etc.) by the system without user selection. Actual sales of the good at the plurality of selling locations are tracked for the interval. If the actual sales rate exceeds or falls short of the expected sales rate, the original scaling factor is then dynamically scaled or adjusted to reflect that change. This adjusted scaling factor is then applied to the sales history that is used for forecasting sales, thereby generating a more accurate future forecast of selling. A resealing factor is selected, for instance relative to a ratio of actual to expected sales. Selection of a resealing factor can take into account causal factors impacting sales, such as promotions, advertising, reduced selling prices, etc. In this case it is not just a straight comparison of sales but it is a comparison that adjusts for which causal periods have been employed on the new item and makes sure that the comparison with the old item has a comparable weighting of the same causal periods. In instances where that causal period has not occurred in the past item then it either eliminates that time period for the recalculation of the scaling factor or applies a default lift (a specified sales increase relative to regular sales days or some other comparative period) to the past item history and uses that estimate for the comparison. You frequently encounter new item introduction events during this time period, which for many retailers have higher increases in sales than a comparable event on an already existing item. So these types of factors may be accounted for in differentiation done in the causal factors. A causal calendar which tracks causal events impacting goods at particular selling locations is useful, if the resealing factor is to take into account causal factors. A rescaled selling history is illustrated in FIG. 34C.

A resealing factor can be selected once at the end of the interval or repeatedly beginning at the end of the interval. Rescaling can continue for a predetermined time or until a user manually discontinues the rescaling. One predetermined time when resealing can be discontinued is when there is sufficient actual selling history for the new good to discontinue using cloned sales history. The system can also be set up to automatically revert to the actual selling history dismissing the cloned history at some future point in time set by such modes as number of actual sales days, number of comparable sales days or some function of sales volume.

A similar method can be used to create history for a new selling location, e.g., a new store. A user would specify a comparable store to clone for the new store and subjectively set a scaling factor for the new store sales relative to the comparable store. It is useful for the user to select a store with a seasonal selling pattern similar to the one expected for the new store, but the computer implemented method does not depend on the correctness of the user's selection. The user can subjectively assess the expected selling at the new store relative to the comparable store, for example if the new store was expected to sell twice the volume of the comparable store for this good then a scaling factor of 2 would be reasonable. Applying a single scaling factor to a store as a whole or a few scaling factors to a few groups of goods can reduce the burden of selecting scaling factors.

Cloned sales histories for a plurality of goods at a cloned location can be rescaled after an interval of sales, based on actual sales history. A user may selecting an initial period from the start of location selling, after which actual sales are used to adjust or rescale the sales history data. As discussed above, this interval may be of virtually any length. If the actual sales rate exceeds or falls short of the expected sales rate for the period, the original scaling factor is then dynamically scaled or adjusted to reflect that change. This adjusted scaling factor is then applied to the sales history that is used for forecasting sales, thereby generating a more accurate future forecast of selling. This resealing of the scaling factor can then be automatically recalculated as more selling data becomes available so that a better and better estimate of it is achieved. It is also done where different causal factors, e.g., presentations or events that change sales such as a price reduction of 25% or putting the item in the store window display, are factored in and compared appropriately. In this case it is not just a straight comparison of sales but it is a comparison that adjusts for which causal periods have been employed on the new item and makes sure that the comparison with the old item has a comparable weighting of the same causal periods. In instances where that causal period has not occurred in the past item, the system can either eliminate that time period for the recalculation of the scaling factor or applies a default lift (a specified sales increase relative to regular sales days or some other comparative period) to the past item history and uses that estimate for the comparison. The system can also be set up to automatically revert to the actual selling history dismissing the cloned history at some future point in time set by such modes as number of actual sales days, number of comparable sales days or some function of sales volume.

In both instance of new goods and selling locations, the system can automatically use actual sales data to search for a good or selling location, other than the cloned good or selling location, which more closely matches actual sales during an interval than was selected a priori. This search can involve a comparison on a causal period by causal period basis or time period by time period (e.g., day by day) of actual sales at various selling locations. So for example, in the instance of a new selling location, the system could proceed item by item to look at all the other stores with real selling history, compare the different causal selling period sales and suggest or select one or more selling locations with the most similar relationship of selling period results. A new set of sales history data would the be associated with the new, other good. After an interval, the scaling factor could be recalculated as described above against this comparable store. In a more rigorous test the comparison could be done on a day by day selling basis coming up with again the comparable store with the least difference in relationship of day to day selling.

Another instance for synthetically supplying a sales history where one is lacking is for a new good in a new selling location. Here, the system may allow a user to select a comparable good, followed by the system taking cloning the good to a cloned location. The system can run in a sequence (or effectively accomplish the following using a different computing path or execution sequence) so that it first completes any automatic scaling of the comparable good in the new location before the new location uses that comparable item to create the history for the new item and before the system conducts the automatic resealing of the new location new item if that option has been selected by the user.

Another useful feature is so called SKU mapping, for goods that have been assigned new SKUs but are still the same basic product. For example, this occurs when a product receives new packaging. The new SKU sales might be expected to follow the sales history for the discontinued SKU. The method for cloning a sales history for a good applies nicely. In addition, mapping a new SKU for a good to an old SKU for a good can optionally be accompanied by flagging old and new inventory as basically interchangeable. That is, new inventory can be flagged as being available to meet demand for the cloned good, and vice-a-versa. A "map on hand" option can directs the system to count location, distribution center and other inventory (e.g., on hands and in transits) for a discontinued good against the required model stock or forecast demand for the new, repackaged good. Old packaged goods at the selling locations are naturally sold out before being replenished with the new goods, when the old good is allowed to meet demand for the new good.

Multi-Use Causal Calendar

Taking into account events impacting projected sales and needs has been mentioned above in connection with various aspects of the present invention. A method of providing a multi-use causal calendar was described in application Ser. No. 09/760,377, filed 12 Jan. 2001, entitled Multipurpose Causal Event Calendar For Integrated Management Decision Support, by inventors Robert Dvorak and Kevin Katari, which is incorporated herein as is if set forth fully. Utilizing a causal calendar as a basis for a variety of management decision support reports supports refined management decision making that reflects the influences on forecasting of events that impacted past sales and events proposed for the future.

A causal event calendar is a database table or set of tables in which past, present and future causal events are stored. Causal events may include retailer decisions that will affect the rate of sale of one or more goods in one or more selling locations for some period of time, and exogenous factors that will affect the rate of sales of one or more goods for some period of time. Each of these types of events is described in further detail below. Once stored in a database table or set of tables, this information is available for the full range of other retailer information systems or full range of retailer decisions within a system that require the causal events for helping to determine the rate of selling for one or more goods in one or more selling locations for some period of time as an input to their calculations.

Retailer decisions that will affect the rate of sale of one or more goods in one or more selling locations for some period of time include, but are not limited to, price promotions, visual or placement based promotions, promotions of substitute or complementary products, removal of substitute or complementary products from selling assortment, new product or new selling location launch and advertising supported promotions.

Price promotions: A price promotion (for example, a 25% reduction in price for one or more goods for some period of time) will typically increase the rate of selling for those goods whose prices have been reduced.

Visual/placement based promotions: Frequently, a change in visual or placement presentation will increase and decrease the rate of selling of a product. For example, moving the product's in-store location to a high traffic area of the store for a period of time typically will increase sales for that time period relative to the normal rate of selling associated with the product's usual position in the store. Similarly, if the presentation of an good is changed, perhaps displaying it on more than one store fixture, the rate of selling will typically increase. In each of these cases the opposite effect is typically true as well; placement of an good in a less attractive location will usually decrease the rate of selling, as may reducing the number of fixtures where the good is displayed.

Promotions of substitute or complementary products: If a price or visual/placement based promotion is in effect for good A, the sales of good B may be affected if the two goods are substitutes or complementary products. In the case of substitute goods, the promotion of good A will increase the sales rate of good A but decrease the sales rate of good B. For example, if an 8 oz size of a product is promoted, then sales of the other sizes of the same product will likely be reduced, as the goods are substitutes for one another. Products need not have identical ingredients or components to be substitutes; a promotion of a product from one vendor may reduce the rate of selling of similar products from a different vendor. In the case of complementary products, the promotion of good A will increase the sales rate not only of good A, but also of an associated good B as well. For example, if a number of battery-powered toys are placed on promotion, then the rate of sales of batteries may increase during the promotion, even though the batteries themselves are not a promoted good.

Removal of substitute or complementary products from assortment: In manner similar to that described above, if substitute or complementary products are temporarily removed from the assortment, then the rate of selling of another product may be affected. Frequently, to make space for a seasonal or holiday program, some goods are removed from the overall assortment, and the removal of good A may increase or decrease the sales of good B if A and B are complements or substitutes.

New product or selling location launch: Retailers frequently see an acceleration in selling for goods when they are newly introduced, even without special advertising, or see higher sales for otherwise not promoted goods during the start of a new selling location.

Advertising supported promotions: Retailers frequently advertise in newspapers, magazines, on television, and in other media in an effort to increase the rate of selling of some or all products. An increase in advertising spending that is not targeted as specific products may result in an increase in selling rates across many or all goods for some period of time. An increase in advertising spending targeted against specific goods may result in an increase in selling rates for those goods and a few associated goods for some period of time.

Exogenous factors that will affect the rate of sales of one or more goods for some period of time include, but are not limited to, holiday or other calendar based events and traffic increasing events. For some goods, the rate of selling increases significantly during certain times of the year. For example, goods that can be given as gifts usually have a sharply higher rate of selling in the time period just in advance of Christmas. Similarly, goods that can be given as gifts for Mother's Day, Father's Day, or Valentine's Day typically will have a higher rate of selling in advance of these days. Traffic-increasing events also can increase the rate of selling for period of time. For example, the presence of the Olympics in a city can increase the rate of selling for many goods if the selling occurs in a venue that will see increased customer traffic as a result of the event. Other events may have similar effects, such as a summer beach season, or a winter skiing season in a selling location.

The causal event calendar table stores all of the good-event type-date information required to associate good-time periods with events. Typically, the causal calendar would be configured with data fields or attributes that describe the event.

Good Identifier: This field is populated with a unique identifier for the good in the event, typically a SKU number.

Selling Location Identifier: This field is populated with a unique identifier for the selling location of the event, typically a store number.

Event Start Date: This field is populated with the start date of the event. For example, if the event were a price promotion, this field would be populated with the date corresponding to the first day of the price promotion.

Event End Date: This field is populated with the end date of the event. For example, if the event were a visual-based promotion, this field would be populated with the last day for which the special visual presentation would be in effect.

Event Description: This field is optionally populated with a description for the event. A description is simply identifies the event name. For example, event description might be populated with "Christmas 2000" or "Spring 2001 White Sale." Alternatively, the event description may be associated, from a separate table, with the Event Type.

Event Type: This field identifies the event type, typically so that the rate of selling in this event can be identified with some prior period in which the same event type was in effect. Event types might include "Pre-Christmas", "Pre-Mother's Day", "50% Markdown", "New Product Introduction" or "25% Price Promotion".

By itself, the causal calendar table or tables is a repository for information. Users enter and maintain data in these tables via a user interface. There are a number of ways to store the data but the objective is to be able to identify for usage by other systems or other parts of the same system which causal events are set for which goods and selling locations. For example, the causal event calendar table or tables could have a row for every unique good/start date/end date/event type. Then if a single good has the same causal event for the same period of time in 100 stores, then the causal event calendar table will be populated with 100 rows with one row for each selling location. If the same event applies to 20 goods in 100 stores, then the causal event calendar table will be populated with 2000 rows. However, there are other ways to store the data that could be used, for example if the 100 stores were all the stores or an identified group of stores, then there might be a single data row entry indicating that the causal event is on for the start date/end date/event description/event type for the group of stores. Or, a group Good Identifier or group Selling Location Identifier can be assigned to a group of goods or selling locations which are treated or considered together. A multi-level grouping of goods or stores may be useful in some settings.

While the causal event calendar stores this information at a granular level, the user interface can be constructed to simplify ease of entry and maintenance. If hierarchies are developed for both the selling locations (typically stores) and for goods, then user entry can occur at these levels. For example, the user could select "all stores" in the selling location hierarchy along with a single good for the good hierarchy and enter the event information, and the causal event calendar system would apply the event information to all selling locations falling below "all stores" in the selling location hierarchy (in this case, presumably all stores). Similarly, if only one region was running the causal event then the user might select the selling locations in "North West Region" and the causal event calendar system would apply the event information to all selling locations falling below "North West Region" in the selling location hierarchy. Similarly, on the good dimension, if an entire department will be in a promotional event, the user could select "Watch department" in the good hierarchy and specify all of the required selling location and event information; in this case, the event information will be applied to all of the goods that fall under "Watch department" in the product hierarchy. Of course, the user may select nodes on both the good and selling location hierarchy, in which case the event will be applied to all goods and all selling locations falling under the specified nodes in the hierarchy. This could be a single good in a single selling location (e.g., like the Gucci Bezel Model 09210 at Store 924) or groups of goods in groups of stores.

The causal event calendar table serves as the single repository of causal event information feeding a range of retail systems or a range of different activities within a system, where the following outlined below could be separate systems or separate activities within a system.

Ordering: An ordering system or ordering activity within a system typically determines the quantity of a product that should be ordered from a distributor or manufacturer in order to meet expected sales with some additional allowance for safety stock. In calculating required order quantities, it is useful to understand the expected rate of future selling for goods that are being ordered. Because the events entered into the causal event calendar will affect the future rate of selling, it is helpful for the ordering system or activity to get this information from the causal event calendar in order to make the most accurate determination of the order quantity. For example, if a future price promotion with a 25% discount were planned and entered into the causal event calendar, then the order quantity would increase relative to the quantity required if the event were not planned for the future.

Allocating: An allocating system or allocating activity within a system typically determines the quantity of goods to be sent from a selling location that either does not stock goods or does not want to stock this good now to the selling locations that stock or use the good. In determining these quantities it is useful to understand the expected rate of future selling for goods that are being allocated. Because the events entered into the causal event calendar will affect the future rate of selling, it is helpful for the allocation system or activity to get this information from the causal event calendar in order to make the most accurate determination of the allocation quantity. For example, if a future price promotion with a 25% discount were planned and entered into the causal event calendar for some of the stores to which the allocation was going, then the allocation quantities to those stores would increase relative to the quantity required if the event were not planned for the future for those stores.

Distributing: A distribution system or distribution activity typically determines the quantity of an good that should move from one stocking location to another stocking location, typically from a distribution center to a store. In calculating required distribution quantities, it is useful to understand the expected rate of selling in the location to which the good is being sent in order to determine the quantity that should be sent. Because the events that are entered into the causal event calendar identify changes in expected future selling rates, it is helpful for the distribution system to get the causal event information from the causal event calendar in order to make the most accurate determination of the distribution quantity.

Bottom-up planning: Bottom-up planning provides good level plans for the future, typically providing sales, inventory, and receipt information on a daily or weekly basis from the present until some point in the future. Because the future rate of selling for each good is a key requirement for correctly calculating future good plans, the bottom-up planning system or bottom-up planning activity should find it is helpful to get the causal event information from the causal event calendar in order to make the most accurate determination of the future rate of selling for the good.

Top-down planning: Top down planning provides plans at levels higher than individual goods, but some differentiate historical discounting where the point of sale (POS) data does not fully capture the causal factors, particularly for the exogenous factors (e.g., selling during Pre-Mothers day is usually not differentiated other than by date in a POS where as type of promotion can be). In these instances it is helpful to have the causal calendar data available to the Top-down Planning system or system activities.

Open-to-buy (OTB) management: In OTB management, future inventory levels are predicted based on current inventory, expected selling, and expected receipts; the future inventory levels are then compared to budgeted levels in order to determine whether the current sales and ordering plan will result in exceeding the inventory budget (typically at the department level or higher). Because the future rate of selling is critical to calculating what future inventory levels will be, the OTB system or OTB activity should find it is helpful to get the causal event information from the causal event calendar in order to make the most accurate determination of the future rate of selling for an good.

Markdown management: A markdown management system or markdown activity within a system typically determines the optimal timing and level of markdowns of a seasonal or fashion program in order to sell the total purchased quantity by a predetermined "out date" while maximizing revenue. In order for a markdown management system to perform, it needs to query the causal event calendar in order to determine what event occur between the date of the markdown analysis and the "out date" in order to calculate the expected selling. For example, an good that has no event planned before its "out date" might require a markdown in order to reach full sell-through based on the rate of selling to-date; however, that same good with the same selling to-date may not require a markdown if some other event—a visual promotion, perhaps—is planned to take effect between the date of analysis and the "out date." Because the future likely rate of selling is critical to calculating what markdowns and markdown levels will be required, the Markdown system or Markdown activity should find it is helpful to get the causal event information from the causal event calendar in order to make the most accurate determination of what markdowns are best.

The systems or system activities discussed above may be further divided by types of goods, for example basic, fashion and seasonal goods. Therefore, you may have one distribution system or system activity for basic goods and another distribution system or system activity for fashion or seasonal goods. The example dimensions upon which the types of goods can be divided are described below:

Basic goods. Goods that are reorderable are frequently called basic and can use different mathematical calculations to determine how much to order, allocate or distribute than other types of goods.

Fashion/Seasonal goods. These goods are usually differentiated from basic goods in that they have limited or no ability to really be reordered once sales performance has been measured. The mathematical calculations to determine how much to order, allocate or distribute can differ by using historical sales profiles rather than specific good history.

Fashion goods. These goods can be further differentiated to goods that have no exact good history and therefore the mathematical calculations are based on historical profiles, in-season selling performance or a combination of the two.

Seasonal goods. These goods can also be further differentiated from fashion goods as having same good or very comparable good sales histories that however are discontinuous because the good is not sold year round. Therefore, the math may use that past good history and some combination of historical profiles and in-season selling performance.

In addition, there may be other differentiations of goods such as goods that are rapidly obsolete (e.g., computers with certain chip configurations) versus those with a longer sales life (e.g., printer supplies for multiple printers).

A multipurpose causal calendar may allow users to enter the causal events in one place, use one approach, and have all the information assessable to all the systems or system activities from one table or set of tables. This increases the likelihood that goods will be handled the same way across multiple systems and that if a good moves from being basic to fashion that the user does not need to reenter information. It means that when an good is considered for markdown, if it has already been ordered, allocated and distributed and the causal information has been entered it is then available for the markdown activity. It also ensures that if a change is made in the past, present or future causal calendar it is effectively made for all the activities. If a single causal event calendar were not maintained, then each system would need to maintain its own causal event calendar or each system would not have the benefit of using future causal information in order to make the best calculations possible. By establishing and maintaining a single causal event calendar that feeds all retail systems or retail activities that require the information, data entry burdens are reduced and consistency is increased.

Presentation Quantities

Methods and devices for computer-implemented management of visual presentation of products in selling locations were described in application Ser. No. 09/766,539, filed 19 Jan. 2001, entitled Multipurpose Presentation Demand Calendar For Integrated Management Decision Support, by inventor Robert Dvorak, which is incorporated herein as if set forth fully. Retailers invest significantly in building fixtures in selling locations and determining the best visual presentation of products for sale (e.g., how much of each good should be displayed.) In many cases, careful thought is given to where in a selling location a product is featured as well as the quantity of the product that will be most appealing visually to customers. Some retailers have visual departments responsible for planning the layouts of their selling locations, determining which products are sold on which fixtures as well as the ideal display quantity of the product.

Utilizing a presentation demand calendar as a basis for a variety of management decision support reports supports refined management decision making that reflects the influences on forecasting of presentation quantities used to enhance sales.

A presentation demand calendar is a database table or set of tables in which presentation demand requirements are stored. Presentation demand requirements come in different forms. For example, regular presentation quantities (RPQs) are target inventories that selling may reduce below the target value. In some situations, where the presentation quantity is a target inventory that should be on hand in all but extremely high selling situations, sometimes called a presentation quantity protect (PQP). Special display minimum (SDM) presentation quantities are used for goods that will not be saleable during a presentation, such as goods placed in a window or special display, that will not be sold even if the selling location is otherwise out of the good. Another type of presentation demand requirement is an average presentation quantity (APQ). With an APQ, selling location inventory levels are managed to ensure that average store quantity on-hand of an item is intended to equal to the APQ or greater. For fashion or seasonal goods, is a Capped Presentation Quantity (CPQ) is sometimes used. This is actually a normally defined PQ to which differential math is applied over the presentation. This is done because typical fashion and seasonal programs have a short good life by the end of which the inventory levels that should reach zero. So if the PQ does not also reach zero by the end of the program, it may lead to an undesirable surplus of inventory. The overall presentation quantity for a good at a selling location may be made up of one or more of these presentation quantity types; the types of presentation used may also change from time to time.

The presentation demand event calendar table stores all of the good-presentation quantity information required to associate good-time periods for selling locations with presentation quantities. Typically, the presentation demand calendar would be configured with data fields or attributes that describe the presentation event.

Good Identifier: This field is populated with a unique identifier for the good in the event, typically a SKU number.

Selling Location Identifier: This field is populated with a unique identifier for the selling location of the event, typically a store number. Two fields may be used, to identify the selling location by number, such as a store number, and to describe its location, such as by city and shopping center. Alternatively, a selling location number may be associated with a selling location description stored in a separate table.

Quantities: One or more quantity fields can give presentation quantities for specific time periods. The time periods can be implicitly related to the memory location or array location where the quantity is stored. Alternatively, explicit start and stop dates for the presentation can be stored.

Start Date: This field, when present, is populated with the start date of the presentation.

End Date: This field is populated with the end date of the presentation.

Fixture Assignment: An alternative to assigning a presentation quantity, as a number, is to assign a fixture in which the good will displayed. This alternative applies when a fixture schedule is used, identifying types, quantities and capacities of fixtures at selling locations. Fixture assignments are associated with start and end dates, implicitly or explicitly, just as quantities are.

Presentation Type: This field is optionally populated with a code for or description for the presentation. When a code is used, a presentation description may be associated, from a separate table, with the type.

This logical table may be constructed from a number of physical tables, designed for easier user maintenance. The presentation demand calendar may be used on an exception basis to identify presentations with substantial impacts on other activities.

Presentation quantities can be assigned to key goods or goods being promoted, to ensure that there is sufficient inventory to support the desired visual presentations and projected selling of those goods. At the other end of the spectrum, presentation quantities can be said for every good by store group, where all stores in a store group have the same display fixtures. Visual presentation demand requirements may be accompanied by setup instructions for selling locations, which may be distributed to guide selling location personnel in presenting goods. In an integrated system utilizing the present invention, this logical table may be used as input to a forecasting engine, which uses one or more forecasting approaches. The output of the forecasting engine can be analyzed in many ways, such as for ordering, allocation, distribution, markdowns, opened by, promotional planning, and forward buying planning. These analyses drive the inventory of goods available at selling locations and distribution centers. A multipurpose presentation demand calendar supports efforts of a retailer to generate good and selling location specific analyses.

Using a display fixture schedule is one way of reducing the workload for setting up presentation demand requirements. A display fixture schedule allows the user to associate presentation quantities with a good at a selling location. A display fixture schedule may include a fixture identifier, such as a unique name for particular fixture, promotional display point or other mode of presentation, (e.g., table 1 department A, rounder 5 department C or 4-way department G.) It also may include a capacity of the fixture. A set of named fixtures is then associated with each selling location, so that the quantity of each fixture at each selling location is specified. When the layout of selling location changes, different fixtures can be associated with the location. Through the presentation demand calendar, goods are assigned to fixtures for periods of time. The system takes into account the capacities of the display fixtures and the number of display fixtures at each selling location to calculate presentation demand quantities. For good-selling location pairs, more than one fixture at a selling location can contain the same good. Therefore, the total presentation quantity for a good at a selling location may be the sum of presentation quantities required for more than one display fixture. Using this approach, the system can calculate the presentation demand from fixture assignments for goods.

In practice, an array of memory positions in a presentation demand calendar may be associated with successive time periods. The start and end dates for these periods are implied from the position in which a presentation quantity or fixture assignment is stored. The start and end dates for successive time periods may define non-overlapping or overlapping periods of time.

Figure 36:
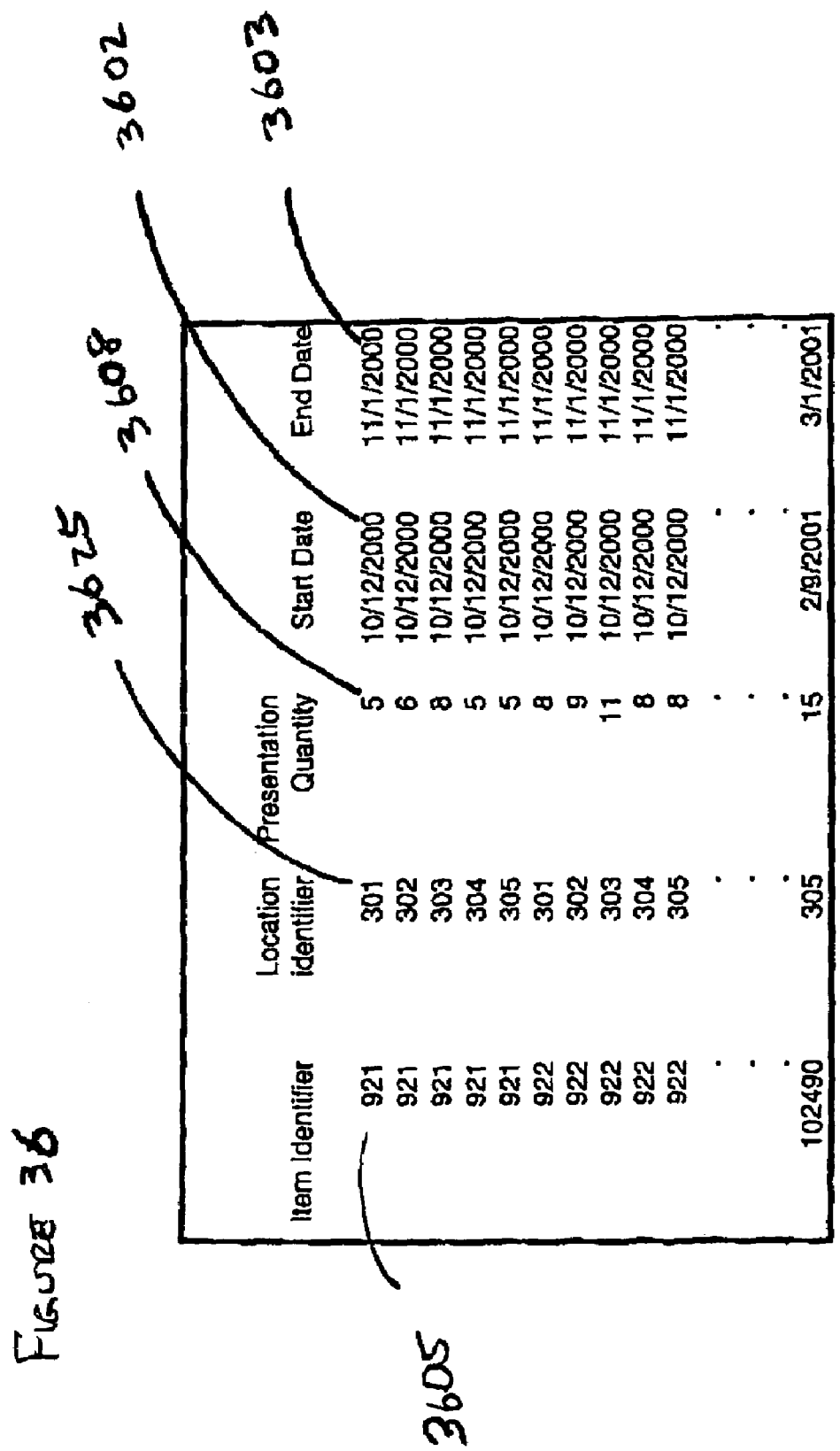

There are a number of ways of associating presentation quantities with a good at a selling location. One of the simplest from a data perspective is to create a data table, see FIG. 36, from inputs that has the item identifier 3605 and the location identifier 3625 related to the presentation quantity 3608 with an accompanying start date 3602 and end date 3603. However, while this satisfies all the data requirements it may not be the easiest approach for the user.

A potential improvement on entering the information would be to organize the data entry by date range periods with an identifier. This will require entry of the date ranges but then will streamline the data entry for each item and location combination, FIG. 37. So as shown in FIG. 37 while you will still enter in some manner the item identifier 3605 and location identifier 3625, which may be drop down menu or some way of entering more than one item and location identifier at once, you will then enter the presentation quantities 3608 into date ranges.

Figure 39:
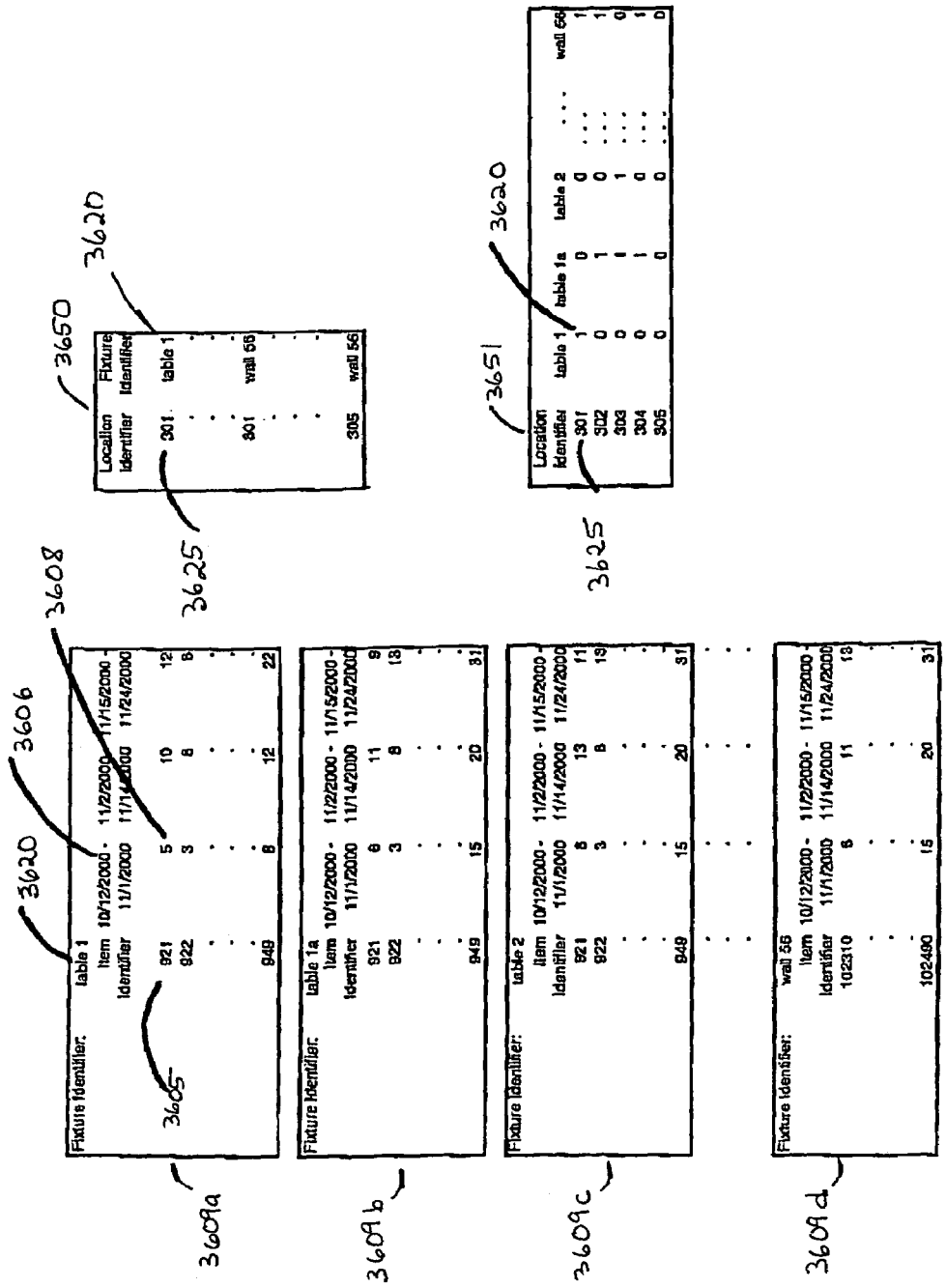

Further improvements may involve adding fixtures that are then populated with items and then attributing the fixtures to the selling locations. How that might work is exampled in FIG. 38. The presentation quantities 3608 can be populated for date range indicators 3606 with an item identifier 3605 and fixture identifier 3620. The fixtures identifiers 3620 are then attributed to the location identifiers 3625 in one of a number of manners like that done in 3650 or 3651. By doing all of this you end up getting item and location time specified fixturing. Further improvements to this may include having the information entered in by fixture like in 3609*a*, 3609*b*, 3609*c* and 3609*d* in FIG. 39. Here the presentation quantities 3608 can be populated for date range indicators 3606 with an item identifier 3605 for a fixture 3620. Again the fixture to location attributing can be done in multiple manners such as 3650 and 3651 in FIG. 39.

Figure 40:
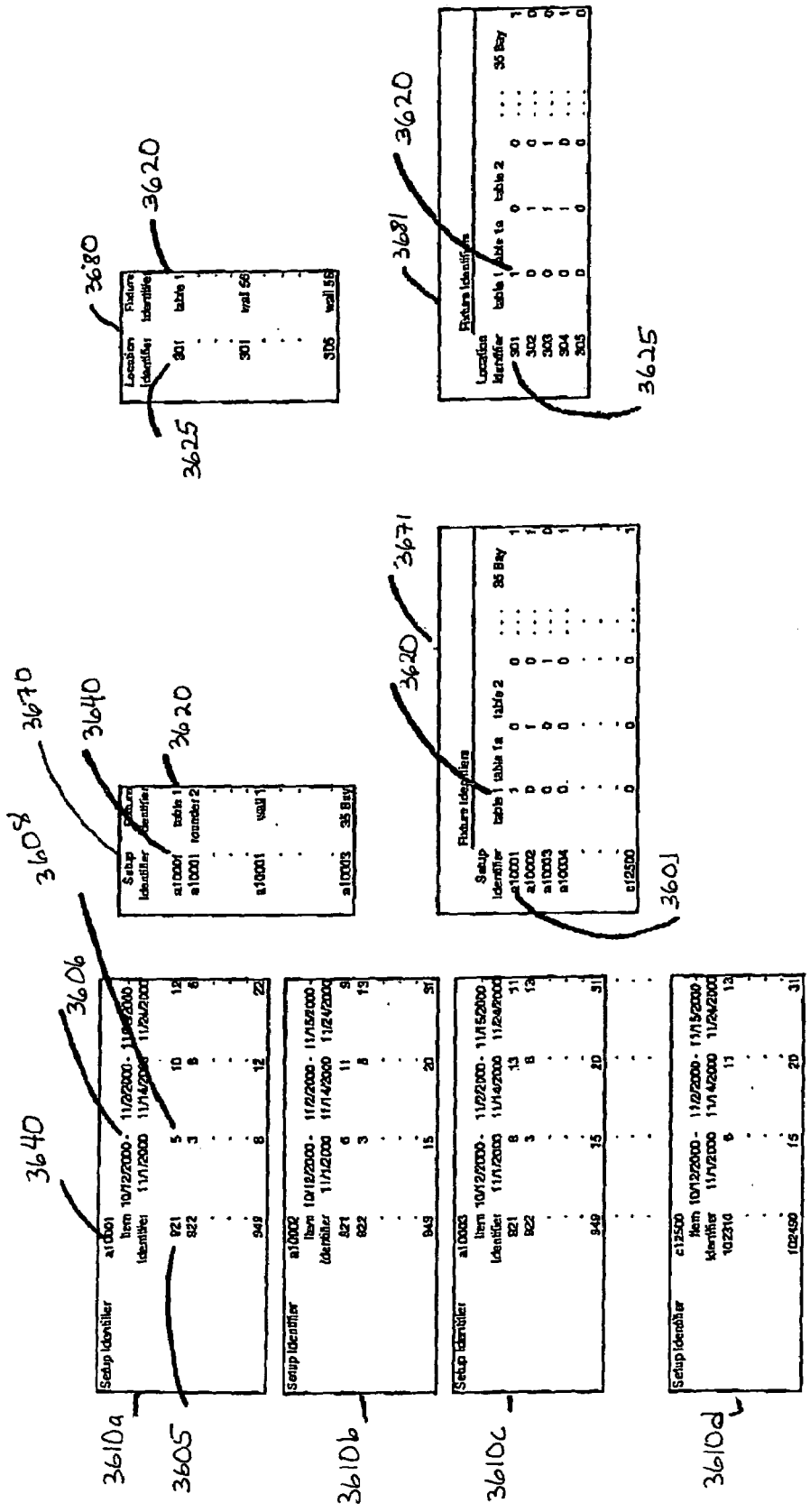

Further improvements exampled in FIG. 40 may involve adding setup identifiers that are then populated with presentation quantities 3608 can be populated for date range indicators 3606 with an item identifier 3605 for a setup indicator 3640. Here there would be multiple setups like 3610*a*, 3610*b*, 3610*c* and 3610*d*. The setup indicators would then be attributed to fixtures like in FIG. 40 in 3670 or 3671 where the setup indicators 3601 and fixture identifiers 3620 are attributed. Then the fixture indicators 3620 are attributed to the location indicators 3625 in one mode like in 3680 or 3681.

In any of the above approaches the system can calculate the presentation quantity for goods for particular locations for particular time periods. However, in some or all of the above methods it is possible that there are multiple presentation quantities per item and location pair for a given day, week or time period. This could result from an item being on multiple fixtures and/or on multiple setups at a selling location or may result because it is easier to input values in a way that results in multiple presentation values per location. It could also happen because there are overlapping time fixture, setup or otherwise time periods that result in an item for a location having multiple presentation quantities. Then to arrive at the presentation value that is typically passed to the other systems or system activities the multiple values are added together. In some cases it is useful for the other systems or system activities to get the fixture by fixture, set up by setup or other combination presentation values and use those values, so in that case the individual presentation values are sent. In some cases the other systems or systems activities want both the total presentation quantity and the individual fixture by fixture or other values from which they are derived.

The presentation demand calendar table serves as the single repository of presentation demand information feeding a range of retail systems or a range of different activities within a system, where the following could be separate systems or separate activities within a system.

Ordering: An ordering system or ordering activity within a system typically determines the quantity of a product that should be ordered from a distributor or manufacturer in order to meet expected sales with some additional allowance for safety stock. In calculating required order quantities, it is useful to understand the inventory requirements to support the selling and visual presentations desired in the selling locations. Because the presentation quantities entered into the presentation manager should affect the inventory required, it is helpful for the ordering system or activity to get this information from the presentation manager in order to make the most accurate determination of the order quantity. For example, if the presentations in the selling locations at the end of the order coverage cycle (i.e., the time period for which the orders must support the selling and inventory requirements of the selling locations) are higher or lower that should be factored into the order. If it is not then the likely desired presentation quantity may not be available in the selling location.

Allocating: An allocating system or allocating activity within a system typically determines the quantity of goods to be sent from a selling location that either does not stock goods or does not want to stock this good now to the selling locations that stock or use the good. In determining these quantities it is useful to understand the expected rate of future selling and inventory levels required for the goods that are being allocated. Because the presentation quantities entered into the presentation manager should affect the inventory required, it is helpful for the allocation system or activity to get this information from the presentation manager in order to make the most accurate determination of the allocation quantities. For example, if the presentation quantities for the set of locations served by one part of the allocation are higher than those in another part of the allocation, the former group of locations would expect to receive more goods if the presentation quantities are factored in. Therefore it is helpful for the allocation system or activity to get this information from the causal event calendar in order to make the most accurate determination of the allocation quantity.

Distributing: A distribution system or distribution activity typically determines the quantity of an good that should move from one stocking location to another stocking location, typically from a distribution center to a store. In calculating required distribution quantities, it is useful to understand the expected rate of selling and the inventory required in the location to which the good is being sent in order to determine the quantity that should be sent. Because the presentation quantities that are entered into the presentation manager identify changes in inventory required, it is helpful for the distribution system to get the causal presentation manager information in order to make the most accurate determination of the distribution quantity.

Associating respective presentation quantities, presentation dates and time elements with the good at the selling locations is usefully combined with looking forward and rolling up projected demand requirements, taking into account the presentation quantities and presentation dates. As explained above, looking forward means looking forward into the future from a particular look forward date. The date may be the date of the on hand inventory data, the date on which analysis is performed, a proposed date for a decision or action, or any other date related to the decision or action. The decision or action may involve ordering the good from a supplier, post allocating the supplier's delivery of the good, distributing the good among stocking and selling locations, determining the OTB, estimating the bottom up plan, determining the best markdown decisions and determining the best promotional or forward buy. The interval during which the presentation quantity affects the analysis is the time between when the inventory being examined will be available at the selling location. This interval is analyzed because it is when the presentation quantity supplied will impact the decision for which it is being included.

The presentations then may be identified in the presentation manager or in the system or system activities using the presentation manager as to their type (for example RPQ, PQP, SDM or APQ) and the mathematical mode of their usage. For example a presentation quantity may be used in different ways in basic item activities like ordering, allocating, distributing, OTB or planning than in the same activities for fashion or seasonal goods. The timeframes for which the presentation quantity values are used also vary by activity. To more fully describe this we will first example the timeframes used for each of the activities and then we will discuss the different mathematical modes for using the presentation quantities.

Figure 41:
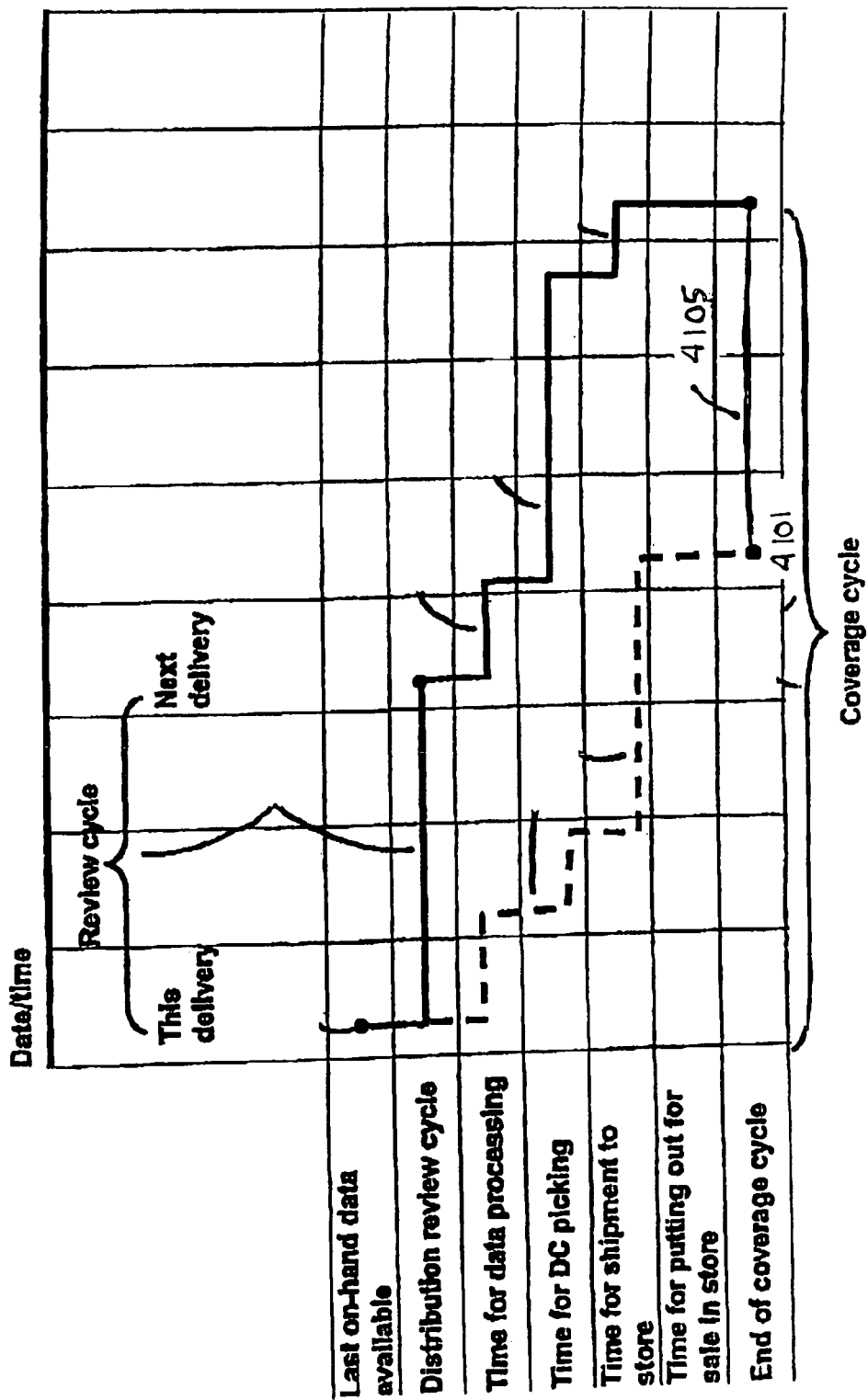
FIGS. 41–43 depict coverage cycles.

A distribution activity uses one or more of the presentation quantities in FIG. 41 during the time frame within the distribution coverage cycle 4101 and more likely during the timeframe of when this delivery arrives at the selling location and is ready for sale through to when the next delivery arrives at the selling location and is ready for sales 4105.

Figure 42:
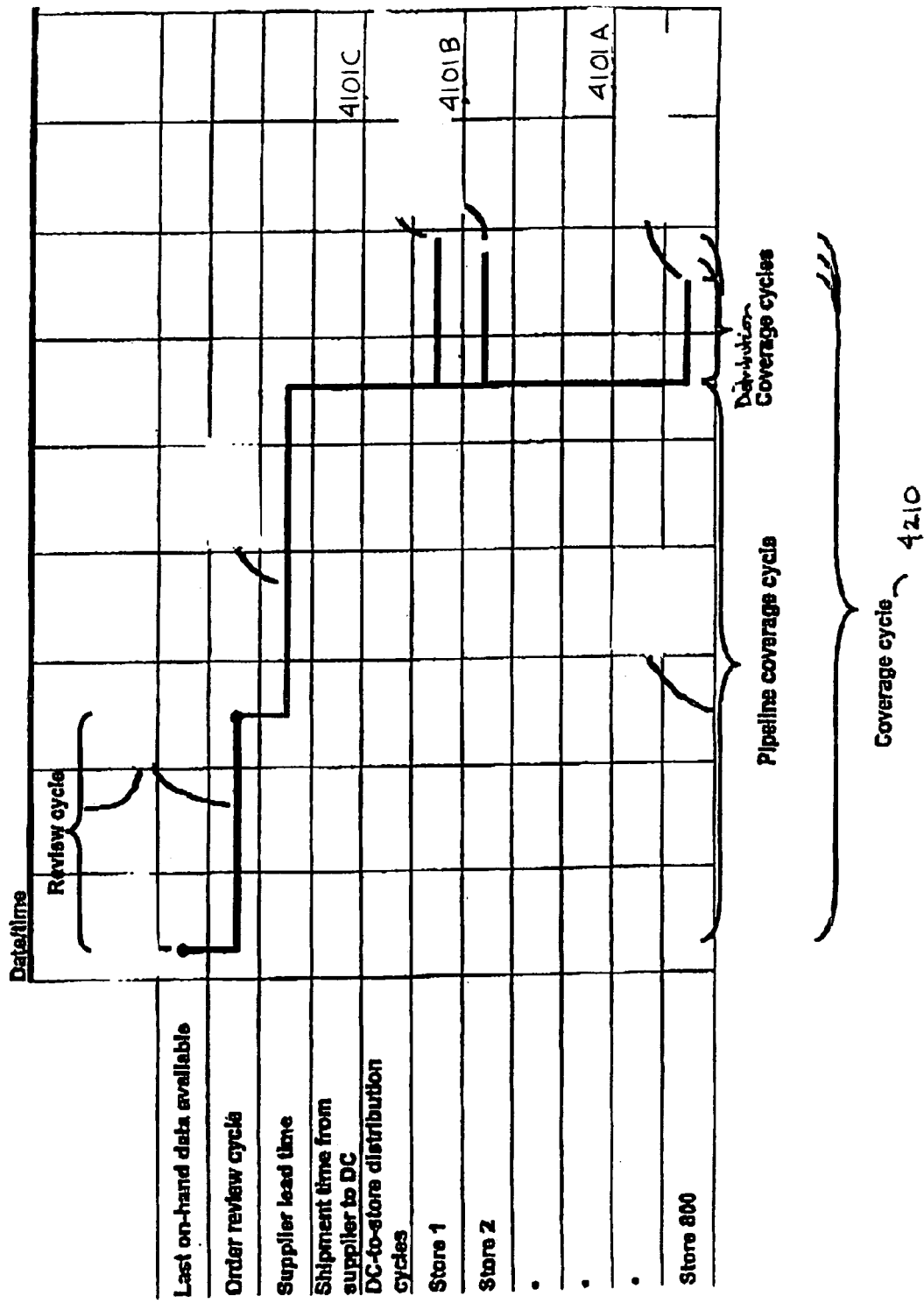

In a simple order activity you would use a presentation quantity or quantities during the specific coverage cycle that includes the selling location. In FIG. 42 that would be during the distribution cycles 4101A, 4101B and 4101C. And more likely you would use a presentation quantity or quantities during the timeframe of when the deliveries supported by the order arrives at the selling location and is ready for sale through to when the next delivery arrives at the selling location and is ready for sales, which would be the equivalent of FIG. 41 4105 for each of the distribution cycles, 4101A, 4101B and 4101C in FIG. 42. In a more sophisticated version of ordering you might step day by day through the end of the total allocation cycle 4210 using the presentation quantities for every day at the selling locations and therefore affecting what would be sent to those locations on a daily basis. The reason you would do this is that if there are large presentation quantities in early days that require sending quantities to particular locations, then you would want to factor these impacts into where the inventory is located and how much is needed. Frequently you run into situations where large presentation quantities that used during promotions, for display purposes, end up leaving selling locations overstocked. Unless these situations are factored in then you will understate the required orders to then support the locations that are not left overstocked.

Figure 43:
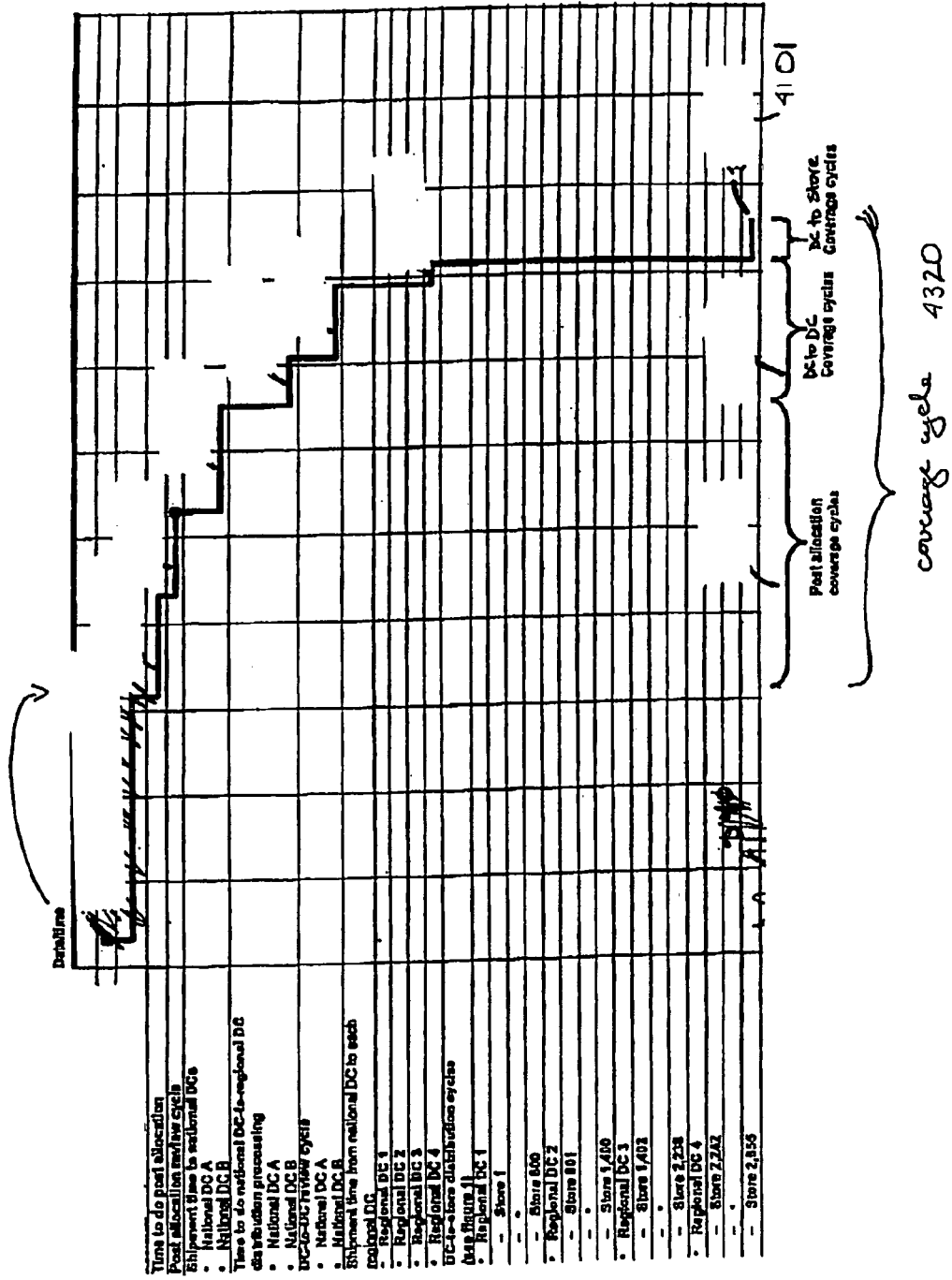

In an allocation activity you would use a presentation quantity or quantities during the specific coverage cycle that includes the selling location. In FIG. 42 that would be during 4101 for each of the stores supported by the allocation. And more likely you would use a presentation quantity or quantities during the timeframe of when the deliveries supported by the allocation arrives at the selling location and is ready for sale through to when the next delivery arrives at the selling location and is ready for sales, which would be the equivalent of FIG. 41 4105 for each of the distribution cycles, represented by the single cycle 4101 in FIG. 43. In a more sophisticated version of allocation you might step day by day through the end of the total allocation cycle 4320 using the presentation quantities for every day at the selling locations and therefore affecting what would be sent to those locations on a daily basis like we described above for ordering.

In an OTB activity you would use the presentation quantity or quantities to determine the inventory levels that are required to support the selling. It is very much like calculating what is going on during the order cycle and if the OTB period extends beyond the end of the order cycle for different items then an automated OTB very well may be running a number of successive order cycles. So in that case the OTB system or activities within a system would make use of many presentation quantities for each store and could use as many as multiple presentation quantities per item and location and date combination.

Markdown suggestions are most effectively done knowing where inventory is currently located or would be located in the future, if not all of the inventory has been shipped to the selling locations. So the markdown manager typically uses presentation quantities for dates after the date the markdown is being run and before the out date (i.e., the desired date of last sale) for the good being marked down.

Promotional buying or forward buying systems or activities within a system also are driven by what inventory levels are desired throughout and after the trade or consumer promotion. Since presentation quantities can be an important driver of inventory levels during and after promotions that information is important to understanding how much goods to buy for the promotion or forward buy. Thus these systems or activities within a system would benefit from getting presentation quantities from a presentation manager on dates after the current date and through the future dates through which the purchased inventory would be sold.

There are a number of ways that the presentation quantity gets factored into the activities. For example a distribution model stock can be calculated, taking into account presentation quantities, using either of the following equations:

ModelStock(selling location,good)=Maximum of
((PresentationQuantity(selling location,good,
time),DemandProxy(selling location, good))+
SDM(selling location,good,time)

or,

ModelStock(selling location,good)=DemandProxy
(selling location, good)+PresentationQuantity
(selling location,good,time)+SDM(selling location, good,time)

If the first equation is used, the quantity available in the stocking location will be allowed to fall below the presentation quantity between receipt of distributions and so the presentations will be treated in the regular manner described before. If the second equation is used, the presentation quantity will be protected or capped (as described previously); the quantity available in the location should not typically fall below the specified presentation quantity between receipt of distributions except in the case of a fashion program selling well above its plan (described in more detail below). Variables in these equations include:

PresentationQuantity(selling location, good, time) of either regular (RPQ), average (APQ), protect (PQP) or capped (CPQ) types are determined using the approaches described below.

DemandProxy(selling location, good) may be a measure of projected demand requirement for the coverage cycle. It typically includes projected selling and safety stock forecasts. For the present invention, virtually any DemandProxy can be modified to reflect the real world consideration of presentation quantities; the manner in which the DemandProxy is calculated is not a part of the present invention. And fashion or seasonal demand proxies may be calculated in very different ways than basic item ones.

SDM(selling location, good, time), again, is a shorthand for "special display minimum." It is a user specified value that can be directly assigned. For instance, a SDM may be useful when using the first equation above and desiring to protect a special display quantity from being sold during the coverage cycle (such as an item in a display window that you are not willing to sell during the display period). It can also be used as an additional safety factor to cushion model stocks against problems of poor data integrity.

When the decision or action of concern involves a distribution, the model stock equations can be extended to calculate distribution quantities. One equation for this calculation is:

DistributionQuantity=ModelStock(selling location,
good)−Onhand(selling location,good)−Intransit
(selling location,good)

Variables in the equation include:
ModelStock(selling location, good) from prior equation(s).

Onhand(selling location, good) is the quantity of the good at the selling location, based on the available information.

Intransit(selling location, good) is the quantity of the good in-transit to the selling location. This quantity would include quantities already allocated but not picked, as well as quantities picked but not shipped, and quantities physically in-transit to the selling location.

From these equations above you can see how the presentation quantity gets used in determining the distribution quantities. It is useful to then keep in mind that the distribution quantity may then get adjusted by further factors such as minimum distribution quantities, shipment increment quantities (e.g., that shipments are in multiples of 120 but not in between), case pack quantities (e.g., shipments are in multiples of the physical shipment case) and distribution center stock availability (in the event of the total shipment desired for an good being more than the DC has available some logic is applied to send out the quantity available in the manner that will best support it going to the stores most likely to need it first). Application of any one of these may be as simple as any positive distribution quantity below the minimum distribution quantity gets moved up to the minimum distribution quantity or there may be logic that says anything below x percent of the minimum distribution quantity is rounded down to 0 and the rest are rounded up.

When the decision or action involves ordering goods, allocating goods, determining bottom up planning requirements, making OTB estimates or tradeoffs or making promotional or forward buys a similar factoring in methodology is utilized where the selling location demand proxy needs are compared to and/or combined with the presentation quantities to arrive at the model stocks. These model stocks are then factored into the orders, allocations, OTB inventory requirements, planning inventory requirements, promotional or forward buy quantities and markdown inventories.

For each of these situations, a particular presentation quantity determination type (e.g., RPQ, APQ, PQP or CPQ) including mode of incorporation into the model stocks and resulting forecasts of inventory and the timing of which PQ value during the period of concern will need to be selected, when there are a variety of presentation quantities within the period of concern.

As we have previously discussed the PQ can be additive to the demand proxy to arrive at the model stock or the model stock can be the maximum of the PQ and the demand proxy. If the PQ is in regular PQ mode then the maximum calculation approach is used for determining the model stock. If a PQ is in the PQ protect mode (RPQ) then the additive approach to calculating the model stock is used. You could elect to use either calculation approach with the average PQ (APQ) or the capped PQ (CPQ). PQs may also change over time for an item. For example, they may start as one type when the good is introduced and then change to another type later in the life of the good.

Fashion or seasonal items tend to use capped PQs because by the end of the product life it is usually desirable for the PQ value to reach zero (because the inventory level should reach zero). The capping approach can be done in a number of manners. One mode is to have an ideal PQ entered into the presentation manager and then to cap that number based on the remaining sales at a location after the end of the cycle for which the model stock is being calculated. Another mode is to base the capping on some fraction of the remaining sales, where that fraction may be a fixed number or may change overtime (in some instances it is desirable to have that fraction decrease as you get closer to the end of the product life). The capping could be a straight function of the amount of selling expected at a location. The capping could also be a function of the amount of time remaining in the life of the good or the fraction of the good life remaining. The capping could be a function of the amount of inventory expected to be sent to a selling location. It could also be some combination of remaining sales, total sales, inventory, good life or good remaining life.

In a the period of concern for determining the presentation quantity that may be a coverage cycle or part of a coverage cycle, there may be multiple different PQ values, for instance, when a presentational outsizing or placing items on multiple fixtures takes place during part but not all of the period of concern. In the case of multiple different PQs, a number of approaches can be taken to selecting a PQ to use. One option is to use the PQ for the location on the last day of the coverage cycle. This will ensure that you end up with the desired PQ factored in on the last day. Another option which generally results in higher stocking levels is to use the maximum value during the cycle. This is useful for a presentational event that is shorter than a review cycles. It covers the peak PQ value for the activity. Another option is to use the maximum value of the PQ within the dates between distribution coverage cycle end date and an earlier date reflecting the length of the distribution review cycle. This option delivers the maximum PQ value between when the current shipment or distribution arrives and when the next shipment arrives. Another option is to use the value on the date that the desired activity goods are received at the location. This date, if not otherwise indicated in the system, can be determined by subtracting the length of the distribution review cycle from the distribution coverage cycle end date. Yet another approach is to take the average PQ (APQ) over the time period of concern, whether it is an entire coverage cycle or a subset of one. This approach is neither of the more extreme numbers and can be preferred to safely cover a multitude of situations. Finally you may use a presentation quantity approach that looks at the values at the beginning and end of the period of concern and trends off of that. This can be used to try and respond to promotional peaks but not leave the full higher value at the end of the promotion. So if the PQs drop over the cycle the PQ used for the period is a mathematical weighting of the high and low quantities other than a straight average, where the high or the low number may be disproportionately weighted depending by whether it is first or last. So for example, the last number may be weighted 75% and the first PQ time wise weighted 25% in arriving at the PQ that gets used. Thus, a preferred PQ for a period of concern can be selected.

In an integrate system, presentation quantities can be taken into account in a variety of analyses, beyond ordering, allocating and distributing. For instance, analyses for bottom-up planning, promotional planning or forward buying, open to buy management and markdown management analyses can benefit from a multipurpose presentation demand calendar.

Bottom-up planning: Bottom-up planning provides good level plans for the future, typically providing sales, inventory, and receipt information on a daily or weekly basis from the present until some point in the future. Because the future rate of selling for each good is a key requirement for correctly calculating future good plans, the bottom-up planning system or bottom-up planning activity should find it is helpful to get the causal event information from the causal event calendar in order to make the most accurate determination of the future rate of selling for the good.

Top-down planning: Top down planning provides plans at levels higher than individual goods, but some differentiate historical discounting where the point of sale (POS) data does not fully capture the causal factors, particularly for the exogenous factors (e.g., selling during Pre-Mothers day is usually not differentiated other than by date in a POS where as type of promotion can be). In these instances it is helpful to have the causal calendar data available to the Top-down Planning system or system activities.

Open-to-buy (OTB) management: In OTB management, future inventory levels are predicted based on current inventory, expected selling, and expected receipts; the future inventory levels are then compared to budgeted levels in order to determine whether the current sales and ordering plan will result in exceeding the inventory budget (typically at the department level or higher). Because the future rate of selling is critical to calculating what future inventory levels will be, the OTB system or OTB activity should find it is helpful to get the causal event information from the causal event calendar in order to make the most accurate determination of the future rate of selling for an good.

Markdown management: A markdown management system or markdown activity within a system typically determines the optimal timing and level of markdowns of a seasonal or fashion program in order to sell the total purchased quantity by a predetermined "out date" while maximizing revenue. In order for a markdown management system to perform, it needs to query the causal event calendar in order to determine what event occur between the date of the markdown analysis and the "out date" in order to calculate the expected selling. For example, an good that has no event planned before its "out date" might require a markdown in order to reach fill sell-through based on the rate of selling to-date; however, that same good with the same selling to-date may not require a markdown if some other event—a visual promotion, perhaps—is planned to take effect between the date of analysis and the "out date." Because the future likely rate of selling is critical to calculating what markdowns and markdown levels will be required, the Markdown system or Markdown activity should find it is helpful to get the causal event information from the causal event calendar in order to make the most accurate determination of what markdowns are best.

The systems or system activities discussed above may be further divided by types of goods, for example basic, fashion and seasonal goods. Therefore, you may have one distribution system or system activity for basic goods and another distribution system or system activity for fashion or seasonal goods. The example dimensions upon which the types of goods can be divided are described below:

Basic goods. Goods that are reorderable are frequently called basic and can use different mathematical calculations to determine how much to order, allocate or distribute than other types of goods.

Fashion/Seasonal goods. These goods are usually differentiated from basic goods in that they have limited or no ability to really be reordered once sales performance has been measured. The mathematical calculations to determine how much to order, allocate or distribute can differ by using historical sales profiles rather than specific good history.

Fashion goods. These goods can be further differentiated to goods that have no exact good history and therefore the mathematical calculations are based on historical profiles, in-season selling performance or a combination of the two.

Seasonal goods. These goods can also be further differentiated from fashion goods as having same good or very comparable good sales histories that however are discontinuous because the good is not sold year round. Therefore, the math may use that past good history and some combination of historical profiles and in-season selling performance.

In addition, there may be other differentiations of goods such as goods that are rapidly obsolete (e.g., computers with certain chip configurations) versus those with a longer sales life (e.g., printer supplies for multiple printers).

A multipurpose presentation demand calendar may allow users to enter the presentation demands in one place, use one approach, and have all the information assessable to all the systems or system activities from one table or set of tables. This increases the likelihood that goods will be handled the same way across multiple systems and that if a good moves from being basic to fashion that the user does not need to reenter information. It means that when a good is considered for markdown, if it has already been ordered, allocated and distributed and the presentation information has been entered, it is then available for the markdown activity. It also ensures that if a change is made in the past, present or future presentation calendar, it is effectively made for all the activities. If a single presentation event calendar were not maintained, then each system would need to maintain its own presentation event calendar or each system would not have the benefit of using future presentation information in order to make the best calculations possible. By establishing and maintaining a single presentation demand calendar that feeds all retail systems or retail activities that require the information, data entry burdens are reduced and consistency is increased.

Open to Buy Analysis and Reporting

As described above, planning can interact directly with forecasting or it can utilize OTB tools. Many calculations for planning purposes are the same as so-called statistical OTB analyses. Methods and devices for computer-implemented OTB analysis were described in application Ser. No. 09/888,336, filed 22 Jun. 2001, entitled A Method and Apparatus for OTB Analysis, by inventors Robert Dvorak, Richard W. Pasternack, Ronald Samuel Cope and Beth Li-Ju Chen. Retailers have historically used "open-to-buy" (OTB) as a metric to manage their inventory levels at some aggregate level above items, such as the department or category level. OTB is a measure of the amount of additional inventory that may be purchased while remaining within an inventory budget, historically a department or category inventory budget. Aspects of the present invention include methods of and apparatus for analyzing projected future inventory against inventory budgets to determine open-to-buy inventory values. Aspects of the present invention include analyses based on a variety of ways the projecting future inventory.

There are many varieties of OTB, including different sets of factors, which work to create a comparison of projected inventory to budget. OTB typically is analyzed monthly. FIG. 44 depicts a typical OTB report. The report columns typically start with last month's ending inventory or this month's beginning (BOM) inventory 4420, to which purchase orders scheduled to arrive this month 4421 are added. Then permanent markdowns expected to occur 4422 are subtracted, promotional discounts expected during the month 4423 are subtracted, the impact of Suggested Retail Price (SRP) changes 4424 are factored in, as are the impacts of any other factors 4425 (e.g., write offs, employee discounts, damages, and shrink). Projected sales 4426 (usually at the projected transaction prices) are subtracted out to arrive at the projected ending month (EOM) inventory 4427. This ending month inventory is then compared to the budgeted inventory 4428 to determine how much open-to-buy dollars 4429 are still available within the month.

While the use of open-to-buy metrics has been useful to retailers, the current approach to OTB calculations has significant weaknesses that lead to sub optimal retailer behavior and lack of actionable insight. These weaknesses, some of which are addressed by various aspects of the present invention, include:

Lack of visibility into the source of OTB problems: If a particular category or department is OTB constrained (i.e., the current inventory level is close to exceeding or does exceed the budgeted inventory level), the historical approaches to OTB analysis have not provided specific item level insight as to the root cause of the problem (i.e., which items are causing the excess inventory position). Historically, OTB systems have not generated OTB evaluations at the individual item level (e.g., at the size, color and style level), but instead operate at higher level item groupings, such as department. Historically, OTB systems have not had inventory budgets at the item level, for large retailers, and have not forecasted sales or inventory at the individual item level. Because of this lack of specificity, the actions taken to resolve the OTB problem frequently are not targeted against the real source of the OTB problems. Typically, buying of additional inventory is reduced or curtailed on shorter lead time items (a problem discussed below) and promotional activity is undertaken to increase the rate of selling in the department or category in question. So in many cases the curtailed buying is not of items that will be overstocked, which frequently are the long lead time items, and therefore leads to stockouts and lost sales of short lead time items. In this sense, lead time may include fewer or more components of the time from placement of an order to availability of items for sale at a selling location. Lead time may include such components as data lag time, data processing time, supplier lead time, distribution center ("DC") processing time, DC data lag time, DC data processing time, DC to selling location shipping time, selling location handling time, etc. The lead time components may include supplier lead time plus some or all of these components, depending on the circumstances. In some cases, promotions, to reduce inventory, which frequently include cutting prices, are also run on items that are actually doing fine, resulting in lower profitability than would be achieved if the promotions were targeted at the items really causing the problem.

Long lead time items crowd short lead time items: By definition, long lead time items must be ordered from the vendor or manufacturer earlier than short lead time items in order to be ready for sale by the retailer at the same point in time. If a retailer encounters OTB constraints (i.e., the projected inventory level will be close to or in excess of the inventory budget for some point in the future), ordering of short lead time items is typically reduced or curtailed in order to bring the future inventory position below the budgeted level. Because retailers typically lack visibility into future OTB problems until many of the longer lead-time items have already been ordered, the current OTB management approach produces systematic bias against short lead-time items with sub-optimal results for the retailer. The root cause of this is that the sales and inventories of all items have not been determined on an equal footing, e.g., stocking all items to a forecasted optimal selling level, and therefore the OTB system users of today can not easily tell whether they are buying to much or too little of the longer lead time items relative to the overall OTB budget constraints for the groupings of items that they seek to manage the items in.

Need to manage items in groups for OTB: Large retailers for complexity purposes manage OTB in groups of items above the individual item level. This is because creating an inventory budget for future management purposes is time consuming, managing each OTB group is time consuming, forecasting each OTB group is time consuming and they do not have a mechanism for creating a sufficiently precise OTB budget at the individual item level. So in the past OTB systems have not been built that function at the item specific level.

There are also some secondary weaknesses that cause OTB outcomes to be less than optimal. These are as follows:

Lack of sophistication in fashion or seasonal OTB sales and inventory forecasts: Fashion or seasonal items are typically differentiated from their basic counterparts by their lack of reorderability or the shortness of their sales life. Before they are put on sale their projected sales and inventory levels must be generated without real selling performance and such impacts as store specific presentation quantities are frequently not factored into their projected inventory requirements. Once selling starts then the real sales results should be factored in, however, for those items selling below expectations you must go beyond that to get a good forecast. Markdowns may be required to sell the goods and these markdowns and the resulting sales acceleration and permanent markdowns need to be factored in but OTB systems today do not do that at the individual item level required to really get good forecasts of sales and inventories on the items that are creating problems. These systems also do not have the integration of the markdown system to supply the item and potentially item and location specific markdowns required to sell the goods. Therefore the current OTB systems give an inaccurate picture of what is going to happen once the selling of the short life items starts and specific item level actions start to become apparent.

Lack of incorporation of real world factors into Basic item OTB sales and inventory forecasts: OTB systems today do not include item specific factors like presentation quantities, in dates, out dates and stock out impacts. These can result in material differences in the sales and inventory estimates and therefore should be included to best forecast the OTB position. By best understanding the OTB position at the item level you are then better able to determine the best corrective actions.

A new approach to open-to-buy can address the some of the weaknesses outlined above. Aspects of the invention include:
(a) building up future sales and inventory projections from an item level upwards—not a more highly aggregated level, such as department or category;
(b) building OTB projections incorporating expected future orders and receipts—calculated by the system if required—into the open-to-buy calculation, with the simulated ordering and receipt extending at least as far into the future as the longest lead time item or needed to cover lead times for ordering and receiving delivery of most items; and
(c) identifying items that are on a course to being over bought, relative to the optimal inventory levels or the inventory budget levels.

This approach can then also be improved by mixing in the following additional elements:
(d) building OTB projections from selling locations (typically stores) and stocking location model stocks over time, reflecting the desired inventory level in each location to support selling and presentation requirements; and
(e) building sales and inventory levels at the item and location level, incorporating item specific seasonality, promotion, and other real world factors such as in dates, out dates and projected stock out impacts.

These components may be mixed and matched in accordance with the various aspects of the present invention. One approach to executing the new OTB methodology is to run a simulation for individual items and locations, simulating projected sales and other factors impacting inventory levels. Simulated results are rolled up to arrive at a higher level of the product hierarchy, the level at which OTB management takes place. As a corollary, a system may roll back down budgets set at the higher level and suggest which items are over or under stocked so that corrective actions can be taken. The roll down of budgets to items can be extended by constraining notional orders/deliveries to fit within budget and reporting the lost sales resulting from adherence to budget. The OTB over or under stock calculations compare budgeted inventories and projected inventories. These comparisons can be done different ways, driven by different definitions of the budgeted inventory. For example, sometimes the budgeted inventory is the end of month inventory level. Other times it is the beginning of month level. Occasionally, it is an average or peak value during the month. The example that follows uses the end of month inventory for OTB comparisons. However, the math works similarly for the other cases, using different points of comparison. FIGS. 45–48 depict sample reports derived from OTB analysis in accordance with aspects of the present invention. Steps useful to generation of reports or displays such as FIGS. 45–48 may include the following:

Determine the time horizon ("end date"). The end date of the simulation can be set arbitrarily, but should extend far in enough in the future to be further out than the lead time of the longest lead-time item being analyzed. It may be the inventory management planning time horizon. There may be exceptions where that inventory management planning time horizon is shorter than the longest lead-time item, e.g., where there are a few items with very long lead-times, and then one could use the inventory management planning time horizon, e.g., frequently a year, as the end date. In FIG. 45, the end date would be the month 310.

Determine the expected sales for the item for each day for each location until the end date. Expected sales need to be forecasted. In one embodiment, expected sales are forecast for each selling location on a daily or more frequent basis. Various methods of doing this calculation are set for the in the applications incorporated by reference. Weekly or adjusted weekly forecasts also may be used in accordance with the present invention. Numerous causal and non-causal techniques are used by retailers to forecast sales, including ARIMA, multivariable regression, and historical selling extrapolation. Location-day forecasts can reflect causal events that affect the rate of selling, such as promotions, presentation changes, and seasonal events. Adjusted weekly forecasts may include weekly forecasting approaches that then try to take into account daily selling differences. For example, a weekly sales forecasting approach that then factors in promotions for part of a week by adjusting the weekly forecast for a fraction of the week that falls during the promotion is attempting to make a weekly forecast more accurate. Those sales should then be forecasted taking into account specified factors such as in dates, out dates and last PO receipt dates. Those sales can be forecast to achieve the maximum service level possible (i.e., always in stock-target), a specified lesser in stock level, an optimal economic stocking level (i.e., a stocking level where the in stock target reflects economically optimal tradeoff of potentially losing a sale versus the costs of having extra inventory at that location to avoid losing the sale).

In the case of short life or non reorderable items, such as seasonal or fashion items, the sales forecast should change from the preseason buying plan to take into account actual sales during the selling season. For items under performing their plan, OTB analysis can factor in the causal events (e.g., sales or promotions) that would be needed to close out inventory and finish the program. A user-friendly way of doing this is to use the optimal answer from a markdown optimizer as a causal input to projected future sales and inventory. This gives the optimal seasonal or fashion selling performance without additional user entry. Given that OTB would be running at the item level, which can be well above a million items for a department store retailer, having a highly automated solution is useful in making the more accurate item level OTB work.

Item level forecasting approaches also can take into account factors such as projected stock outs within the current order cycle of each item, by reducing the projected sales by the likely impact of the stock out. When the system identifies projected stock outs, potential corrective actions can be considered, such as expediting an existing purchase order or placing an additional expedited purchase order. Daily sales forecasts can be rolled up to monthly totals, to give the item level sales forecast 4519 in FIG. 45. Item level sales within an OTB grouping, such as a Department, can be totaled to give the sales value 4619 in FIG. 46 for a Department. Column 4619 in FIG. 46 would then be an improved forecast of future sales and inventory. The system calculations could also identify any projected sales lost because of stock outs, 4525 in FIG. 45, and roll those values up to get the total Department value 4625 in FIG. 46.

Determine the desired or optimal selling model stock inventory level for each day for each location until the end date. The desired or optimal stock for each selling location (typically stores and distribution centers) will be based on a determination of the appropriate model stock stocking level for each location given that location's expected selling level (or the selling and stocking requirements of the locations that it services) and the variability of that selling or stocking requirements and the cycle times involved in stocking the location, along with the frequency of replenishment from a distribution center to that location. Multiple techniques exist for determining the model stock, which typically are based on the expected selling with additional safety stock to support variability from the expected selling. The model stock may be adjusted to take into account presentation quantities needed for an attractive sales display of an item. The system also could identify items that are overstocked relative to the optimal, desired or budgeted OTB stocking level. It can identify overstocks in a number of different manners.

One manner is to compare the projected stocking level for each item and location to a model stock driven optimal value and identify any values above the model stock as a Statistical Overstock, column 4526 in FIG. 45. The item in FIG. 45 does not happen to have an overstock and actually is understocked through the end of the time period for which there are Firm Receipts 4513, as shown by the lost sales in August -00 through October -00 4525. However, had there been overstocks they would have shown up in 4526. The total of those item values would be rolled up into higher level groups, as in column 4626 of FIG. 46. Further refinements may be introduced, including whether the overstocks exceed outstanding purchase orders (placed but not fulfilled) for the item, 4527 in FIG. 45 and 4627 in FIG. 46. The values in 4527 are calculated using the smaller of the Statistical Overstock value 4526 and Firm Receipts 4513. The higher hierarchy level values like the department level value in 4627 are simply the mathematical summation of the 4527 values for all the items in the department. Outstanding purchase orders may be a focus of analysis because many retailers cannot send back inventory that they already own and so are interested in first identifying inventory ordered but not received. Another determination may include the overstocks in excess of the minimum order quantity MOQ, columns 4528 in FIG. 45 and 4628 in FIG. 46. Many retailers have to purchase goods in minimum order quantities and therefore at the point that they place an order they are likely to order more than they need at that moment. For overstock in excess of MOQs, the Statistical Overstock 4526 is compared to the Minimum order quantity value, and Statistical Overstock Above MOQ 4528 is the Statistical Overstock 4526 minus the Minimum order quantity value. If the difference is negative, then it is set to 0. Again, the department level grouping 4628 is simply the summation of all the item level values 4528 for all the items in the department. Finally, retailers may want to combine the tests of whether they have POs and whether the stock is then above the MOQ with a combination test as shown in columns 4529 in FIG. 45 and omitted from FIG. 46. The Statistical Overstock above MOQ with PO 4529 is at the item level the minimum of the Statistical Overstock with PO 4527 and the Statistical Overstock Above MOQ 4528. Again, the department level value (omitted from FIG. 46) is simply the mathematical addition of all the values 4529 for all the items in the department.

Another measure of overstocks is depicted in FIGS. 45 and 46, where the inventory budget is prorated by the system from the OTB grouping level, in this example the department level of FIG. 46, down to the item level of FIG. 45. One prorating approach is to take the budgeted inventory level and prorate it to the individual items based on projected sales. Sales could be the projected sales 4619 in FIG. 46 or the column 4619 sales plus estimated lost sales. The actual proration would be done using the item level values of projected sales 4519 or the projected sales 4519 plus the estimate of lost sales 4529. Since each value adds up to the total for 4619 or the total omitted from FIG. 46, the proration is done using the individual values divided by the department level value (i.e., 4619 or 4619 plus 4620) multiplied by the department inventory budget to get the individual item inventory budget values. By combining in the lost sales estimate you weight each item against its full potential. Another prorating approach would be to use the projected inventory model stocks (before or after the incorporation of factors like stock out impacts or presentation quantities) to prorate the budgeted inventory. By using this prorating approach you are factoring in the elements that are not included in the sales projections like visual presentations. You could also use a prorating approach of using the end of month projected inventory 4621 in FIG. 46 to create the item level inventory budget. The way that would work is the Statistical (Stat) End of Month (EOM) inventory 4521 for all the items in the department (which would total to 4621) divided by 4621 multiplied by the Inventory Budget 4622 for the entire Department would give the individual item Inventory Budget 4522. That value would be used to calculate the item level Statistical OTB 4524. As the Stat EOM Inventory 4521 could be calculated a number of different ways, there are many variations on the resulting Stat inventory level. For example, presentation quantities may or may not be included in the Stat Inventory level 4521. Stock-outs may or may not be corrected for in the calculation of the Stat Inventory level 4521. The Stat Inventory 4521 may be set from calculations where economic optimal stocking levels are determined or specific service levels could be set and used for the stocking level determination. For short life items, the Stat Inventory 4521 may be determined with or without any ability to reorder the item. There may even be the opportunity to reduce the order on already ordered items by removing some or all of the remaining units by sending it to another channel (not counted in the OTB calculation like is occasionally done with Outlet Stores that are in a separate OTB) or selling it off to another company (e.g., another retailer or wholesaler). Which of these prorating approaches used can be adjusted to suit the desires of the retailer.

Determine additional notional orders that will need to be placed in the future, including the expected quantity and receipt date for those orders to put all items on an equal footing. Notional orders and deliveries or receipts refer to system projected orders and resulting deliveries that have not been submitted to suppliers. Order needs in the future can be estimated on a daily basis to keep items stocked at their model stock inventory level. This would be done for every reorderable item taking into account lead times and sales out dates. Some items, such as fashion or seasonal, may not be reorderable in the timeframe analyzed, so for those items there would be no notional orders. Use of notional orders and deliveries can put the short lead time and long lead time items on an equal footing for OTB analysis.

Statistical OTB affords a forward view that equally protects long and short lead-time items. To achieve this in the statistical OTB, you include the notional orders (orders that would keep the item stock at an economic optimal or specified service level) in the calculation thereby optimally stocking all ongoing items throughout the entire time horizon for the OTB calculation. The report might look like FIGS. 45 and 46 and include calculations of both the actual OTB 4523 and 4623 and Statistical OTBs 4524 and 4624. Alternatively, reports may not show all of the columns, for example, leaving out the actual EOM inventories 4520 and 4620, as in FIG. 47, where the Stat EOM Inventory 4621 in FIG. 46 is relabeled EOM Inventory 4721.

The statistical OTB calculation assumes that the notional receipts—4514 and 4614—will be received; it includes notional orders/receipts in the determination of the statistical (Stat) end of month (EOM) inventory—4521 and 4621. The math is very similar to the other OTB calculations, typically starting with last month's Statistical ending inventory shown as this month's Statistical (Stat) beginning (BOM) inventory 4512 or 4612, to which any purchase orders that are scheduled to arrive this month Firm Receipts 4513 or 4613 are added as well as any notional orders determined to arrive during the month Notional Receipts 4514 or 4614, then any Permanent Markdowns 4515 or 4615 expected to occur are subtracted, any Promotional Discounts 4516 or 4616 expected during the month are subtracted, the impact of any Suggested Retail Price (SRP) Changes 4517 or 4617 are factored in, as are the impacts of any Other Discounts 4518 or 4618 (e.g., write offs, employee discounts, damages, and shrink), projected Sales 4519 or 4619 (usually at the projected transaction prices) are subtracted out to arrive at the projected Statistical ending month inventory Stat EOM Inventory 4521 or 4621. This ending month inventory is then compared to the budgeted inventory 4522 (a prorated value) or 4622 to determine how much Statistical open to buy (OTB) dollars 4524 or 4624 are still available within the month.

The Statistical OTB can be calculated at any level of the product hierarchy right down to the item level—4524. Statistical OTB values will put all items on an equal footing without bias against short or long lead-time items and helps retailers target inventory areas or items that cause problems. Statistical OTB may be used to understand the severity of inventory problems (e.g., the statistical OTB at the item level) and where to target actions (e.g., the items with the largest statistical OTB problem).

The statistical OTB can be extended by using rolled down inventory budgets to constrain notional orders and deliveries. Any prorating or other approach can be taken to rolling down the inventory budget to individual items or another level of the inventory hierarchy. Notional orders, whether based on optimal stock, service level (in stock performance), or some other criteria, can be constrained by the rolled down inventory budget. Individual items can be constrained or groups of items can be constrained so that a notional order/delivery remains within budget. The constrained notional delivery quantity can be used to calculate stockouts and lost sales. In an iterative process, budgets and prorations can be adjusted to minimize lost sales, lost profit or any other measure of sales effectiveness. An additional aspect of the present invention is taking into account component inventory, for product that is ordered through the typical OTB process but which should not be part of the OTB calculation. Different kinds of situations would potentially cause this to occur. One example would be product that is purchased for use in creating other products, (e.g., kits, and gift baskets), where the final products are counted in OTB but not the items used in creating the gift baskets or kits (e.g., because that would be double counting). However, to minimize work, satisfy minimum order quantities, and minimize overall inventory, the ordering requirements would likely be combined for joint management. So in calculating the OTB values for a particularly period of time, the non-OTB managed value which in FIG. 48 is labeled Production Need 4840 would be removed from the inventory (in this example because of the sign convention used the value would be subtracted from the inventory) and if there were not sufficient inventory available to satisfy that need then a value would be added to the Change in Total Unfilled Production Need 4841 and that value added back to the inventory calculation that otherwise would be done as previously described. To keep a running total of all the unfilled production needs then and additional column would be added labeled the Total Unfilled Production Need 4842 and the net impacts of what is going on in column 4841 would be made to column 4842. So this way you not only have a sophisticated mode of calculating OTB but can accommodate joint ordering and management of items that are then not going to be managed within the current OTB or in this particular department's OTB.

Disruptive Events and Replacement Items

Two special issues in merchandise planning and management are disruptive events and replacement or substitution of items. Disruptive events change the pattern of sales for a good. Many disruptive events can be represented by a step function. That is, sales will step up or down at a relatively well-defined point in time and remain impacted. Disruptive events may impact needs for and sales of items either negatively or positively. For instance, introduction of a large package size of a good can negatively impact sales of small packages of the same good. The large package size cannibalizes sales of the small packages. Introduction of a complementary good, for instance, introducing jelly at a store that sells bread and peanut butter, could have a positive impact on sales of the related good. Competition, both from competitors' stores and sister stores, has similar step function impacts. Opening of a new store nearby can decrease sales. Closing of a nearby store can increase sales. Opening of complementary stores can increase neighborhood sales traffic and have a positive impact on sales. Disruptive events can impact items, locations or item/location pairs.

Replacement of items involves feathering together old and new items or treating them as if they were different items. The feathering of the old and the new item typically involves the old item remaining on the shelf side by side with the new item until the old item is sold out. In the feathering case introduction of a replacement item is not as simple as copying old item information to the new item and building upon it. A system maintains many types of old item-related information, some of which are not subject to bulk transfer in the feathering case. It may also be desirable to jointly manage the phase out of the old item inventory while phasing in the new item inventory in a way that the stocking of the new item is affected by the remaining stock of the old item. A system also may need to segregate inventory and sales of the old and new items for one reason or another. At the same time, it may be desirable to treat the old and new items as one for most reporting purposes, taking care not to double count the old items for themselves and as items new items.

Disruptive Events

The disruptive events described above are examples of identifiable factors that have a step impact on sales and needs. The present invention applies to these and any other identifiable factors that have a step and continuing impact on needs or sales, as opposed to short lived promotions, which are better addressed using the techniques described in application Ser. No. 09/708,944, filed 8 Nov. 2000, entitled Method And Apparatus For Distribution Of Fashion And Seasonal Goods, by inventor Robert Dvorak, utilizing the markdown manager component or in application Ser. No. 09/760,377, filed 12 Jan. 2001, entitled Multipurpose Causal Event Calendar For Integrated Management Decision Support, by inventors Robert Dvorak and Kevin Katari. A step impact differs from a promotion in the obvious ways and is handled differently. The system keeps the step impact distinct from the past or future sales to which it applies, for instance, in a separate field of the sales profile. In an alternative embodiment, the system could merge the handling of step functions with the handling of causal events, so that the step function was handled as an open-ended causal event, with a starting date and either a distant or open-ended end date for the causal event. A distant end date could correspond to a time when the planning cycle restarted, preferably after sufficient actual experience was accumulated to adjust the estimated step impact.

Retail and consumer merchandise planning and management systems today (other than systems implementing the present invention) do not have a sophisticated and user friendly way to build into future sales forecasts disruptive events causing cannibalization of demand or enhancing demand. Nor do they then allow a user to determine after the fact whether a pre-disruption impact estimate was accurate or to revise and improve the impact estimate based on actual sales. Adding these capabilities allows users to anticipate changes in sales caused by frequent occurrences, such as addition of new items that cannibalize demand for old items, or less frequent and more sweeping occurrences, such as the opening or closing of a competitive store. These features allow a user to identify when the sales impact will be felt, e.g., the date of the new product arrival or the date of the competitor store opening, and to estimate the sales impact at that time. With these estimates, longer lead time activities like ordering the item from manufacturing or a supplier can take into account the disruptive events. In an integrated system, the user can set and forget disruptive events having a step impact; the system automatically incorporates the step impact in all sales-related reporting and decisions. This sophistication and automation extends to checking actual sales impact at one or more predetermined times after the disruptive event happens, to test the actual magnitude of the sales impact and then automatically or manually to adjust future estimates of the step impact, consistent with actual sales. The adjusted future estimates carry over into forecasting of sales and stocking of goods, with less work for the user managing the item.

So-called "cannibalization cloning" starts with a user's estimate the impact of a disruptive event on item selling. The impact estimate can be subjective or have any other basis. The disruptive event may be an identifiable action by the retailer, such as introducing a new item or adding a nearby store that will cannibalize sales, or such as remodeling or resetting a store to make it more attractive, resulting in increased customer traffic and sales. The disruptive event could also be a competitive change, such as a competitor opening or closing a store nearby. Alternatively, the disruptive event could reflect an unanticipated or unpredicted impact on item selling, which is subsequently understood and linked to sales, either increased or decreased sales, with a date on which it started.

FIGS. 49–54 illustrate one embodiment of calculations implementing aspects of the present invention. The calculations depend on whether the impact date is in the future, the present (the same day that the analysis runs) or the past. When the impact is in the future, the sales history for the item and location remains unchanged and an impact estimate is included in the projection of the selling. FIG. 49 is an example in which past sales are extrapolated into the future with level daily sales. (In real world cases, sales may fluctuate with the day of the week. Sophisticated forecasting approaches such as segmented probabilistic, regression or different types of ARIMA, working with actual history and a causal calendar might not produce such level sales.) This example illustrates the basic logic and operation of an impact estimate or cannibalization factor, which is calendared for 3/12/2001 with an impact estimate of −0.2. The cannibalization factor 4920 is a fraction, multiplied by projected unit sales 4910 and subject to a rounding rule. Any reasonable rounding rule can be used, or factional unit sales can be allowed. In an alternative embodiment, a specific sales quantity could be used for an impact estimate. For instance, if a competitor who was selling 100 items per day of an item closed their nearby store, 100 items per day could be used as the impact estimate and added to the projected need or sales. Using the multiplicative factor 4920, FIG. 49 illustrates a drop in sales. The daily sales without the disruptive event on the date 4930 are projected to be 10 units. The disruptive impact or cannibalization factor is expected to be −20% (e.g., the −0.2 at 4920.) The new forecast, net of estimated disruptive impact, is 8 units (i.e., 10*(1−0.2)=8,) at 4910 on day 3/12/2001 and later.

Figure 51:
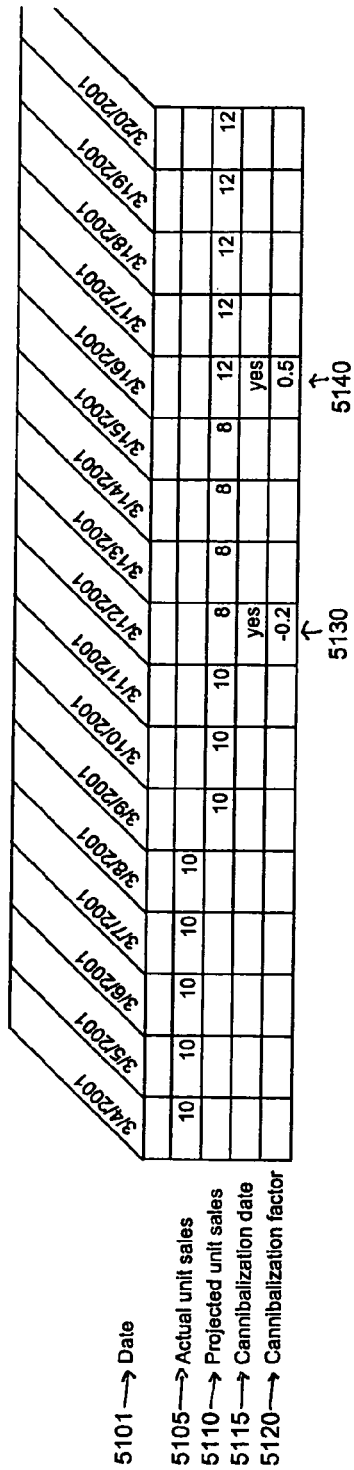
FIG. 51 shows a simple example of day-to-day consistent past and future selling with one future negative cannibalization event and one future positive cannibalization event.

FIG. 50 is an example in which a further cannibalization impact is expected at a second date. The cannibalization impact estimate is −25% 240. The original sales forecast is 10 units 5010. The two cannibalization impacts are cumulative, resulting in a revised forecast of 6 unit sales (i.e., 10*(1−0.2)*(1−0.25)=6) 5040. Complementary to FIG. 50, FIG. 51 illustrates a positive impact on sales at a second date, for example due to a competitive store closing. The cumulative impact in FIG. 51 is positive (i.e., 10*(1−0.2)*(1+0.5)=12) 5140. An arbitrary number of cannibalization dates and factors can be applied in the same manner. They can be applied in any order, such as applying the most recent or most distant impact estimate first. If it is desired to apply multiple cannibalization factors to the same time period and keep the impacts distinct, additional fields can be added to accommodate the desired number of distinct impacts.

Figure 52:
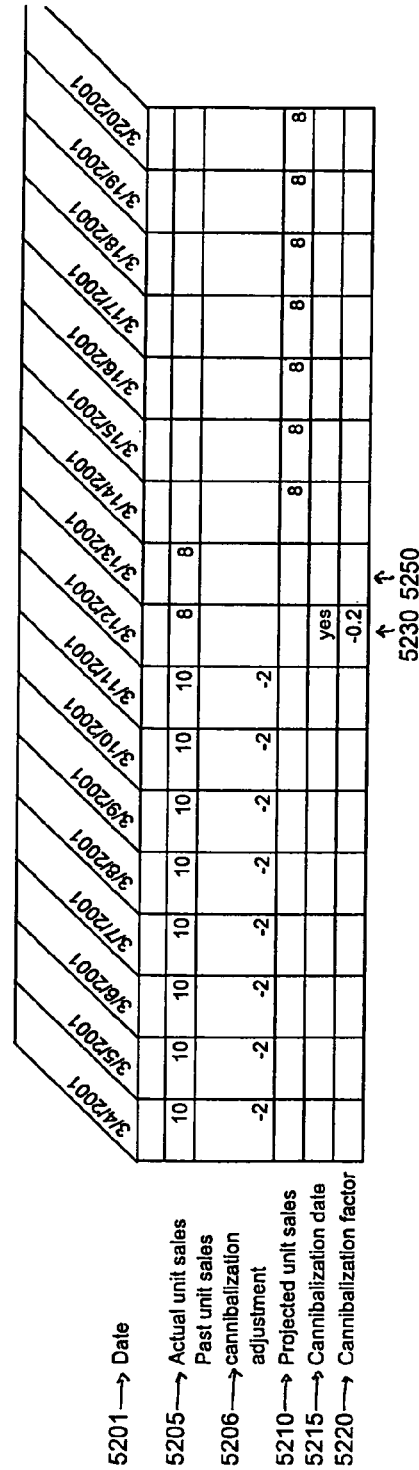
FIG. 52 shows a simple example of day-to-day consistent past and future selling with one past negative cannibalization event.

FIG. 52 illustrates the application of a cannibalization impact when the disruptive event happened in the past, on a date for which the actual sales are recorded. In FIG. 52, the cannibalization date 5230 is a day before the last date with recorded sales 5250. A deduction from actual sales is associated with the sales history for projection purposes, for the days before the date of the disruptive event. The cannibalization factor for a past disruptive event is not applied to the projected sales. Instead, the cannibalization factor 5220 is used to create a so-called Past Unit Sales Cannibalization Adjustment 5206. That Past Unit Sales Cannibalization Adjustment 5206 is the cannibalization factor 5220 times the actual unit sales 5205 net of any previous Past Unit Sales Cannibalization Adjustment 5206 values. In FIG. 52, there is only one disruptive event, so the Past Unit Sales Cannibalization Adjustment 5206 is simply the cannibalization factor 5230 times the actual unit sales 5205 (e.g., −0.2*10=−2). And once a sale is recorded for a date with a cannibalization factor 5230, then all the dates with sales before that date have a Past Unit Sales Cannibalization Adjustment 5206 calculated. The revised sales history and the associated impacts are then used to project future needs and sales.

Figure 53:
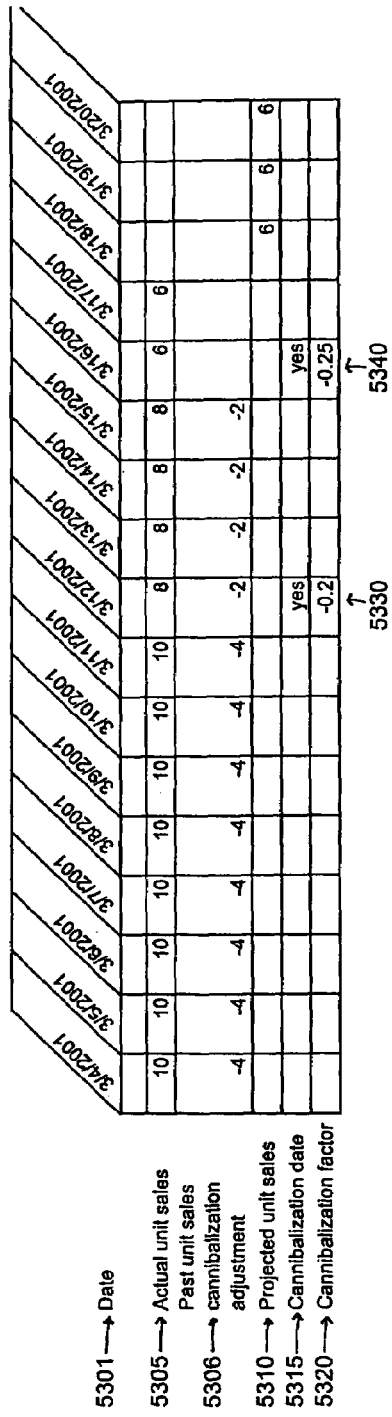
FIG. 53 shows a simple example of day-to-day consistent past and future selling with two past negative cannibalization events.

FIG. 53 illustrates a more complicated case, in which there are two disruptive events in the past. The Past Unit Sales Cannibalization Adjustment will factor in both previous adjustments. In FIG. 53, the "−4" values 5306 from 3/4/2001 to 3/11/2001 are actually composed of 2 different cannibalization impacts. For a disruptive event commencing on 3/12/2001, the first non-zero value of Past Unit Sales Cannibalization Adjustment 5306 is calculated. Because the relevant sales are 10 and the factor is −0.2, a value of "−2" is applied to all the dates before 3/12/2001. Then, due to a second disruptive event commencing on 3/16/2001, the cumulative Past Unit Sales Cannibalization Adjustment 5306 all the dates before 3/12/2001 is calculated by adding the existing value of Past Unit Sales Cannibalization Adjustment 5306 (i.e., −2) to the Actual Unit Sales 5305 plus the current value of the Past Unit Sales Cannibalization Adjustment 5306 (i.e., −2) times the cannibalization factor 5340 (i.e., −0.25) so that the overall calculation is −2+(10−2)*0.25=−4. If there were then subsequent cannibalization dates that become in the past then each would successively be added into creating the Past Unit Sales Cannibalization Adjustment 5306.

One issue to be considered in application of the present invention in the case when the disruptive event happens today, when the analysis is being carried out. Should today's disruptive event be treated as a past or future event? The mode above assumes the cannibalization starts at opening time on the cannibalization date, however, closing time on the cannibalization date or half way through that day could be used. The time increments also could be different than days: longer, such as weeks or shorter, such as hours.

Figure 54:
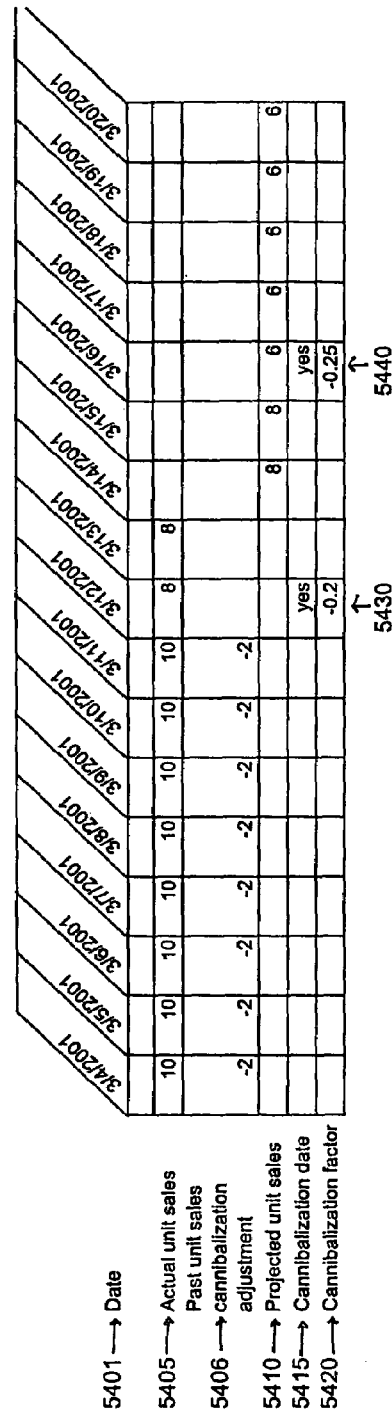
FIG. 54 shows a simple example of day-to-day consistent past and future selling with one past negative cannibalization event and one future negative cannibalization event.

The system also can handle mixed situations, in which disruptive events happen in both the past and future. In FIG. 54, Past Unit Sales Cannibalization Adjustment values 5406 are calculated for cannibalization events with cannibalization dates 5430 in the past (i.e., where actual unit sales 5405 have been recorded). For cannibalization events that are in the future the cannibalization factor 5440 is applied in calculating the Projected unit sales 5410 for the cannibalization date 5440 and any dates further out into the future. In other settings there may be multiple of cannibalization dates 5415 that are now in the past and in the future and where those would be handled as described above.

A system practicing aspects of the present invention changes its handling of disruptive events, as time passes and an event changes from being a future event to being a past event. Associating a cannibalization factor with a specific date or date and time is one way to facilitate this automatic adjustment in the handling of disruptive events. Automatic adjustment allows the user to set a factor and then forget about it. The system correctly handles the event as it moves from the future into the past.

Another aspect of the present invention is that the system also can automatically rescale the estimated impact of one or more disruptive events after real sales results are posted. This is done using the logic described in application Ser. No. 09/755,355, filed 5 Jan. 2001, entitled Method And Apparatus For Supplying Synthetic Sales Histories, by inventors Robert Dvorak and Kevin Katari, which is incorporated by reference. After a predetermined time interval, posted actual sales are compared to the a priori impact estimate and the impact estimate is corrected. The corrected impact estimate is used to recalculate the Past Unit Sales Cannibalization Adjustment values. This further simplifies the user workload and automatically increases the accuracy of the projected unit sales, as a corrected impact estimate or cannibalization factor is used in calculations.

Substitute Products

Replacement mapping of a new item to an old item is useful where some form of item replacement is done, such as a packaging change, label change, sometimes slight sizing change or any other change where a new item will replace the old item. In application Ser. No. 09/755,355, filed 5 Jan. 2001, entitled Method And Apparatus For Supplying Synthetic Sales Histories, by inventors Robert Dvorak and Kevin Katari, a portion of the steps implementing replacement mapping are described, in particular, mapping a new SKU for a good to an old SKU for a good can optionally be accompanied by flagging old and new inventory as basically interchangeable. That is, new inventory can be flagged as being available to meet demand for the cloned good, and vice-a-versa. A "map on hand" option can directs the system to count location, distribution center and other inventory (e.g., on hands and in transits) for a discontinued good against the required model stock or forecast demand for the new, repackaged item. Also treated at length therein is the automatic scaling of forecasts based on actual sales. That is, a priori forecasts can, after a predetermined or user selected time period of actual sales, be adjusted or scaled based on the actual sales. This adjustment can be either automatic or with user interaction. There are additional aspects to the present invention.

For items flagged to treat old and new items as basically interchangeable, the system combines the items for most purposes but displays them separately as required or requested, without double counting. For merchandise planning and management purposes, the items are linked. Need and sales estimates are based on the combined availability of both items. Demand for new items is satisfied with old items and overstocking with new items is avoided. One impact of treating the items interchangeably is adaptability to a date of transition from the old to new item which is unpredictable or changing, due to actual sales of the old item. Linking the old and new items for planning and management purposes relieves the user of tinkering with protected sales of the new item, tracking the actual transition date. The system optionally reports both the linked old and new items. Aggregate reports of linked items avoid double counting of either the old or new items, when displaying the linked items separately. An old item linked to a new item is counted only once as inventory on hand for open-to-buy purposes, for instance, instead of being counted both as the old item and as the new item to which it is linked.

The system can automatically set an out date for the old item and an in date for the new, replacement item. The operation of in and out dates is described in many of the incorporated applications. Application Ser. No. 09/755,635, filed 5 Jan. 2001, entitled Method And Apparatus For Modification Of Basic Good Forecasts, by inventors Robert Dvorak and Kevin Katari contains an extensive discussion of the impact of in dates and out dates on a coverage cycle in a distribution network, which applies to the impact of automatically setting in and out dates. In an alternative embodiment, the system can suggest in and out dates for user confirmation, either interactively at a display screen or in a report. More than one set of in and out dates can be suggested, if preferred. It is anticipated that users will prefer automatic setting of in and out dates, to reduce the number of steps required to replace an old item with a new item.

The system can automatically rescale the new item after actual sales are posted. As described above, a priori forecasts can, after a predetermined or user selected time period of actual sales, adjusted or scaled to reflect the actual sales. This adjustment can be either automatic or with user interaction. Combining this automatic feature with the automatic setting of in and out dates provides a simple way for a user to replace an old item with a new one.

Another automatic or semi-automatic feature of item replacement is translating presentation quantities ("PQs") and causal calendar events for a plurality of locations from the old to the new item. Either or both of these data collections can be translated with little or no user time demands. It is useful to automatically transfer PQs and causal calendar events because the transition date on which sales of the new item will begin may be a moving target, depending on actual sales of the residual old item inventory. PQs are set on an item/location (or location type) basis and may be set on a weekly, daily or more frequent basis. Different embodiments of the PQ translation feature can apply different translation rules or combinations of rules and can involve differing degrees of user interaction. One rule for translating PQs is to assign values from the old item to the new item, regardless of whether or not PQs have been assigned to the new item. A variation on this rule is to allow protection of specific new item PQs, so that old item PQs will be assigned to the new item, regardless of whether or not PQs have been assigned, unless PQs assigned to the new item have been flagged as protected. Another rule for translating PQs is to assign the maximum of the PQs set for the new and old items, with a null or missing value being filled in by assignment. A third rule is to use new item PQs for the first date for which they are posted and all dates thereafter, and to use old item PQs for all dates preceding that first posted date. The program could show the user the alternative effects of two, three or more rules, without applying them. The user could pre-select one translation rule or the other or set rules for adopting one translation rule or another, so the translation would run automatically, without user intervention. Alternatively, the system could prompt the user to select a translation rule in some or all instances, at the item level or a higher level in the inventory hierarchy such as class or department or by location. The system could prompt the user to select a translation rule with or without providing data illustrating the impact of alternative selections.

Automatic translation of causal calendar events as part of automatic or semi-automatic item replacement is a timesaver for users. Promotions can be scheduled seasonally or around special selling days and be applied even if a supplier begins shipping a replacement product. Causal calendar impacts of all types can be set up and left in place for a replacement product. This may be particularly helpful for products that the supplier controls, which are subject to new packaging or feature modifications with little or no notice to the retailer. Causal calendar events like PQ's are set on an item/location (or location type) basis and may be set on a weekly, daily or more frequent basis. Different embodiments of the causal translation feature can apply different translation rules or combinations of rules and can involve differing degrees of user interaction. One rule for translating causal calendars is to assign values from the old item to the new item, regardless of whether or not causal calendars have been assigned to the new item. A variation on this rule is to allow protection of specific new item causal calendars, so that old item causal calendars will be assigned to the new item, regardless of whether or not causal calendars have been assigned, unless causal calendars assigned to the new item have been marked protected. Another rule for translating causal calendars is to assign both the causal calendars set for the new and old items. A third rule is to use new item causal calendar events for the first date for which they are posted and all dates thereafter and to use old item causal calendars for all dates preceding the first date for which a new item causal calendar event is posted. The program could show the user the alternative effects of two, three or more rules, without applying them. The user could pre-select one translation rule or the other or set rules for adopting one translation rule or another, so the translation would run automatically, without user intervention. Alternatively, the system could prompt the user to select a translation rule in some or all instances, at the item level or a higher level in the inventory hierarchy such as class or department or by location. The system could prompt the user to select a translation rule with or without providing data illustrating the impact of alternative selections.

More About Planning

Building on the preceding description, one embodiment of the present invention, aspects of which may be practiced in various combinations, includes:

(a) projecting future sales and inventory at an item location and day level and aggregating upwards, instead of handling items at a more highly aggregated level, such as class or category, instead of planning for groups of locations or all locations at once, and instead of forecasting the plan in weekly or monthly time increments;

(b) incorporating important variables in forecast sales, including the impacts of stocking needs, thereby capturing the interrelationship of sales and inventory;

(c) applying or selecting among multiple forecasting techniques that differ in their mathematical approaches and take into account the differences between basic and seasonal/fashion items;

(d) determining optimal stocking levels for basic goods and seasonal/fashion goods, taking into account their distinctive selling characteristics, and evaluating pricing for goods that are going to be marked down; and (e) linking planning with ordering, allocating, replenishment, markdown and OTB so that information entered in one place is used for multiple purposes and the various systems and results are synchronized; that is, they generate the same answers to the same question (e.g., forecast of sales for the next 20 days or the next promotional event).

One approach to executing the new planning methodology is to run a daily item and location simulation for individual items and locations, simulating projected sales and inventory stocking and the cross impacts between inventory and sales. The simulated results are then used at the daily level and also rolled up to different time increments like weeks or months, groupings of locations like all stores and groupings of items from an individual items to much higher levels of the product hierarchy for particular planning reports.

Expected sales need to be forecasted. In one embodiment, expected sales are forecast for each selling location on a daily or more frequent basis. Various methods of doing this calculation are set for the in the applications incorporated by reference. Weekly or adjusted weekly forecasts also may be used in accordance with the present invention although unless the weekly adjustments are very well done the weekly variant will be less accurate and likely require more user work. Numerous causal and non-causal techniques are used by retailers to forecast sales, including ARIMA, multivariable regression, and historical selling extrapolation.

Location-day forecasts can reflect causal events that affect the rate of selling, such as promotions, presentation changes, and seasonal events. Forecasting techniques can differentiate the periods of time when an item will be promoted, for instance by altering its price or displaying the product in a more prominent part of the store (e.g., putting a sample of it in the store window or putting it on fixtures in the high traffic areas of the store). These causal calendar events may be received from another part of the system that is feeding these inputs to all parts of the system, thereby eliminating duplicate work for users and enabling all parts of the system to work with the same information. The forecasting engines can be the same forecasting engines used for generating the basic item orders and replenishments, for generating seasonal/fashion item allocations and for generating short life item markdowns. Thereby further ensuring that the planning projections are in agreement with and utilizing all the latest information from the systems doing the in season execution of orders, allocations, replenishments and markdowns.

As an alternative to daily forecasts, adjusted weekly forecasts may include weekly forecasting approaches that then try to take into account daily selling differences. For example, a weekly sales forecasting approach that then factors in promotions for part of a week by adjusting the weekly forecast for a fraction of the week that falls during the promotion is attempting to make a weekly forecast more accurate.

The sales projections can then be forecasted taking into account specified factors such as in dates, out dates and clearance out dates. So the item level sales projections can start after an item is set to be in a selling location available for sale (i.e., an in date). Sales should automatically taper off and stop against out dates where the out date may be the ideal end of selling where however clearance sales will take after that date but be concluded by the clearance out date. Those sales can be forecast to achieve the maximum service level possible (i.e., always in stock-target), a specified lesser in stock level, or an optimal economic stocking level (i.e., a stocking level where the in stock target reflects economically optimal tradeoff of potentially losing a sale versus the costs of having extra inventory at that location to avoid losing the sale).

The sales projections can be forecasted taking into account specialized modes of rapidly factoring in trends or potential cannibalization impacts. Cannibalization can come in negative impacts like the opening of a new competitor store or the addition of an item that will steal sales from this item. There can also be beneficial cannibalization situations like the closing of a competitors store nearby that will likely lead to more customers for this item or the addition of a complementary item in the assortment that will stimulate further sales for this item. Having the ability to easily incorporate those kinds of impacts will increase the accuracy of the plan.

In the case of short life or non reorderable items, such as seasonal or fashion items, the sales forecast should change from the preseason buying plan to take into account actual sales during the selling season. The sales projections for these items will likely be forecast using location selling profiles and store selling shares. Once the selling has started for this item then the automatic adjustments based on how the item is performing can be utilized and user workload can be further reduced by automated incorporation of optimizations of markdowns on the item to determine how sales should go between now and the item's out date or clearance out date.

The sales forecasts for the basic or seasonal/fashion items can then be refined by incorporating the impact of what we call need optimization. Optimized need is determining the optimal inventory requirements incorporating the inventory stocking impacts as well as a number of real world real constraints. One of the largest real constraints to inventory and even sales is product availability and where it gets sent. Last PO Receive dates after which product will not longer be delivered to a location is a constraint that should be factored into plans. Presentation quantities have a large impact for most retailers on how much inventory is required and where it is. Therefore, presentation quantities should be built into the inventory projections and then any stockouts that they induce can be factored into the sales forecasts. Goods availability whether within the timing of the current purchase orders or after that also has and impact on inventory and sales. If goods are not going to show up in time to support the ideal selling then projected lost sales can be factored into the projected sales forecasts and should also be factored into the inventory levels expected. Minimum order quantities and factors like case or shipment delivery quantities also impact how much inventory is required and where the inventory goes. If a store needs a quantity of 2 of an item and the delivery quantity is a case of 12 then the store either gets shorted 2 or gets 10 more than required. Likewise if an order for a DC needs 55 of an item and the minimum order quantity is 600 a similar over- or under-stocking situation is encountered. A better approach has all the multiple echelons (e.g., the Central DC, the regional DCs and the stores) of the supply chain seeing what is going on in the other parts and uses a inventory optimization engine optimizing the stocking levels through out the supply chain to minimize stock through out the entire chain. That optimization can be done economically optimally stocking the item given the cost of having excess inventory versus the likely lost profits from missing a sale of the item.

By an iterative approach, a projected sales forecast is adjusted for impacts of the inventory optimal needs, producing a real world practical projection of sales and inventories (e.g., incorporating projection of lost sales, presentations and minimum order quantity impacts.) This forecast also may incorporate causal calendar impacts so that, when price promotions are in effect, the reduction in the sales price can be automatically done by the system so that an accurate projection of gross margin can be achieved. For items approaching end of life undergoing markdowns then integrating in the real and where those decisions are not yet made the optimal markdown decisions also results in more accurate plan projections with less user workload.

A preferred approach to planning utilizes a planning system that is fully integrated into buying and inventory optimizer and other systems executing the plan (see FIG. 3).

It would have the presentation quantities and casual calendar events sent to it from the Presentation and Event Manager. That system would be able to handle many different presentation types and applications, inputted in many different ways. It would also be able to handle many different types of causal calendar events also with many different ways of inputting the information.

The planning system can use the same forecasting and inventory optimizer that is used for the buying and locations stocking decisions or if it is not the same one logic that replicates those decisions. For basic items it would use a sales forecasting engine that is integrated with the inventory need optimization to give a forecast of sales that is consistent with the optimal stocking of the inventory and reflects other real world constraints. The sales forecasts would include all causal events, historical correction of stockouts, automatic factoring in of different time periods, different new item and new location sales determination approaches, different forecasting approaches and the ability to have manual or automatic selection of the forecasting approaches. Basic need optimization would be included that incorporated all causal calendar events, presentation quantities, basic forecasts, multi-echelon integration and optimization, safety stock optimization, overage and underage capabilities and a number of other factors. Of course, the present invention can be practiced with a limited set of features, combining a bottom-up planner with an item-based forecasting engine.

For fashion items it would use a sales forecasting engine that is integrated with the inventory need optimization to give a forecast of sales that is consistent with the optimal stocking of the inventory and reflects other real world constraints. The sales forecasts would include all causal events, historical determination and correction of stockouts, automatic factoring in of different time periods, different new item and new location sales determination approaches, different forecasting approaches and the ability to have manual or automatic selection of the forecasting approaches. Seasonal/Fashion need optimization would be included that incorporated all causal calendar events, presentation quantities, fashion forecasts, multi-echelon integration and optimization, safety stock optimization, overage and underage capabilities and a number of other factors.

The planning system would be integrated with or have the markdown optimization capabilities to determine the optimal timing and pricing of markdowns for items that have begun selling. That optimizer would incorporate causal calendar events, include presentation quantities, use the basic or fashion sales forecaster and need optimizer, set up all the required scenarios and determine the optimal markdown timings and sizes.

The planning system would also be integrated with the open-to-buy calculations or have the capability to statistically stock the reorderable items to achieve an accurate forecast of sales, lost sales and inventory levels. The planning system would need the statistical OTB stocking capability and would use the OTB inventory budget proration approaches.

The planning system that is the subject of this invention would then use the budget figures that are derived from the high level more subjective top-down planner or import sales, gross margin and inventory budget figures from some other source or not use them at all.

With all of these proceeding capabilities integrated into it, our Bottom-up planner has no further user inputs aside from telling the system how long the plan should look ahead. It will automatically include all the latest information and generate item/location/day level forecasts that can then be rolled up in whatever grouping of items and locations and for whatever time period desired. If it is desired it will take budget figures from some external input like the Top-down planner, file upload into the system or user input.

The system can then prorate those budget figures down from whatever level of the product hierarchy they are specified down to the item and lower levels. There are multiple prorating approaches and the method selected may differ by the variable being prorated. One prorating approach is based on projected sales. Sales could be the projected unit or dollar sales or the unit or dollar sales plus estimated unit or dollar lost sales. The actual proration of the Sales budget would be done using the item level values of projected sales or the projected sales plus the estimate of lost sales and the comparable value at the level for which the budget is entered in this case the department level. Since each value adds up to the total sales or the total sales and lost sales, the proration is done using the individual values divided by the department level value forecasted comparable value multiplied by the department inventory budget to get the individual item proration of the budget values. By combining in the lost sales estimate you weight each item against its full potential. Another prorating approach would be to use the projected inventory model stocks (before or after the incorporation of factors like stock out impacts or presentation quantities) to prorate the budgeted values. By using this prorating approach you are factoring in the elements that are not included in the sales projections like visual presentations. You could also use a prorating approach of using the end of month projected inventory to create the item level budget. One way that would work is including the notional orders for the reorderable items post the current order leadtimes to arrive at the statistical (Stat) end of month (EOM) inventory for all the items in the department divided by the comparable total for the department multiplied by the Budget being prorated for the entire Department to give the individual item Budget. For short life items, the statistical inventory may be determined with or without any ability to reorder the item.

With all of these automatic calculations then many different types of reports are then typically created built from the daily item and location sales, inventory and gross margin forecasts. Examples of planning reports are described above, in the descriptions of FIGS. 4–8.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A computer-implemented method of simulating unit inventory and unit sales on a bottom-up per location basis for a plurality of items at a plurality of locations, including:
    computer-based modeling at a per-item, per-location level and simulating on a daily or more frequent basis of how inventory levels (including stock-outs), simulated deliveries (including lead times for particular locations) and projected demand (taking into account timing of planned promotions) interact for particular items at the particular locations; and
    applying planned item pricing to derive simulated dollar inventory and simulated dollar sales of the items at the locations.

2. The method of claim 1, further including rolling up at least one of the simulated unit inventory, unit sales, dollar inventory or dollar sales from the items to one or more aggregate levels.

3. The method of claim 1, further including projecting gross margins on sales of the items across the locations, utilizing
    the simulated dollar sales of the items at the locations, actual costs for the items sold from the current inventory, and
    projected costs for the items sold from the simulated deliveries.

4. The method of claim 3, further including rolling up at least one of the simulated unit inventory, unit sales, dollar inventory, dollar sales, or gross margin on sales from the items to one or more aggregate levels.

5. The method of claim 3, wherein at least some of the simulated deliveries are notional deliveries of the items to meet the projected demand for the items, unconstrained by inventory budgets;
    wherein the notional deliveries result from simulated orders that have not yet been submitted to suppliers when simulating unit inventory and unit sales.

6. The method of claim 5, wherein the notional deliveries only start after specified order coverage cycles for the items.

7. The method of claim 5, wherein the notional deliveries are calculated to balance stocking costs against lost sales.

8. The method of claim 5, wherein the notional deliveries are calculated to deliver predetermined in-stock percentages for the items at the locations.

9. The method of claim 1, wherein at least some of the simulated deliveries are notional deliveries of the items to meet the projected demand for the items, unconstrained by inventory budgets;
    wherein the notional deliveries result from simulated orders that have not yet been submitted to suppliers when simulating unit inventory and unit sales.

10. The method of claim 9, wherein the notional deliveries only start after specified order coverage cycles for the items.

11. The method of claim 9, wherein the notional deliveries are calculated to balance stocking costs against lost sales.

12. The method of claim 9, wherein the notional deliveries are calculated to deliver predetermined in-stock percentages for the items at the locations.

13. The method of claim 1, wherein the simulating of the unit sales is carried out for weekly periods.

14. The method of claim 13, further including adjusting the simulated weekly unit sales for causal events happening during the weekly period.

15. The method of claim 13, further including adjusting the simulated weekly unit sales for one or more promotions happening during at least part of one or more of the weekly periods.

16. The method of claim 1, wherein the simulating of the unit sales is carried out for shorter than daily periods.

17. The method of claim 16, wherein the simulating of unit sales takes into account last purchase order receipt dates associated with the items.

18. The method of claim 17, wherein a plurality of the last purchase order receipt dates for a particular item are associated with a plurality of the locations.

19. The method of claim 16, wherein the simulating of unit sales takes into account causal events affecting demand for the items.

20. The method of claim 19, wherein at least one of the causal events is a promotion.

21. The method of claim 19, wherein at least one of the causal events is a markdown.

22. The method of claim 19, wherein at least one of the causal events is an item presentation.

23. The method of claim 1, wherein the simulating of unit sales takes into account in dates and out dates for the items.

24. The method of claim 23, wherein the out date is a desired date for selling out one or more of the items.

25. The method of claim 23, wherein the out date is a date by which one or more of the items will be sold out or cleared out.

26. The method of claim 23, wherein a plurality of the in dates and out dates for a particular item are associated with a plurality of the locations.

27. A computer-implemented method of prorating sales or revenue budgets among items, including:
    setting sales or revenue budgets for groups of items;
    computer-based modeling at a per-item, per-location level and simulating on a daily or more frequent basis of how inventory levels (including stock-outs), simulated deliveries (including lead times for particular locations and notional deliveries resulting from future orders) and projected demand (taking into account timing of planned promotions) interact for particular items at the particular locations;
    prorating the sales or revenue budgets for the groups of items; and
    reporting the prorated sales or revenue budgets and the projected sales for the items, rolled up, if necessary, to a level of detail equivalent to the prorated sales or revenue budgets.

28. The method of claim 27, further including:
    calculating reduced notional deliveries consistent with prorated inventory budgets; and
    calculating lost sales resulting from the reduced notional deliveries.

29. The method of claim 27, wherein the notional deliveries are constrained by lead time for ordering and obtaining delivery of the items.

30. The method of claim 28, wherein the reduced notional deliveries are constrained by lead time for ordering and obtaining delivery of the items.

31. The method of claim 28, wherein the notional deliveries are based in part on optimal stocking levels.

32. The method of claim 28, wherein the notional deliveries are based in part on predetermined in stock levels.

33. The method of claim 28, wherein the reduced notional deliveries are consistent with presentation quantities for the items at respective selling locations associated with the items.

34. The method of claim 28, wherein the reduced notional deliveries are set with reference to a causal calendar of events.

35. The method of claim 28, wherein the reduced notional deliveries take into account planned promotions.

36. The method of claim 28, wherein the reduced notional deliveries are consistent with minimum order quantities for the items.

37. The method of claim 28, wherein the prorating is based on the projected sales of the items.

38. The method of claim 28, wherein the projected sales of the items include recapture of projected lost sales due to stockouts of the item.

39. The method of claim 28, wherein the projected sales of the items are corrected for projected stockouts at respective selling locations associated with the items.

40. The method of claim 27, wherein the notional deliveries are based in part on optimal stocking levels.

41. The method of claim 27, wherein the notional deliveries are based in part on predetermined in stock levels.

42. The method of claim 27, wherein the notional deliveries are consistent with presentation quantities for the items at respective selling locations associated with the items.

43. The method of claim 27, wherein the notional deliveries are set with reference to a causal calendar of events.

44. The method of claim 27, wherein the notional deliveries take into account planned promotions.

45. The method of claim 27, wherein the notional deliveries are consistent minimum order quantities for the items.

46. The method of claim 27, wherein the prorating is based on the projected sales of the items.

47. The method of claim 27, wherein the projected sales of the items include recapture of projected lost sales due to stockouts of the item.

48. The method of claim 27, wherein the projected sales of the items are corrected for projected stockouts at respective selling locations associated with the items.

* * * * *